US012626454B2

(12) United States Patent　　　　(10) Patent No.: US 12,626,454 B2
Shimakawa　　　　　　　　　　　　(45) Date of Patent: May 12, 2026

(54) INFORMATION PROCESSING APPARATUS AND PROGRAM FOR PRESENTING INFORMATION REGARDING A VIRTUAL VIEWPOINT USED IN RENDERING A 3D MODEL

(71) Applicant: Sony Group Corporation, Tokyo (JP)

(72) Inventor: Masato Shimakawa, Saitama (JP)

(73) Assignee: SONY GROUP CORPORATION, Tokyo (JP)

( * ) Notice: Subject to any disclaimer, the term of this patent is extended or adjusted under 35 U.S.C. 154(b) by 97 days.

(21) Appl. No.: 18/690,559

(22) PCT Filed: Mar. 8, 2022

(86) PCT No.: PCT/JP2022/009842
§ 371 (c)(1),
(2) Date: Mar. 8, 2024

(87) PCT Pub. No.: WO2023/047637
PCT Pub. Date: Mar. 30, 2023

(65) Prior Publication Data
US 2024/0420411 A1　　Dec. 19, 2024

(30) Foreign Application Priority Data

Sep. 22, 2021　(JP) ................................. 2021-154377

(51) Int. Cl.
*G06T 15/20*　　(2011.01)
*G06T 5/50*　　(2006.01)
*H04N 13/279*　　(2018.01)

(52) U.S. Cl.
CPC ................ *G06T 15/20* (2013.01); *G06T 5/50* (2013.01); *H04N 13/279* (2018.05); *G06T 2207/20221* (2013.01)

(58) Field of Classification Search
CPC . G06T 15/20; G06T 5/50; G06T 2207/20221; G06T 19/00; H04N 13/279;
(Continued)

(56) References Cited

U.S. PATENT DOCUMENTS 10,705,678 B2 * 7/2020 Maruyama ............. G06T 19/20
2015/0222880 A1 8/2015 Choi et al.
(Continued)

FOREIGN PATENT DOCUMENTS

JP　2009-187387 A　8/2009
JP　2020-067960 A　4/2020
(Continued)

*Primary Examiner* — Maurice L. Mcdowell, Jr.
(74) *Attorney, Agent, or Firm* — Paratus Law Group, PLLC

(57) ABSTRACT

An image processing apparatus (information processing apparatus) includes a volumetric image shooting unit (first acquisition unit) that acquires a plurality of real images respectively captured by a plurality of cameras (first imaging devices) arranged around a subject, a volumetric image generation unit (generation unit) that generates a 3D model of the subject from the plurality of real images, and an in-studio image display unit (presentation unit) that presents, to the subject, virtual viewpoint information used in rendering, the 3D model, into an image in a form corresponding to a viewing device.

16 Claims, 38 Drawing Sheets

(58) Field of Classification Search
CPC .............. H04N 5/2621; H04N 5/2628; H04N
21/21805; H04N 21/234; H04N 21/816;
H04N 23/90
See application file for complete search history.

(56) References Cited

U.S. PATENT DOCUMENTS

| | | | |
|---|---|---|---|
| 2018/0182114 A1* | 6/2018 | Hanamoto | ................ G06T 3/04 |
| 2019/0199992 A1* | 6/2019 | Shikata | ..................... G06T 7/70 |
| 2019/0349560 A1* | 11/2019 | Yoshimura | .......... G06V 10/255 |
| 2021/0124965 A1* | 4/2021 | Ishikawa | ................ G06V 20/20 |

FOREIGN PATENT DOCUMENTS

| | | |
|---|---|---|
| JP | 2021-056679 A | 4/2021 |
| JP | 2021-077257 A | 5/2021 |
| WO | WO 2017/082076 A1 | 5/2017 |
| WO | WO 2021/095573 A1 | 5/2021 |

* cited by examiner

FIG.3

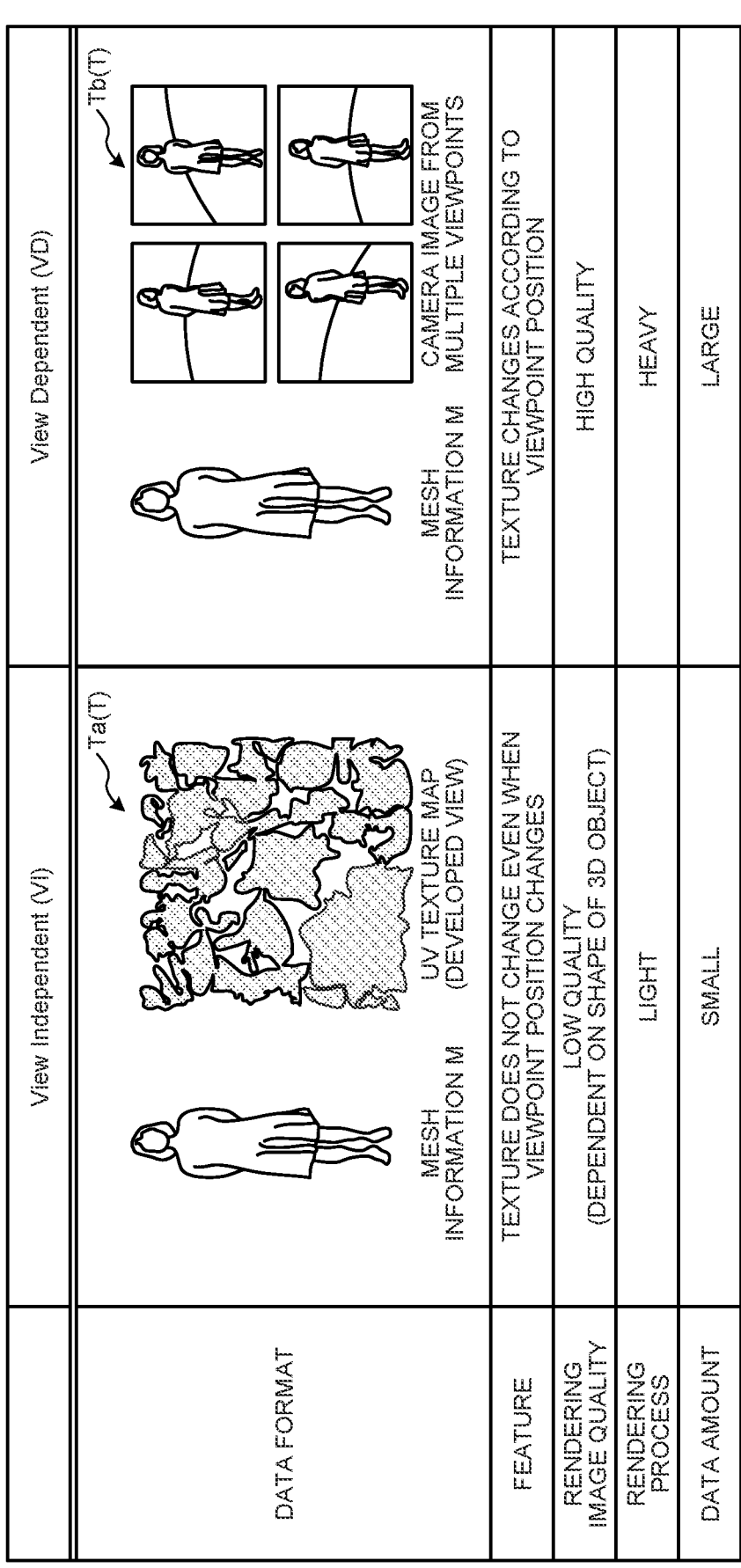

| DATA FORMAT | View Independent (VI) | View Dependent (VD) |
|---|---|---|
| | MESH INFORMATION M / UV TEXTURE MAP (DEVELOPED VIEW) Ta(T) | MESH INFORMATION M / CAMERA IMAGE FROM MULTIPLE VIEWPOINTS Tb(T) |
| FEATURE | TEXTURE DOES NOT CHANGE EVEN WHEN VIEWPOINT POSITION CHANGES | TEXTURE CHANGES ACCORDING TO VIEWPOINT POSITION |
| RENDERING IMAGE QUALITY | LOW QUALITY (DEPENDENT ON SHAPE OF 3D OBJECT) | HIGH QUALITY |
| RENDERING PROCESS | LIGHT | HEAVY |
| DATA AMOUNT | SMALL | LARGE |

FIG.7
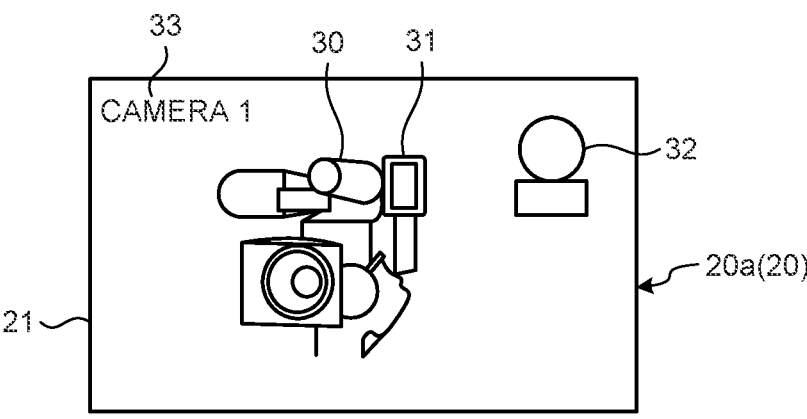
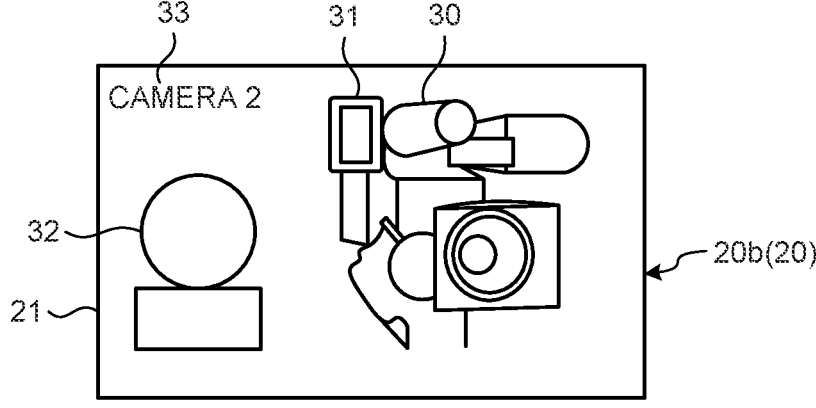
FIG.8
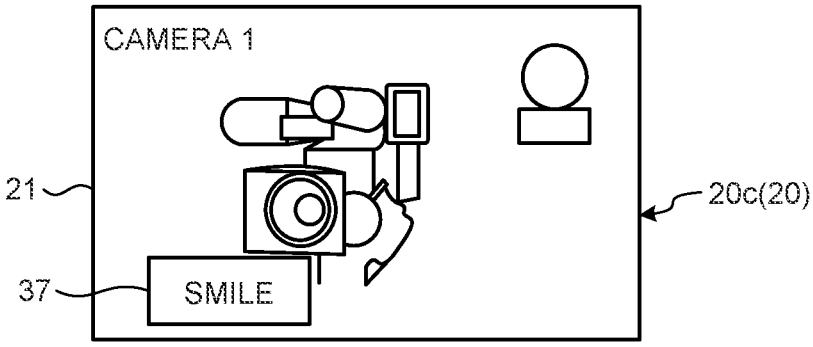

FIG.38
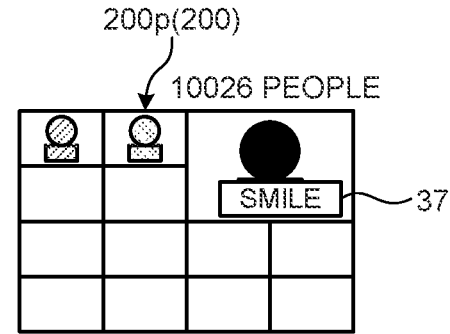
USER MESSAGE DISPLAY
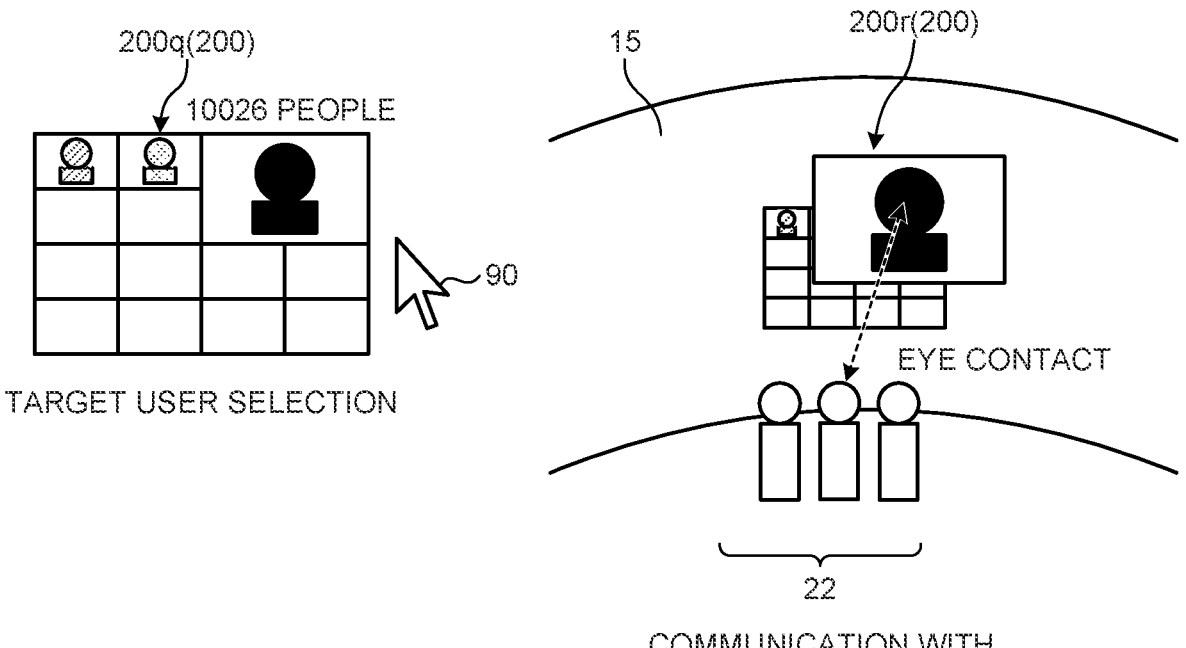
TARGET USER SELECTION
COMMUNICATION WITH
TARGET USER

INFORMATION PROCESSING APPARATUS AND PROGRAM FOR PRESENTING INFORMATION REGARDING A VIRTUAL VIEWPOINT USED IN RENDERING A 3D MODEL

CROSS REFERENCE TO PRIOR APPLICATION

This application is a National Stage Patent Application of PCT International Patent Application No. PCT/JP2022/009842 (filed on Mar. 8, 2022) under 35 U.S.C. § 371, which claims priority to Japanese Patent Application No. 2021-154377 (filed on Sep. 22, 2021), which are all hereby incorporated by reference in their entirety.

FIELD

The present disclosure relates to an information processing apparatus and a program, and more particularly, to an information processing apparatus and a program capable of notifying a subject (performer) of a position of a virtual camera observing the subject.

BACKGROUND

Conventionally, there has been proposed a method of generating a 3D object in a viewing space by using information obtained by sensing a real 3D space such as a multi-viewpoint image that captures a subject from different viewpoints, and generating an image (volumetric image) in which the object looks as if it exists in the viewing space (e.g., Patent Literature 1).

CITATION LIST

Patent Literature

Patent Literature 1: WO 2017/082076 A

SUMMARY

Technical Problem

However, in Patent Literature 1, since a subject is not informed of an installation position of a virtual camera, there is a problem that the subject cannot perform while being conscious of the position of the virtual camera when giving a performance such as singing and dancing.

The present disclosure proposes an information processing apparatus and a program capable of notifying the subject of the position of the virtual camera observing the subject.

Solution to Problem

In order to solve the above problem, an information processing apparatus according to one embodiment of the present disclosure includes: a first acquisition unit configured to acquire a plurality of real images respectively captured by a plurality of first imaging devices arranged around a subject; a generation unit configured to generate a 3D model of the subject from the plurality of real images; and a presentation unit configured to present, to the subject, information regarding a virtual viewpoint used in rendering, the 3D model, into an image in a form corresponding to a viewing device.

BRIEF DESCRIPTION OF DRAWINGS

FIG. 3 is a diagram illustrating content of data necessary for representing the 3D model.

FIG. 7 is a first diagram illustrating a specific example of the virtual camera presentation information.

FIG. 8 is a second diagram illustrating a specific example of the virtual camera presentation information.

FIG. 30 is a system configuration diagram illustrating an outline of an image processing system according to a second embodiment.

FIG. 37 is a diagram illustrating an example of the virtual camera group presentation information when the viewing user changes an observation position.

FIG. 38 is a diagram illustrating an example of a function of communication between the viewing user and a performer.

DESCRIPTION OF EMBODIMENTS

Hereinafter, embodiments of the present disclosure will be described with reference to the drawings. In each of the following embodiments, same parts are given the same reference signs to omit redundant description.

In addition, the present disclosure will be described according to the following item order.

Figure 1:
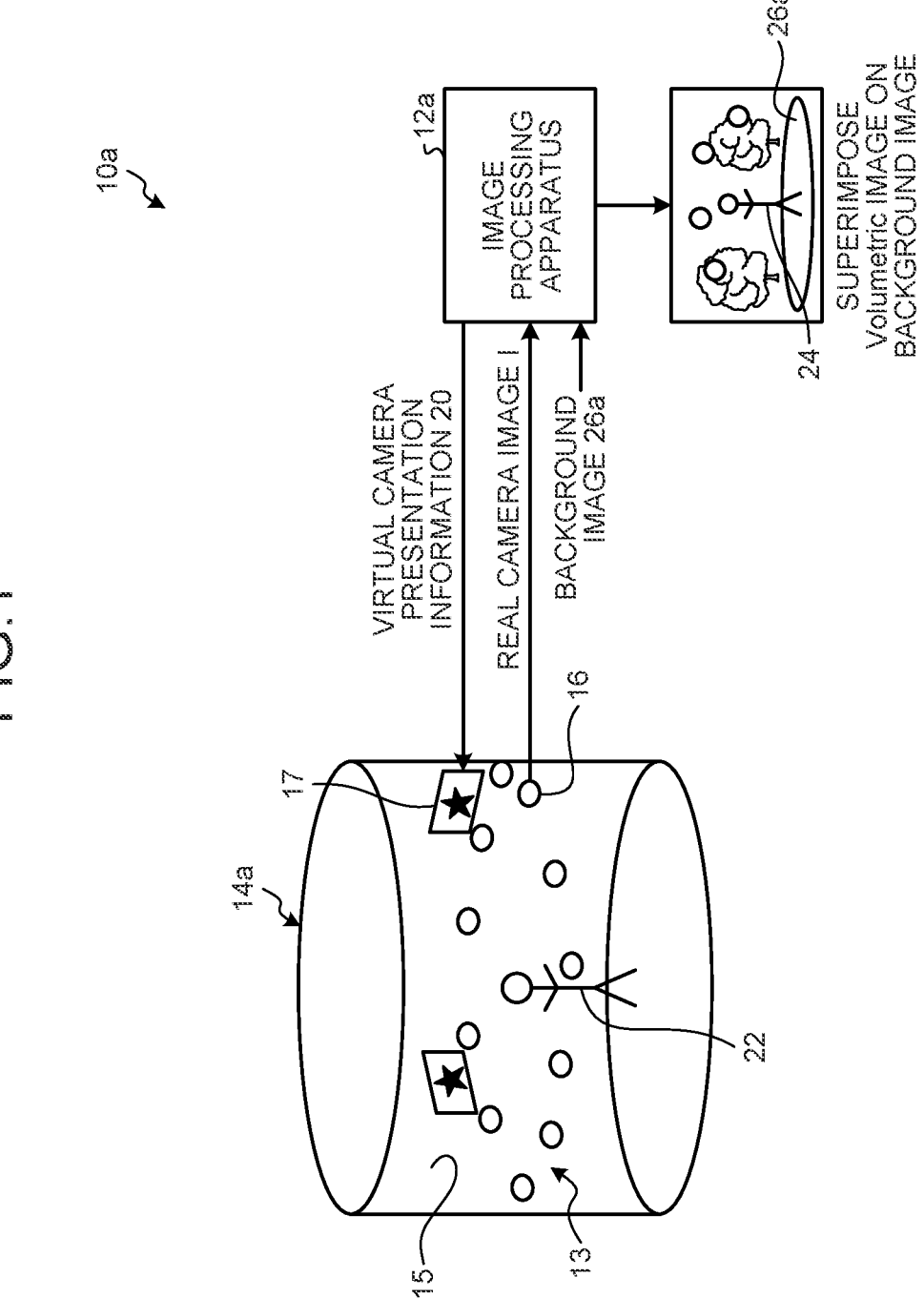
FIG. 1 is a system configuration diagram illustrating an outline of an image processing system according to a first embodiment.

1. First Embodiment
1-1. Schematic configuration of image processing system of first embodiment
1-2. Prerequisite—Generation of 3D model
1-3. Prerequisite—Data structure of 3D model
1-4. Schematic configuration of imaging and display device
1-5. Virtual camera presentation information
1-6. Variations of virtual camera presentation information
1-7. Functional configuration of image processing system of first embodiment
1-8. Overall flow of processing performed by image processing system of first embodiment 1-9. Flow of virtual camera information generation process
1-10. Flow of virtual camera presentation information generation process
1-10-1. Flow of virtual camera group display type determination process
1-10-2. Flow of virtual camera group priority determination process
1-10-3. Flow of virtual camera group presentation information generation process
1-10-4. Flow of virtual camera group voice generation process
1-11. Flow of virtual camera presentation information output process
1-12. Flow of volumetric image generation process
1-13. Flow of superimposition process of volumetric image and background image
1-14. Effects of first embodiment
2. Second Embodiment
2-1. Schematic configuration of image processing system of second embodiment
2-2. Functional configuration of image processing system of second embodiment
2-3. Action of image processing system of second embodiment
2-4. Effects of second embodiment
3. Third Embodiment
3-1. Schematic configuration of image processing system of third embodiment
3-2. Functional configuration of image processing system of third embodiment
3-3. Method of acquiring virtual camera information
3-4. Form of virtual camera group presentation information
3-5. Flow of process implemented by image processing system of third embodiment
3-6. Effects of third embodiment 1. First Embodiment 1-1. Schematic Configuration of Image Processing System of First Embodiment First, an image processing system 10a according to a first embodiment of the present disclosure will be described with reference to FIG. 1. FIG. 1 is a system configuration diagram illustrating an outline of an image processing system according to the first embodiment.

The image processing system 10a includes a volumetric studio 14a and an image processing apparatus 12a. Note that the image processing apparatus 12a is desirably installed in the volumetric studio 14a in order to process an image captured by the volumetric studio 14a with a small delay time.

The volumetric studio 14a is a studio that captures an image of a subject 22 to generate a 3D model 22M of the subject 22. An imaging and display device 13 is installed in the volumetric studio 14a.

The imaging and display device 13 captures an image of the subject 22 by a plurality of cameras 16 arranged on an inner wall surface 15 of the volumetric studio 14a, so as to surround the subject 22. In addition, the imaging and display device 13 presents information regarding a virtual viewpoint used in rendering, from the 3D model 22M of the subject 22, an image in a form corresponding to a viewing device of a user. The information is presented on a display panel 17 arranged on the inner wall surface 15 of the volumetric studio 14a, so as to surround the subject 22. The information regarding the virtual viewpoint is, for example, information indicating a position where a virtual camera is set and an observation direction.

The image processing apparatus 12a generates the 3D model 22M of the subject 22 based on a real camera image I acquired from the camera 16. Furthermore, the image processing apparatus 12a generates information (virtual camera presentation information 20) regarding the virtual viewpoint at the time of rendering, from the 3D model 22M of the subject 22, the image in the form corresponding to the viewing device of the user. Then, the image processing apparatus 12a outputs the virtual camera presentation information 20 generated to the display panel 17. Furthermore, the image processing apparatus 12a generates a volumetric image 24 by rendering an image in the form corresponding to the viewing device from the 3D model 22M of the subject 22 viewed from the set virtual viewpoint. Specifically, when the viewing device of the user is a two-dimensional display such as a tablet terminal or a smartphone, the image processing apparatus 12a renders a two-dimensional image from the 3D model 22M of the subject 22. Furthermore, when the viewing device of the user is a viewing device capable of displaying three-dimensional information, such as a head mount display (HMD), the image processing apparatus 12a renders a 3D image from the 3D model 22M of the subject 22.

Further, the image processing apparatus 12a superimposes the volumetric image 24 generated on a background image 26a acquired to generate an image observed from the set virtual viewpoint. The generated image is distributed to, for example, a viewing environment of the user and displayed on the viewing device of the user. Note that the image processing apparatus 12a is an example of an information processing apparatus in the present disclosure.

1-2. Prerequisite—Generation of 3D Model

Figure 2:
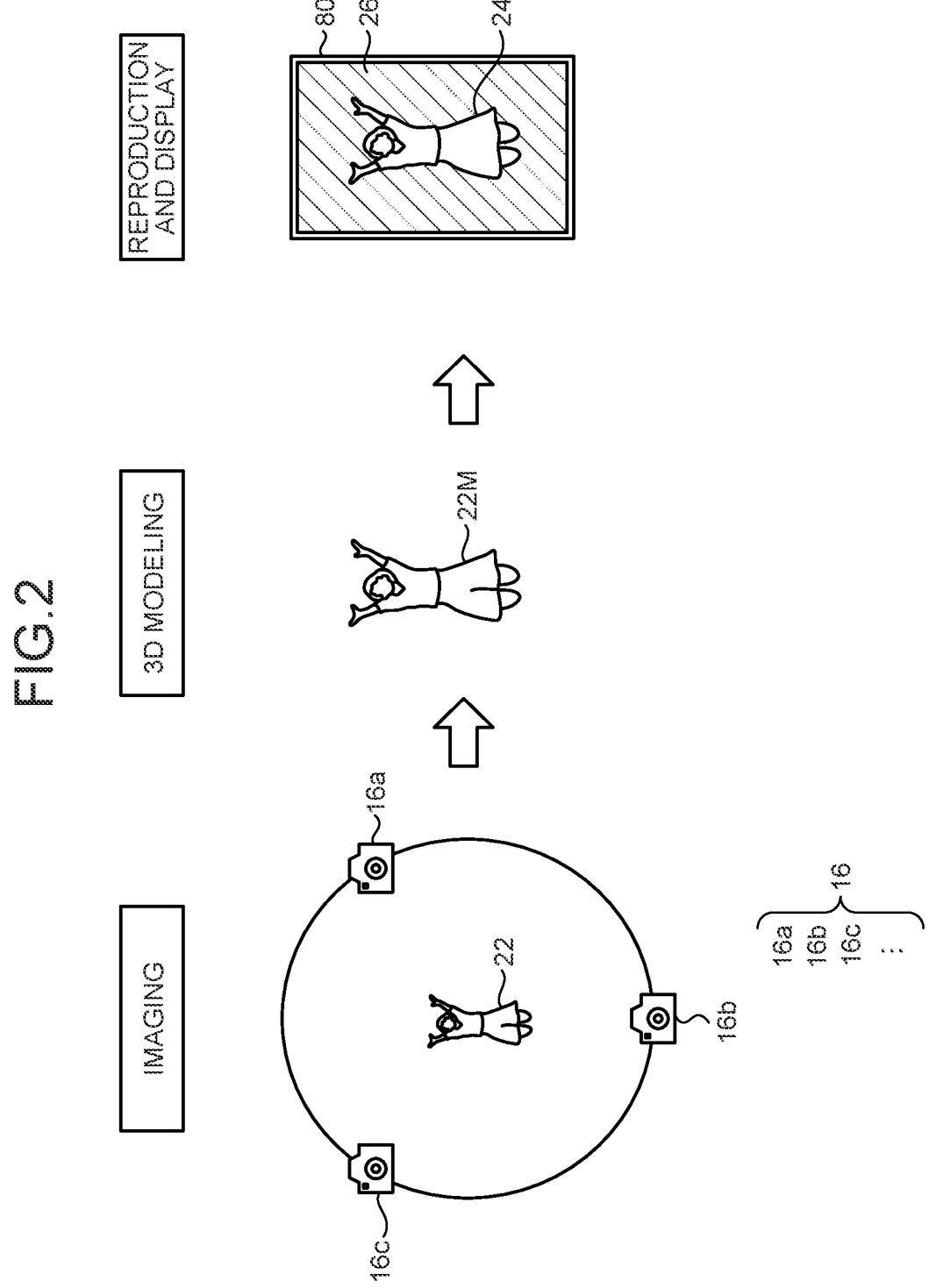
FIG. 2 is a diagram illustrating an outline of a flow of generating a 3D model of a subject.

Next, a flow of a process of generating a 3D model of a subject, which is a prerequisite of the present embodiment, will be described with reference to FIG. 2. FIG. 2 is a diagram illustrating an outline of a flow of generating the 3D model of the subject.

As illustrated in FIG. 2, the 3D model 22M of the subject 22 is generated through imaging of the subject 22 by the plurality of cameras 16 (16a, 16b, 16c) and generating, by 3D modeling, the 3D model 22M having 3D information of the subject 22.

Specifically, as illustrated in FIG. 2, the plurality of cameras 16 is externally arranged around the subject 22 outside the subject 22, facing toward the subject 22. FIG. 2 illustrates an example in which the number of cameras is three, and the cameras 16a, 16b, and 16c are arranged around the subject 22. Note that, in FIG. 2, a person is the subject 22, but the subject 22 is not limited to the person. Furthermore, the number of cameras 16 is not limited to three, and a larger number of cameras may be provided.

From different viewpoints, the three cameras 16a, 16b, and 16c synchronously perform volumetric imaging to generate multi-viewpoint images (real camera images I), and 3D modeling is performed using the multi-viewpoint images to generate the 3D model 22M of the subject 22 in units of image frames of the three cameras 16a, 16b, and 16c.

The 3D model 22M is a model having 3D information of the subject 22. The 3D model 22M has shape information indicating a surface shape of the subject 22 in a form of mesh data expressed by, for example, a connection between vertices called polygon mesh. Furthermore, the 3D model 22M has texture information indicating a surface state of the subject 22 corresponding to each polygon mesh. Note that a format of the information included in the 3D model 22M is not limited thereto, and may be information in other formats.

To reconstruct the 3D model 22M, so-called texture mapping is performed in which a texture indicating a color, pattern, or texture of the mesh is pasted according to a mesh position. In the texture mapping, it is desirable to paste the texture according to a viewpoint position (view-dependent, hereinafter referred to as VD) to improve reality of the 3D model 22M. As a result, when the 3D model 22M is imaged from an arbitrary virtual viewpoint, the texture changes according to the viewpoint position, so that a virtual image with higher image quality can be achieved. However, since a band required for transmission increases, a view-independent (hereinafter referred to as VI) texture may be pasted to the 3D model 22M.

The volumetric image 24 including the 3D model 22M read is superimposed on the background image 26a, and transmitted to and reproduced by, for example, a mobile terminal 80 as a reproduction device. By rendering from the 3D model 22M and reproducing the volumetric image 24 including the 3D model 22M, an image having a 3D shape is displayed on the mobile terminal 80 of the user.

1-3. Prerequisite—Data Structure of 3D Model

Next, content of data necessary for representing the 3D model 22M will be described with reference to FIG. 3. FIG. 3 is a diagram illustrating the content of data necessary for 3D model representation.

The 3D model 22M of the subject 22 is represented by mesh information M indicating a shape of the subject 22 and texture information T indicating a texture (color tone, pattern, etc.) of the surface of the subject 22.

The mesh information M represents the shape of the 3D model 22M by connecting some parts on the surface of the 3D model 22M as vertices (polygon mesh). Furthermore, instead of the mesh information M, depth information Dp (not illustrated) indicating a distance from the viewpoint position for observing the subject 22 to the surface of the subject 22 may be used. The depth information Dp of the subject 22 is calculated based on, for example, parallax with respect to the same region of the subject 22 detected from an image captured by an adjacent imaging device. Note that a sensor with distance measuring mechanism (e.g., time of flight (TOF) camera) or an infrared (IR) camera may be installed, instead of the imaging device, to obtain the distance to the subject 22.

In the present embodiment, two types of data are used as the texture information T. One is texture information Ta that does not depend on the viewpoint position (VI) from which the 3D model 22M is observed. The texture information Ta is data in which, for example, the surface texture of the 3D model 22M is stored in a form of a developed view like a UV texture map illustrated in FIG. 3. In other words, the texture information Ta is data not dependent on the viewpoint position. For example, when the 3D model 22M is a person wearing clothes, the UV texture map including a pattern of the clothes and skin and hair of the person is prepared as the texture information Ta. Then, the 3D model 22M can be drawn by pasting the texture information Ta corresponding to the mesh information M on the surface of the mesh information M representing the 3D model 22M (VI rendering). Even when the observed position of the 3D model 22M changes at this point, the same texture information Ta is pasted to a mesh representing the same region. As described above, the VI rendering using the texture information Ta is executed by pasting the texture information Ta of the clothes worn by the 3D model 22M to all the meshes representing the clothes. Therefore, a data size is generally small, and a calculation load of rendering is also light. However, since the pasted texture information Ta is uniform and the texture does not change even when the observation position is changed, a texture quality is generally low.

The other is the texture information T is texture information Tb dependent on the viewpoint position (VD) at which the 3D model 22M is observed. The texture information Tb is represented by a set of images obtained by observing the subject 22 from multiple viewpoints. In other words, the texture information Tb is data corresponding to the viewpoint position. Specifically, when the subject 22 is observed by N cameras, the texture information Tb is represented by N images simultaneously captured by the respective cameras. Then, when the texture information Tb is rendered in an arbitrary mesh of the 3D model 22M, all the regions corresponding to applicable mesh are detected from the N images. Then, the plurality of detected regions is weighted with respective textures captured and pasted to the applicable mesh. As described above, the VD rendering using the texture information Tb generally has a large data size, and the calculation load of rendering is heavy. However, since the pasted texture information Tb changes according to the observation position, the texture quality is generally high.

1-4. Schematic Configuration of Imaging and Display Device

Figure 4:
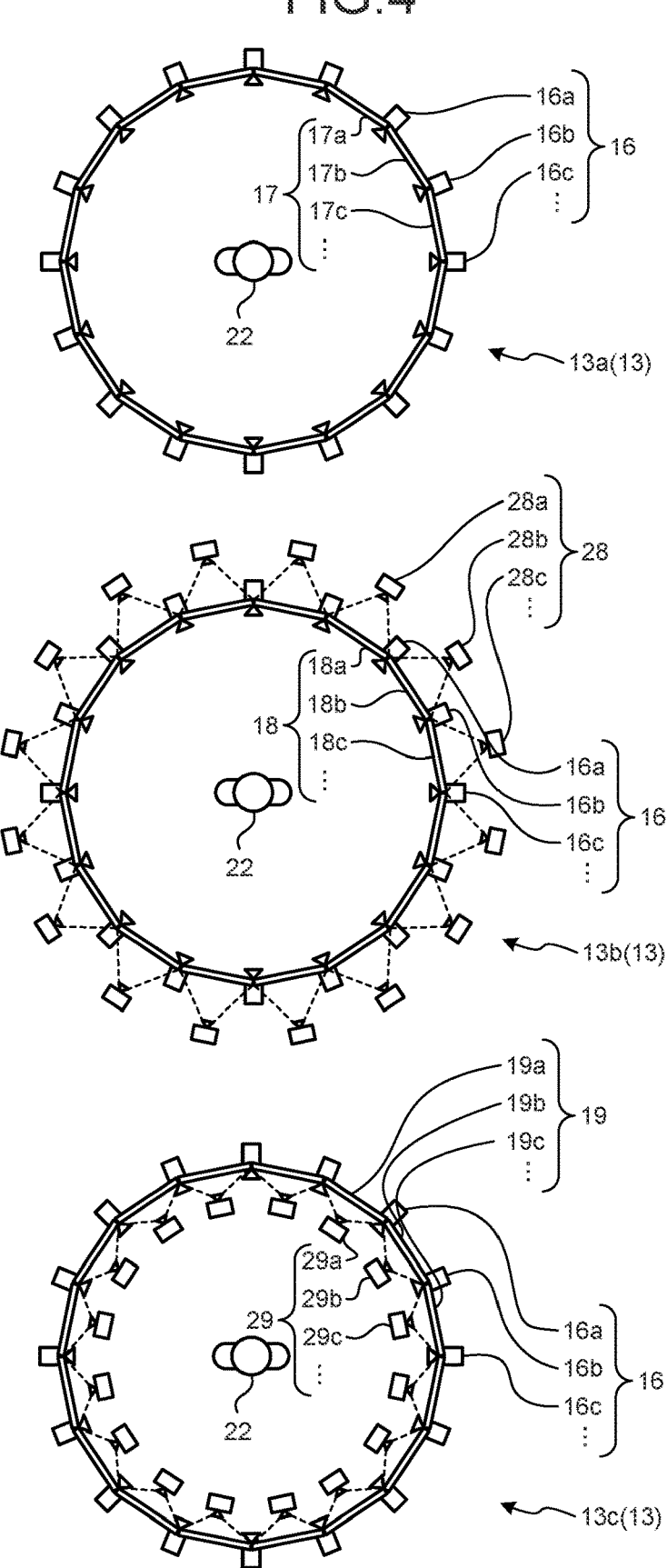
FIG. 4 is a diagram illustrating a schematic configuration of an imaging and display device installed in a studio.
Figure 5:
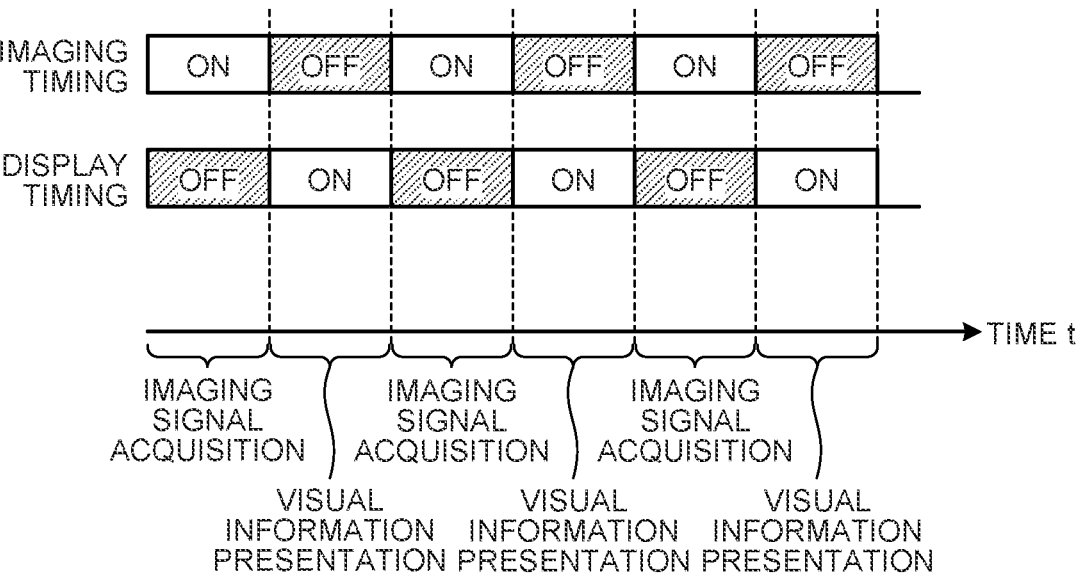
FIG. 5 is a diagram illustrating an example of timing control of ON/OFF of a display panel and ON/OFF of a camera.

Next, a schematic configuration of the imaging and display device included in the image processing system 10a according to the first embodiment will be described with reference to FIGS. 4 and 5. FIG. 4 is a diagram illustrating a schematic configuration of an imaging and display device installed in a studio. FIG. 5 is a diagram illustrating an example of timing control of ON/OFF of the display panel and ON/OFF of the camera.

In the volumetric studio 14a, the plurality of cameras 16 (16a, 16b, 16c, and so on) is arranged around the subject 22 so as to surround the subject 22. A plurality of display panels 17 (17a, 17b, 17c, and so on) is arranged so as to fill a gap between adjacent cameras 16. The display panel 17 is, for example, an LED panel, a liquid crystal panel, or an organic EL panel. The plurality of cameras 16 and the plurality of display panels 17 configure an imaging and display device 13a. Note that, in FIG. 4, the cameras 16 and the display panels 17 are arranged in a line around the subject 22, but the cameras 16 and the display panels 17 may be arranged in a plurality of rows in a vertical direction of the volumetric studio 14a.

In the imaging and display device 13a, the plurality of cameras 16 images the subject 22 at the same time in order to generate the 3D model 22M of the subject 22. In other words, imaging timings of the plurality of cameras 16 are synchronously controlled.

Furthermore, in the imaging and display device 13a, the virtual camera presentation information 20 is displayed on the plurality of display panels 17. The virtual camera presentation information 20 will be described later in detail (see FIG. 7).

Note that timing control is performed such that imaging timings of the cameras 16 do not overlap with display timings of the display panels 17. Details will be described later (see FIG. 5).

The configuration of the imaging and display device 13 is not limited to the imaging and display device 13a. An imaging and display device 13b illustrated in FIG. 4 includes projectors 28 (28a, 28b, 28c, and so on) and transmissive screens 18 (18a, 18b, 18c, and so on) onto which image information projected by the projectors 28 is projected instead of the display panels 17 (17a, 17b, 17c, and so on).

The projectors 28 project the virtual camera presentation information 20 from the back side of the transmissive screens 18.

In addition, an imaging and display device 13c illustrated in FIG. 4 includes projectors 29 (29a, 29b, 29c, and so on) and reflective screens 19 (19a, 19b, 19c, and so on) on which image information projected by the projectors 29 is projected instead of the display panels 17 (17a, 17b, 17c, and so on).

The projectors 28 project the virtual camera presentation information 20 from the front side of the reflective screens 19.

In addition, as a simplest embodiment of the present disclosure, although not illustrated, a position of the virtual viewpoint may be presented as a bright point by using, instead of the display panels 17, a projection device such as a laser pointer capable of projecting a laser beam over the entire circumference.

Imaging of the subject 22 by the cameras 16 and display of the virtual camera presentation information 20 on the display panels 17 (or projectors 28 or 29) are controlled based on a timing chart illustrated in FIG. 5.

Specifically, the imaging and display device 13 temporally and alternately performs the imaging operation by cameras 16 and the presentation of the visual information on the display panels 17 (or projectors 28 or 29). In other words, when the cameras 16 capture an image of the subject 22, presentation of visual information (display of the virtual camera presentation information 20) on the display panels 17 (or projectors 28 or 29) is not performed. On the other hand, when the virtual camera presentation information 20 is presented on the display panels 17 (or projectors 28 or 29), the subject 22 is not captured by the cameras 16. This prevents the virtual camera presentation information 20 from being included in a background when the cameras 16 capture an image of the subject 22.

In FIG. 5, a duration imaging by the cameras 16 and a duration of presenting the visual information (virtual camera presentation information 20) on the display panels 17 (or projectors 28 or 29) are substantially equally illustrated. However, a ratio of these durations is set such that movement of the subject 22 can be reliably imaged and the subject 22 can sufficiently visually recognize the virtual camera presentation information 20.

Note that the image processing apparatus 12a performs a process of separating the subject 22 from a captured image including the subject 22. Therefore, during this process, the virtual camera presentation information 20 may be displayed on the display panels 17 (or projectors 28 or 29). Furthermore, in order to reliably and easily separate the subject 22, an image may be captured using an IR camera and an IR light.

1-5. Virtual Camera Presentation Information

Figure 6:
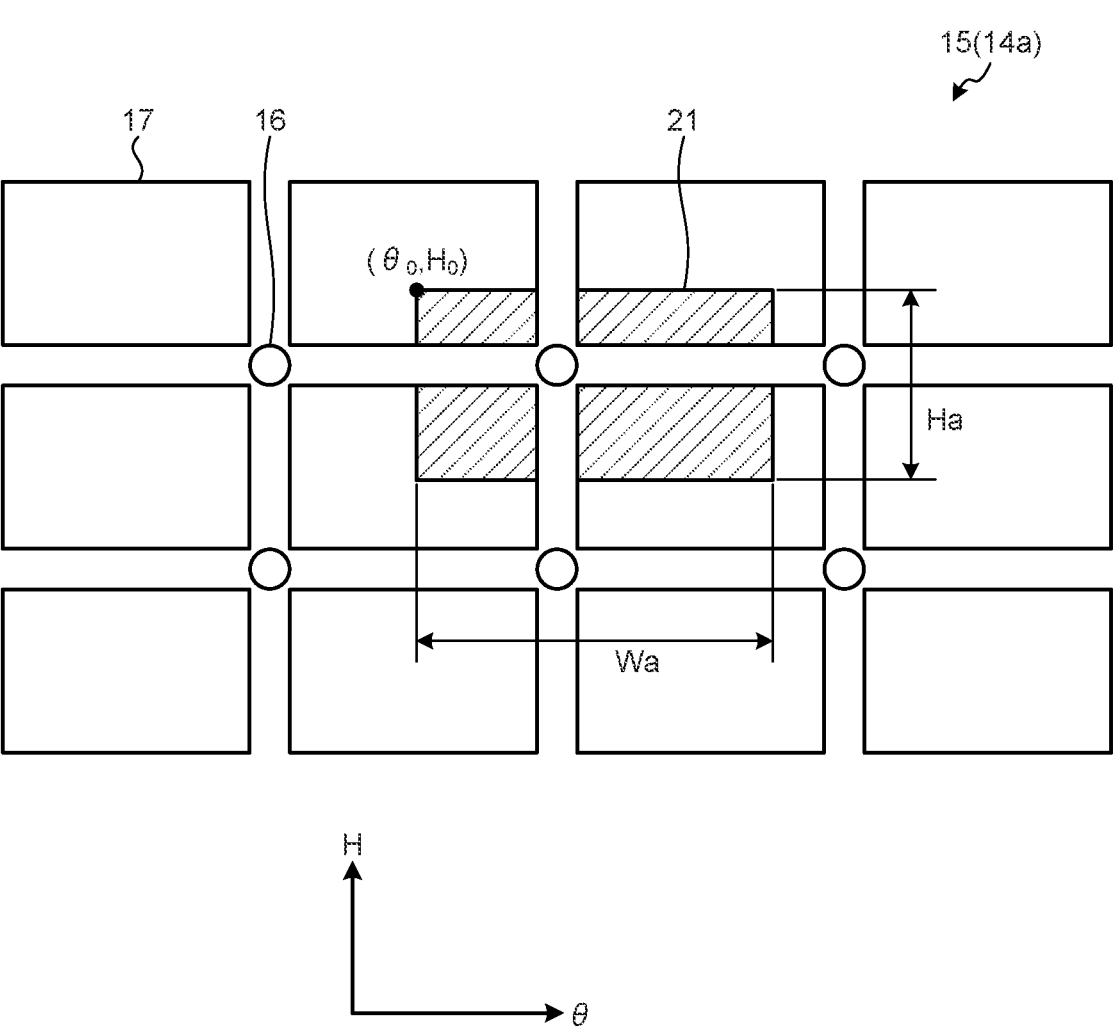
FIG. 6 is a diagram illustrating an example of virtual camera presentation information displayed on the display panel.

Next, specific examples of the virtual camera presentation information 20 will be described with reference to FIGS. 6, 7, and 8. FIG. 6 is a diagram illustrating an example of the virtual camera presentation information displayed on the display panel. FIG. 7 is a first diagram illustrating a specific example of the virtual camera presentation information. FIG. 8 is a second diagram illustrating a specific example of the virtual camera presentation information.

As illustrated in FIG. 6, the plurality of display panels 17 is arranged on the inner wall surface 15 of the volumetric studio 14*a* in a vertical direction along an H axis and a horizontal direction along a θ axis. The cameras 16 are installed at positions adjacent to four display panels 17.

The image processing apparatus 12*a* illustrated in FIG. 1 displays an image frame 21 at a position corresponding to the virtual viewpoint. Then, in the image frame 21, for example, the virtual camera presentation information 20 illustrated in FIG. 7 is displayed. The image frame 21 has, for example, a rectangular shape, and is set at a position of a horizontal width Wa, and a height Ha from an upper left vertex (θo, ho), which is instructed by the image processing apparatus 12*a*. Then, the virtual camera presentation information 20 is displayed inside the set image frame 21.

As illustrated in FIG. 6, the set image frame 21 may overlap the plurality of display panels 17. Furthermore, since the number of virtual viewpoints set by the image processing apparatus 12*a* is not limited to one, a plurality of image frames 21 is generally set on the inner wall surface 15 of the volumetric studio 14*a*.

In the image frame 21 set in this manner, for example, the virtual camera presentation information 20 illustrated in FIG. 7 is displayed.

Virtual camera presentation information 20*a* (20) illustrated in FIG. 7 includes a camera icon 30, a tally lamp 31, a cameraperson icon 32, and a camera name 33 inside the image frame 21. The virtual camera presentation information 20*a* (20) is information for notifying the subject 22 of the position of the virtual viewpoint set by the image processing apparatus 12*a*. Note that the virtual camera presentation information 20 is an example of the information regarding the virtual viewpoint in the present disclosure.

The camera icon 30 is an icon simulating the virtual camera placed at the position of the virtual viewpoint set by the image processing apparatus 12*a*. The camera icon 30 is displayed in a form simulating a distance between the subject 22 and the virtual viewpoint and a line-of-sight direction at the virtual viewpoint. In addition, the camera icon 30 is displayed in a form of looking into the subject 22 from an opposite side of the inner wall surface 15 of the volumetric studio 14*a*.

The tally lamp 31 indicates an operation state of the virtual camera placed at the position of the virtual viewpoint. For example, when the virtual camera is performing imaging and distribution (On Air state), the tally lamp 31 lights in red. When the virtual camera is performing only imaging, the tally lamp 31 lights in green.

The cameraperson icon 32 is an icon uniquely associated with an operator who controls the virtual viewpoint, and an arbitrary icon set in advance is displayed. The subject 22 can check the cameraperson icon 32 to recognize who is the operator setting the position of the virtual viewpoint. Note that the size of the cameraperson icon 32 may be changed according to the distance between the subject 22 and the virtual viewpoint. For example, the cameraperson icon 32 may be displayed larger as the distance between the subject 22 and the virtual viewpoint is shorter. Furthermore, the cameraperson icon 32 may be imaged operator himself/herself.

The camera name 33 is identification information uniquely associated with the virtual camera, and an arbitrary name set in advance is displayed.

The virtual camera presentation information 20 changes to a form corresponding to the set state of the virtual viewpoint. Virtual camera presentation information 20*b* (20) illustrated in FIG. 7 displays information regarding a virtual viewpoint different from the virtual camera presentation information 20*a*. More specifically, the virtual camera presentation information 20*b* (20) is information of a virtual camera different from that of the virtual camera presentation information 20*a* (20). Furthermore, the line-of-sight direction at the virtual viewpoint is different from that of the virtual camera presentation information 20*a*.

Furthermore, the camera icon 30 and the cameraperson icon 32 displayed in the virtual camera presentation information 20*b* are illustrated larger than the camera icon 30 and the cameraperson icon 32 in the virtual camera presentation information 20*a*. This indicates that the position of the virtual viewpoint indicated by the virtual camera presentation information 20*b* is closer to the subject 22 than the position of the virtual viewpoint indicated by the virtual camera presentation information 20*a*.

Note that, although not illustrated in FIG. 7, the size of the image frame 21 may be larger as the virtual viewpoint is closer to the subject 22.

Virtual camera presentation information 20*c* (20) illustrated in FIG. 8 is an example in which the operator who controls the virtual viewpoint by the image processing apparatus 12*a* displays a message for the subject 22. In other words, the virtual camera presentation information 20*c* (20) includes message information 37.

1-6. Variations of Virtual Camera Presentation Information

Figure 9:
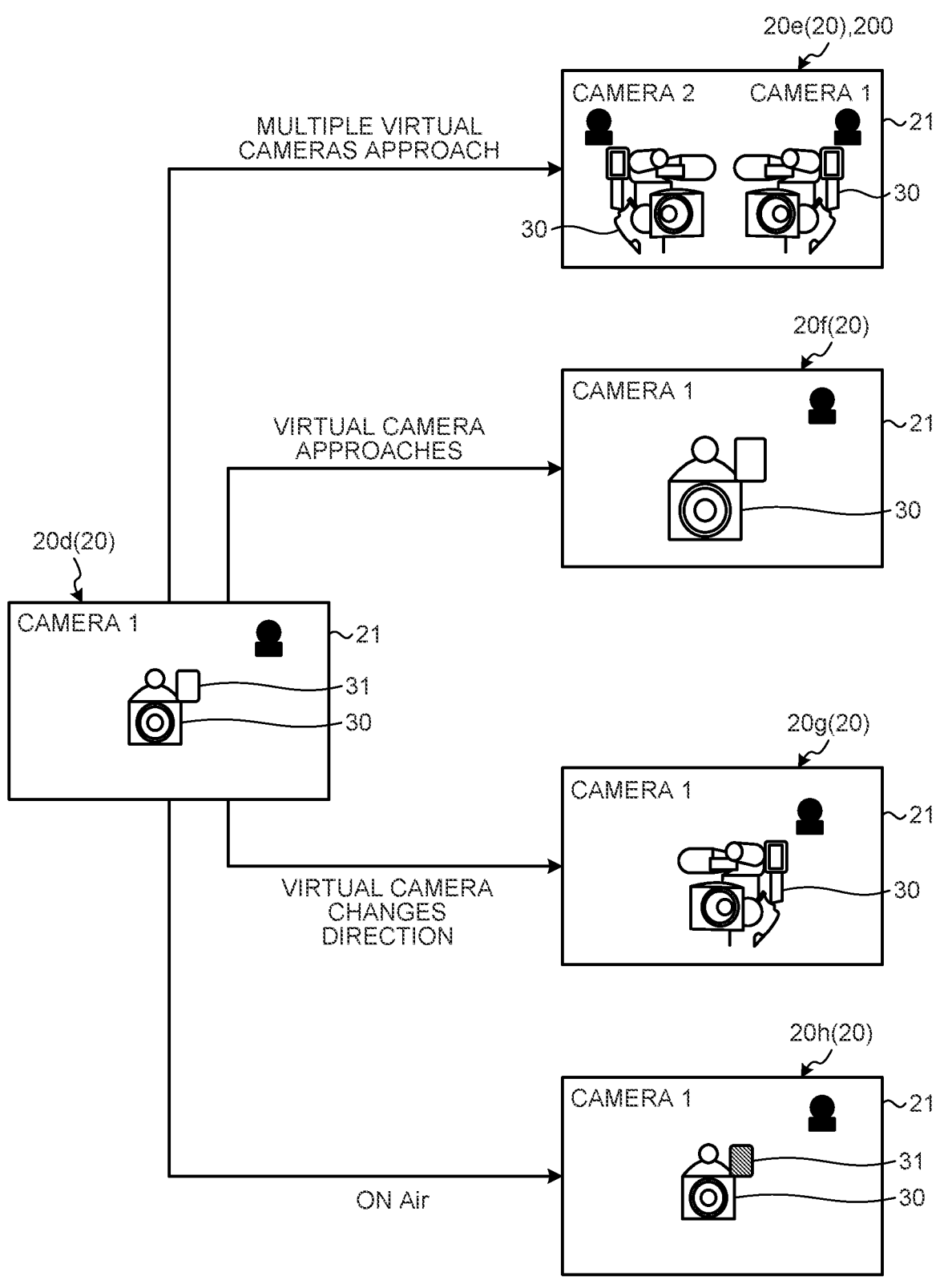
FIG. 9 is a diagram illustrating typical variations of the virtual camera presentation information.

Next, variations of the virtual camera presentation information 20 will be described with reference to FIGS. 9 to 12. FIG. 9 is a diagram illustrating typical variations of the virtual camera presentation information.

In FIG. 9, virtual camera presentation information 20*d* (20) indicates that the virtual camera faces the subject 22.

When another virtual camera approaches in a state where the virtual camera presentation information 20*d* (20) is presented, the image processing apparatus 12*a* presents virtual camera presentation information 20*e* (20). The virtual camera presentation information 20*e* (20) indicates that "camera 1" and "camera 2" are close to each other. Note that the virtual camera presentation information 20 displayed in a state where a plurality of cameras is grouped in this manner is particularly referred to as virtual camera group presentation information 200.

Furthermore, when the virtual camera approaches the subject 22 in a state where the virtual camera presentation information 20*d* (20) is presented, virtual camera presentation information 20*f* (20) is presented. The camera icon 30 illustrated larger in the virtual camera presentation information 20*f* (20) indicates that the virtual camera is closer to the subject 22. At this time, the image frame 21 may be illustrated larger. Furthermore, although not illustrated in FIG. 9, when the virtual camera moves away from the subject 22, the camera icon 30 is illustrated smaller.

Virtual camera presentation information 20*g* (20) is information presented when a direction of the virtual camera has changed from the state where the virtual camera presentation information 20*d* (20) has been presented. The virtual camera presentation information 20*g* (20) in FIG. 9 indicates that the virtual camera has changed its direction to the right.

Virtual camera presentation information 20*h* (20) indicates a state where the virtual camera placed at the virtual viewpoint actually starts imaging. In this case, a display mode of the tally lamp 31 is changed to a state indicating that imaging is in progress.

Figure 10:
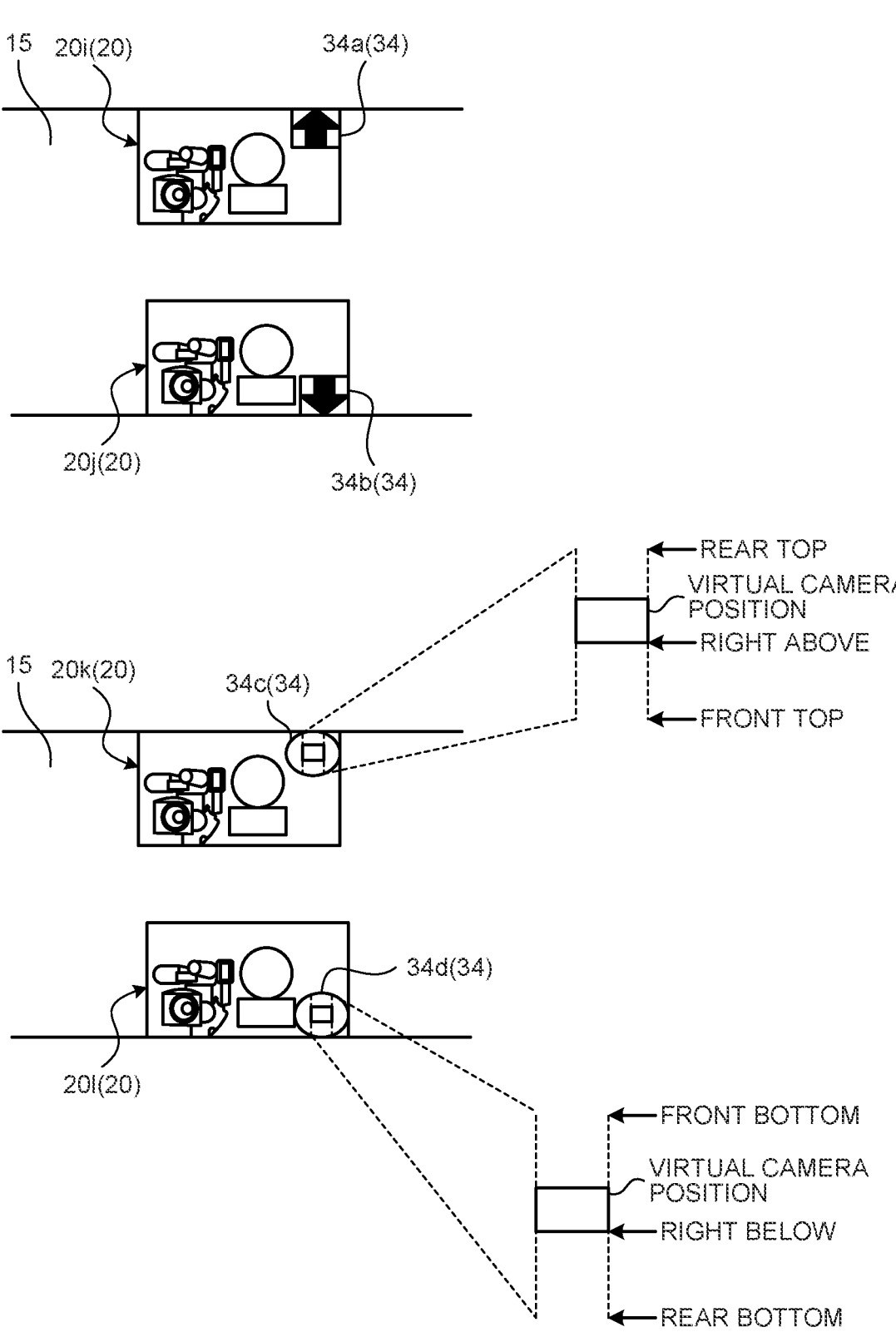
FIG. 10 is a diagram illustrating an example of the virtual camera presentation information indicating that a virtual camera is set at a position where there is no display panel.

FIG. 10 is a diagram illustrating an example of the virtual camera presentation information indicating that the virtual camera is set at a position where there is no display panel.

The virtual viewpoint (virtual camera) can be installed at any position around the subject 22. Therefore, the virtual camera can be installed at a position where the display panel 17 cannot be installed or is difficult to be installed, such as a ceiling or a floor of the volumetric studio 14a. In this case, the image processing apparatus 12a displays a camera position display icon 34 indicating that the virtual camera is outside the installation position of the display panel 17 in the virtual camera presentation information 20.

Virtual camera presentation information 20i (20) illustrated in FIG. 10 includes a camera position display icon 34a (34). The camera position display icon 34a (34) indicates that the virtual camera is set on the ceiling of the inner wall surface 15 of the volumetric studio 14a.

Furthermore, virtual camera presentation information 20j (20) includes a camera position display icon 34b (34). The camera position display icon 34b (34) indicates that the virtual camera is set on the floor of the inner wall surface 15 of the volumetric studio 14a.

Virtual camera presentation information 20k (20) illustrated in FIG. 10 includes a camera position display icon 34c (34). The camera position display icon 34c (34) is an icon obtained by modifying the camera position display icon 34a (34). The camera position display icon 34c (34) indicates where on the ceiling the virtual camera is set. A rectangular area included in the camera position display icon 34c (34) indicates a setting position of the virtual camera. When the virtual camera is set at the uppermost portion (ceiling) on the side where the virtual camera presentation information 20k (20) is displayed, the rectangular area included in the camera position display icon 34c (34) is displayed at the lowermost portion of the camera position display icon 34c (34). On the other hand, when the virtual camera is set at the uppermost portion (ceiling) at the back of the side where the virtual camera presentation information 20k (20) is displayed, the rectangular area included in the camera position display icon 34c (34) is displayed at the uppermost portion of the camera position display icon 34c (34). Furthermore, when the virtual camera is installed directly above the subject 22, the rectangular area included in the camera position display icon 34c (34) is displayed at the center of the camera position display icon 34c (34).

Furthermore, virtual camera presentation information 201 (20) includes a camera position display icon 34d (34). The camera position display icon 34d (34) is an icon obtained by modifying the camera position display icon 34b (34). The camera position display icon 34d (34) indicates where on the floor the virtual camera is set. A rectangular area included in the camera position display icon 34d (34) indicates a setting position of the virtual camera. When the virtual camera is set at the lowermost portion (floor) on the side where the virtual camera presentation information 201 (20) is displayed, the rectangular area included in the camera position display icon 34d (34) is displayed at the uppermost portion of the camera position display icon 34d (34). On the other hand, when the virtual camera is set to the lowermost portion (floor) at the back of the side where the virtual camera presentation information 201 (20) is displayed, the rectangular area included in the camera position display icon 34d (34) is displayed at the lowermost portion of the camera position display icon 34c (34). Furthermore, when the virtual camera is installed directly below the subject 22, the rectangular area included in the camera position display icon 34d (34) is displayed at the center of the camera position display icon 34d (34).

Figure 11:
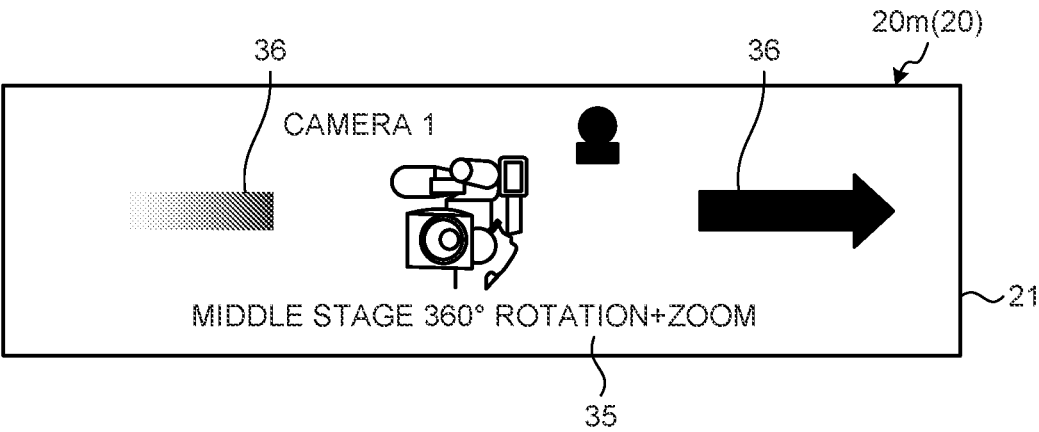
FIG. 11 is a diagram illustrating an example in which the virtual camera presentation information displays camerawork of the virtual camera.

FIG. 11 is a diagram illustrating an example in which the virtual camera presentation information displays a camerawork of the virtual camera.

Virtual camera presentation information 20m (20) displayed in the image frame 21 illustrated in FIG. 11 includes camerawork information 35 indicating a movement trajectory of the virtual camera generated by the image processing apparatus 12a and a camerawork 36. Note that the camerawork information 35 indicates name of the camerawork.

The camerawork 36 is an arrow indicating a direction of actual movement of the virtual camera. By representing the movement of the virtual camera with an arrow, the subject 22 can predict the movement of the virtual camera during performance. Note that, as illustrated in FIG. 11, the direction of the camerawork may be emphasized by displaying the front of the arrow indicating the camerawork 36 in a dark color and displaying the rear of the arrow indicating the camerawork 36 in a gradually light color.

Furthermore, when a moving speed of the virtual camera is slow, as illustrated in FIG. 11, a current position of the virtual camera may be superimposed on the camerawork 36 and sequentially displayed. However, when the moving speed of the virtual camera is fast, the position of the virtual camera may be displayed at an end point of the camerawork 36.

Figure 12:
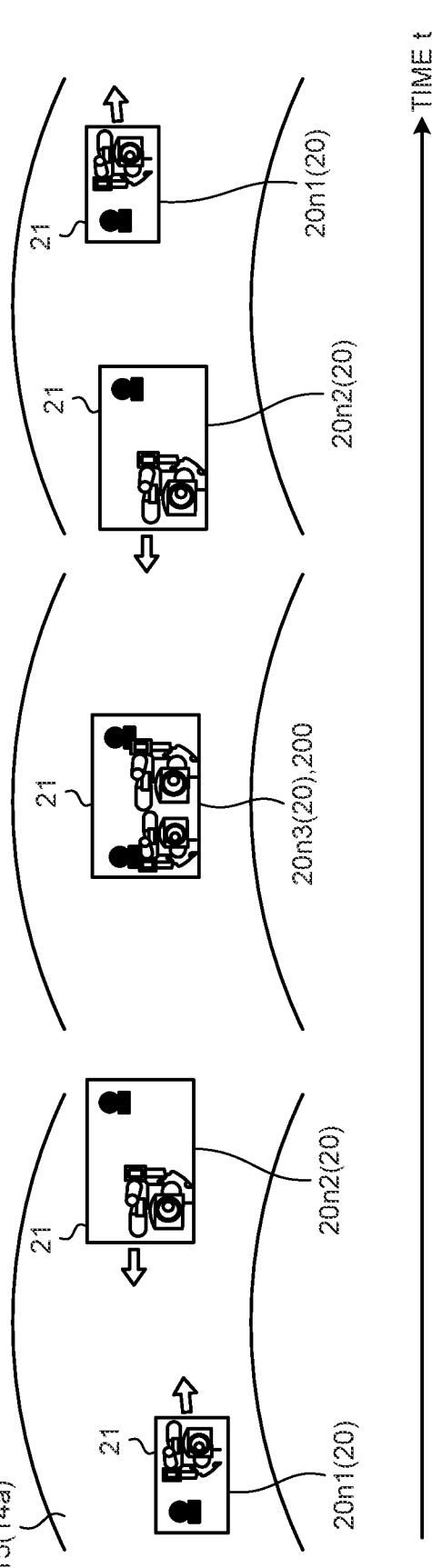
FIG. 12 is a diagram illustrating an example of the virtual camera presentation information when setting positions of a plurality of virtual cameras overlap.

FIG. 12 is a diagram illustrating an example of the virtual camera presentation information when setting positions of the plurality of virtual cameras overlap.

The image processing apparatus 12a sets the plurality of virtual cameras on the inner wall surface 15 of the volumetric studio 14a. Each of the plurality of virtual cameras set freely moves. Therefore, positions of the plurality of virtual cameras may become close to each other.

FIG. 12 illustrates a state where two virtual cameras set move in a direction of becoming close to each other with a lapse of time t, and then pass each other and move away.

In this case, first, virtual camera presentation information 20n1 (20) and virtual camera presentation information 20n2 (20) corresponding to respective virtual cameras are displayed. Then, when positions of the two virtual cameras become close to each other, virtual camera presentation information 20n3 (20), i.e., the virtual camera group presentation information 200, is displayed in one image frame 21. The virtual camera group presentation information 200 includes the virtual camera presentation information 20 of the plurality of virtual cameras at close positions in one divided image frame 21.

Then, after the two virtual cameras pass each other, the virtual camera presentation information 20n1 (20) and the virtual camera presentation information 20n2 (20) corresponding to the respective virtual cameras are displayed again.

Figure 13:
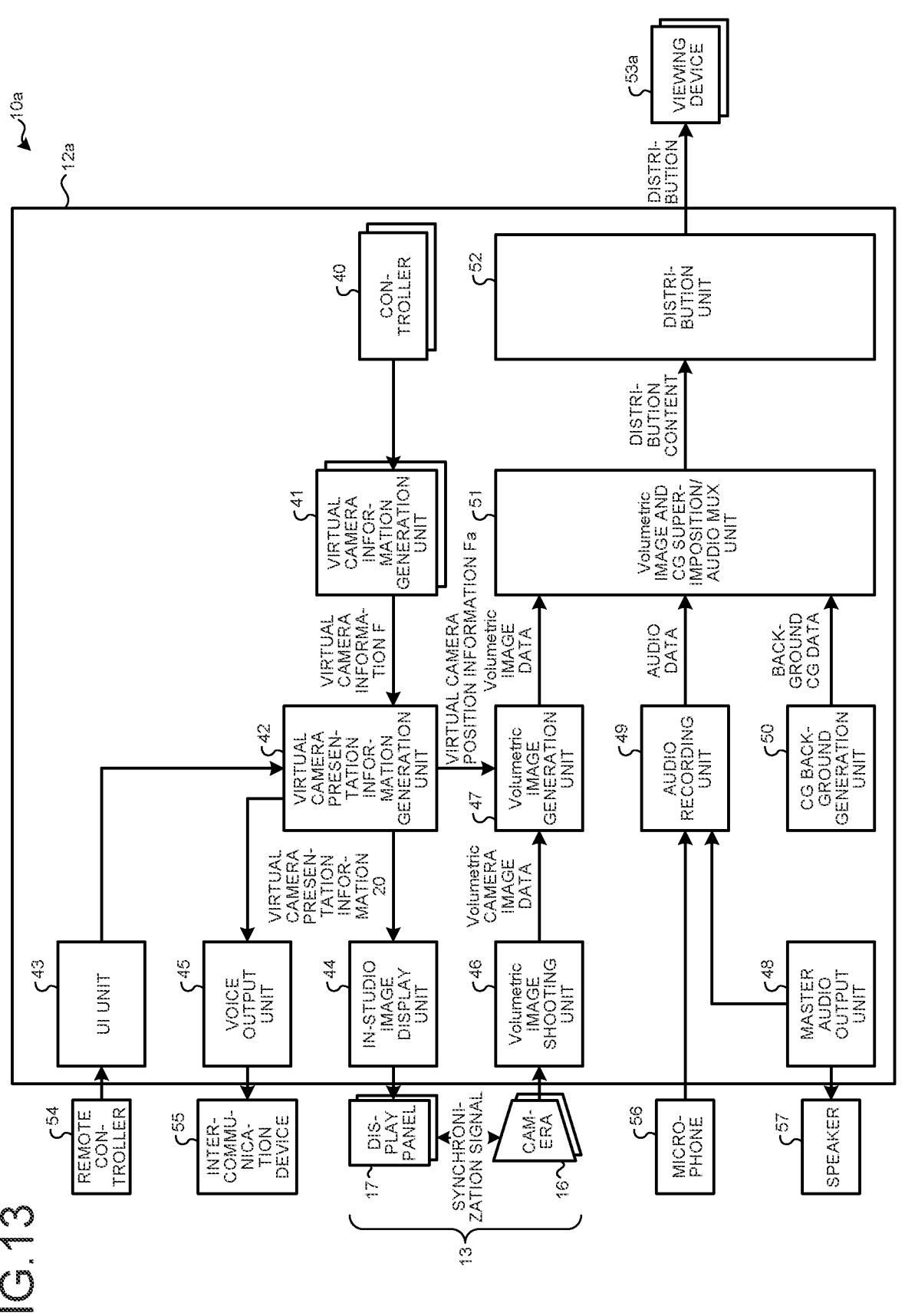
FIG. 13 is a functional block diagram illustrating an example of a functional configuration of the image processing system according to the first embodiment.
Figure 14:
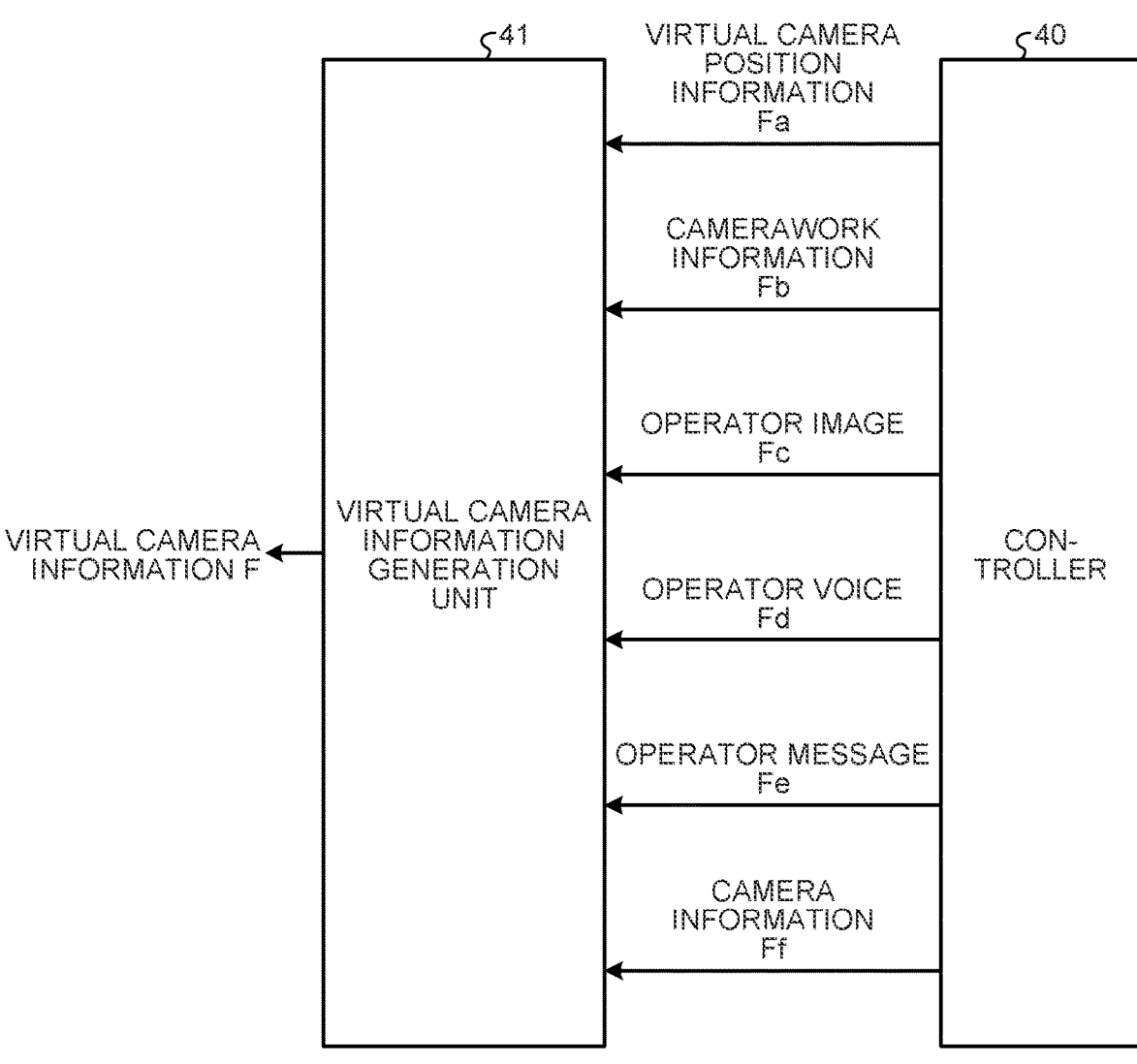
FIG. 14 is a diagram illustrating an example of input/output information of a virtual camera information generation unit.

1-7. Functional Configuration of Image Processing System of First Embodiment Next, a functional configuration of the image processing system 10a will be described with reference to FIGS. 13 and 14. FIG. 13 is a functional block diagram illustrating an example of a functional configuration of the image processing system according to the first embodiment. FIG. 14 is a diagram illustrating an example of input/output information of a virtual camera information generation unit.

As illustrated in FIG. 13, the image processing system 10a includes the image processing apparatus 12a, and the cameras 16 and the display panels 17 configuring the imaging and display device 13. The image processing system 10a includes a remote controller 54, an intercommunication device 55, a microphone 56, a speaker 57, and a viewing device 53a that are peripheral devices. Since the functions of the cameras 16 and the display panels 17 are described above, the description thereof will be omitted.

The image processing apparatus 12a includes a controller 40, a virtual camera information generation unit 41, a virtual camera presentation information generation unit 42, a UI unit 43, an in-studio image display unit 44, a voice output unit 45, a volumetric image shooting unit 46, a volumetric image generation unit 47, a master audio output unit 48, an audio recording unit 49, a CG background generation unit 50, a volumetric image and CG superimposition/audio MUX unit 51, and a distribution unit 52. These functional units are implemented by a CPU of the image processing apparatus 12a having a configuration of a computer executing a control program (not illustrated) for controlling the operation of the image processing apparatus 12a. In addition, all or some of the functions of the image processing apparatus 12a may be implemented by hardware.

The controller 40 generates information regarding the virtual camera. The controller 40 is, for example, an information input device including an operation device such as a joystick and a selection button, and sets the position of the virtual viewpoint, the camerawork information, and the like according to an operation instruction by the user. Note that the image processing apparatus 12a can set a plurality of virtual viewpoints by including a plurality of controllers 40.

In addition, the controller 40 includes a camera and a microphone (not illustrated). The camera included in the controller 40 captures an image of the operator who controls the virtual viewpoint. Furthermore, the microphone included in the controller 40 acquires an utterance (voice) of the operator who controls the virtual viewpoint.

The controller 40 further includes the operation device such as the selection button for selecting and transmitting a message of the operator who controls the virtual viewpoint.

The virtual camera information generation unit 41 acquires information regarding the virtual viewpoint and information regarding the operator from the controller 40. The information regarding the virtual viewpoint includes, for example, virtual camera position information Fa, camerawork information Fb, and camera information Ff illustrated in FIG. 14. Furthermore, the information regarding the operator includes, for example, an operator image Fc, an operator voice Fd, and an operator message Fe illustrated in FIG. 14. Note that the virtual camera information generation unit 41 is an example of a second acquisition unit in the present disclosure.

The virtual camera position information Fa includes position coordinates of the virtual camera, a direction of the virtual camera, and a field of the virtual camera. The virtual camera position information Fa is set by an operation of the operation device such as the joystick provided in the controller 40.

The camerawork information Fb is information regarding the movement trajectory of the virtual camera. Specifically, the camerawork information Fb includes a camerawork start position, a camerawork end position, a trajectory between the start position and the end position, a moving speed of the virtual camera, and a name of the camerawork. The camerawork information Fb is set by an operation of the operation device such as the selection button provided in the controller 40.

The camera information Ff includes information regarding the virtual viewpoint, such as a camera number, a camera name, a camera state, a camera icon/image, and a camera priority.

The operator image Fc is an image obtained by imaging the operator himself/herself who controls the virtual viewpoint. The image processing apparatus 12a may display the operator image Fc in the virtual camera presentation information 20 instead of the cameraperson icon 32 (see FIG. 7).

The operator voice Fd is a voice message transmitted to the subject 22 by the operator who controls the virtual viewpoint.

The operator message Fe is a text message transmitted to the subject 22 by the operator who controls the virtual viewpoint. The operator message Fe is set by an operation of the operation device such as the selection button provided in the controller 40.

The virtual camera information generation unit 41 generates virtual camera information F (see FIG. 14) in which various types of information acquired are grouped for each virtual camera. Then, the virtual camera information generation unit 41 transmits the generated virtual camera information F to the virtual camera presentation information generation unit 42. For the camerawork information Fb, a reproduction state of the camerawork is managed inside the virtual camera information generation unit 41, and the position information of the virtual camera is sequentially updated when the reproduction of the camerawork is in progress.

The virtual camera presentation information generation unit 42 generates the virtual camera presentation information 20 to be presented on the display panel 17. More specifically, the virtual camera presentation information generation unit 42 generates information regarding the virtual viewpoint used in rendering, from the 3D model 22M of the subject 22, an image in a form corresponding to the viewing device of the user. More specifically, based on position coordinates of the virtual camera and the camera information included in the virtual camera information F, the virtual camera presentation information 20 is generated by changing the display color of the tally lamp 31, combining the plurality of pieces of virtual camera presentation information 20, generating the camera position display icon 34 indicating that the virtual camera is on the ceiling or the floor, and the like as necessary. Furthermore, the virtual camera presentation information generation unit 42 generates a voice output to be output from the voice output unit 45.

The UI unit 43 changes settings of various parameters used by the image processing apparatus 12a from the remote controller 54 possessed by the subject 22 or a director. The subject 22 selects, by operating the UI unit 43, a specific operator who controls the virtual viewpoint and talk with the selected operator. Note that the UI unit 43 is an example of a selection unit in the present disclosure.

The in-studio image display unit 44 displays the virtual camera presentation information 20 received from the virtual camera presentation information generation unit 42 at corresponding positions on the plurality of display panels 17. Note that the in-studio image display unit 44 is an example of a presentation unit in the present disclosure.

The voice output unit 45 outputs voice data received from the virtual camera information F to the intercommunication device 55. As a result, various instructions of the operator who controls the virtual viewpoint are transmitted to the subject 22.

The volumetric image shooting unit 46 captures real images of the subject 22 simultaneously from a plurality of directions by using a plurality of externally synchronized cameras 16 arranged around the subject 22. In addition, the volumetric image shooting unit 46 transmits the real camera image I obtained by shooting to the volumetric image generation unit 47 as volumetric camera image data including a frame number and identification information for specifying a shooting camera 16. The volumetric image shooting unit 46 is an example of a first acquisition unit in the present disclosure.

The volumetric image generation unit 47 receives the volumetric camera image data from the volumetric image shooting unit 46 and performs a volumetric image generation process. Note that the volumetric image generation unit 47 holds calibration data obtained by performing internal calibration for correcting distortion of the camera 16 and external calibration for obtaining a relative position the cameras 16, and corrects the real camera image I captured using the calibration data. Then, based on the volumetric camera image data acquired by the volumetric image shooting unit 46, the volumetric image generation unit 47 performs a modeling process of the subject 22, i.e., generation of the 3D model 22M. Then, the volumetric image generation unit 47 renders a volumetric image from the 3D model 22M of the subject 22 viewed from the virtual viewpoint based on the virtual camera position information acquired. The volumetric image generation unit 47 transmits the rendered volumetric image, the frame number, and the virtual camera information F to the volumetric image and CG superimposition/audio MUX unit 51. Note that volumetric image generation unit 47 is an example of a generation unit in the present disclosure.

The master audio output unit 48 outputs, from the speaker 57, music for singing or dancing by the subject 22. Furthermore, the master audio output unit 48 transmits audio data of the music to the audio recording unit 49.

The audio recording unit 49 mixes the audio data from the master audio output unit 48 and audio data input from the microphone 56 (e.g., singing data of the subject 22) to generate mixed audio data, and sends the mixed audio data to the volumetric image and CG superimposition/audio MUX unit 51.

The CG background generation unit 50 generates background CG data with a frame number based on background CG data prepared in advance. Then, the CG background generation unit 50 transmits the generated background CG data to the volumetric image and CG superimposition/audio MUX unit 51.

The volumetric image and CG superimposition/audio MUX unit 51 performs rendering and superimposing the volumetric image data and background CG data acquired, based on the virtual camera position information included in the volumetric image data, to generate, for example, a 2D image viewed from the virtual viewpoint. Then, the volumetric image and CG superimposition/audio MUX unit 51 transmits distribution content obtained by multiplexing (MUX) the generated 2D image and audio information to the distribution unit 52. Note that, when the viewing device 53a of the user is a device capable of displaying three-dimensional information, the volumetric image and CG superimposition/audio MUX unit 51 generates a 3D image by rendering a 3D image from the 3D model 22M of the subject 22.

The distribution unit 52 distributes the content received from the volumetric image and CG superimposition/audio MUX unit 51 to the viewing device 53a.

The remote controller 54 provided as the peripheral device changes settings of various parameters used by the image processing apparatus 12a.

The intercommunication device 55 is worn by the subject 22 to listen to voice of the operator who controls the virtual viewpoint.

The microphone 56 records a singing voice and a conversation of the subject 22.

The speaker 57 outputs music or the like to which the subject 22 listens at during shooting.

The viewing device 53a is a device used by the user to view the content distributed from 12a. The viewing device 53a is, for example, a tablet terminal or a smartphone.

1-8. Overall Flow of Processing Performed by Image Processing System of First Embodiment An overall flow of processing performed by the image processing system 10a will be described with reference to FIG. 15.

The virtual camera information generation unit 41 performs a virtual camera information generation process for generating the virtual camera information F (Step S11). Note that details of the virtual camera information generation process will be described later (see FIG. 16).

The virtual camera presentation information generation unit 42 performs a virtual camera presentation information generation process for generating the virtual camera presentation information 20 (Step S12). Note that details of the virtual camera presentation information generation process will be described later (see FIG. 17).

The in-studio image display unit 44 performs a virtual camera presentation information output process for generating an image to present the virtual camera presentation information 20 at a corresponding position on the display panel 17 and outputting the generated image to the display panel 17 (Step S13). Note that details of the virtual camera presentation information output process will be described later (See FIGS. 17 and 27).

The volumetric image generation unit 47 performs a volumetric image generation process for generating a volumetric image based on the volumetric camera image data received from the volumetric image shooting unit 46 (Step S14). Note that the flow of the volumetric image generation process will be described later (see FIG. 28).

The volumetric image and CG superimposition/audio MUX unit 51 performs a superimposition process of the volumetric image and the background image (Step S15). Note that a flow of the superimposition process of the volumetric image and the background image will be described later (see FIG. 29).

The distribution unit 52 performs a distribution process for distributing the content received from the volumetric image and CG superimposition/audio MUX unit 51 to the viewing device 53a (Step S16).

1-9. Flow of Virtual Camera Information Generation Process

Figure 15:
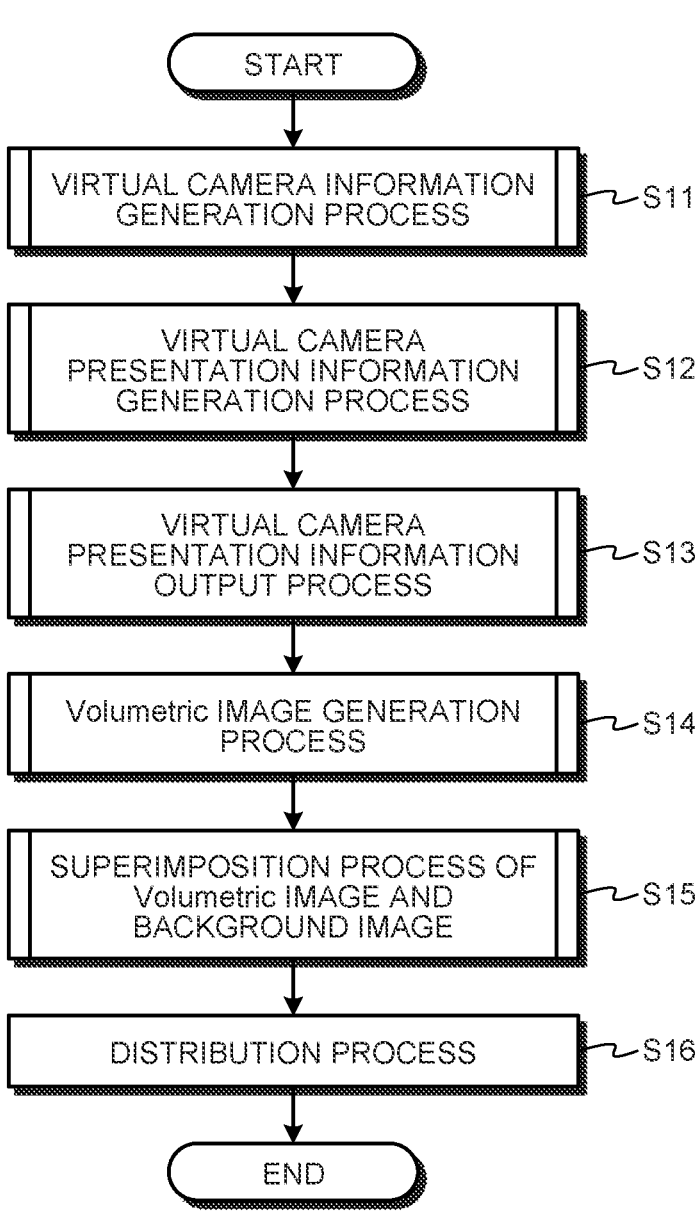
FIG. 15 is a flowchart illustrating an example of a flow of a process implemented by the image processing system according to the first embodiment.
Figure 16:
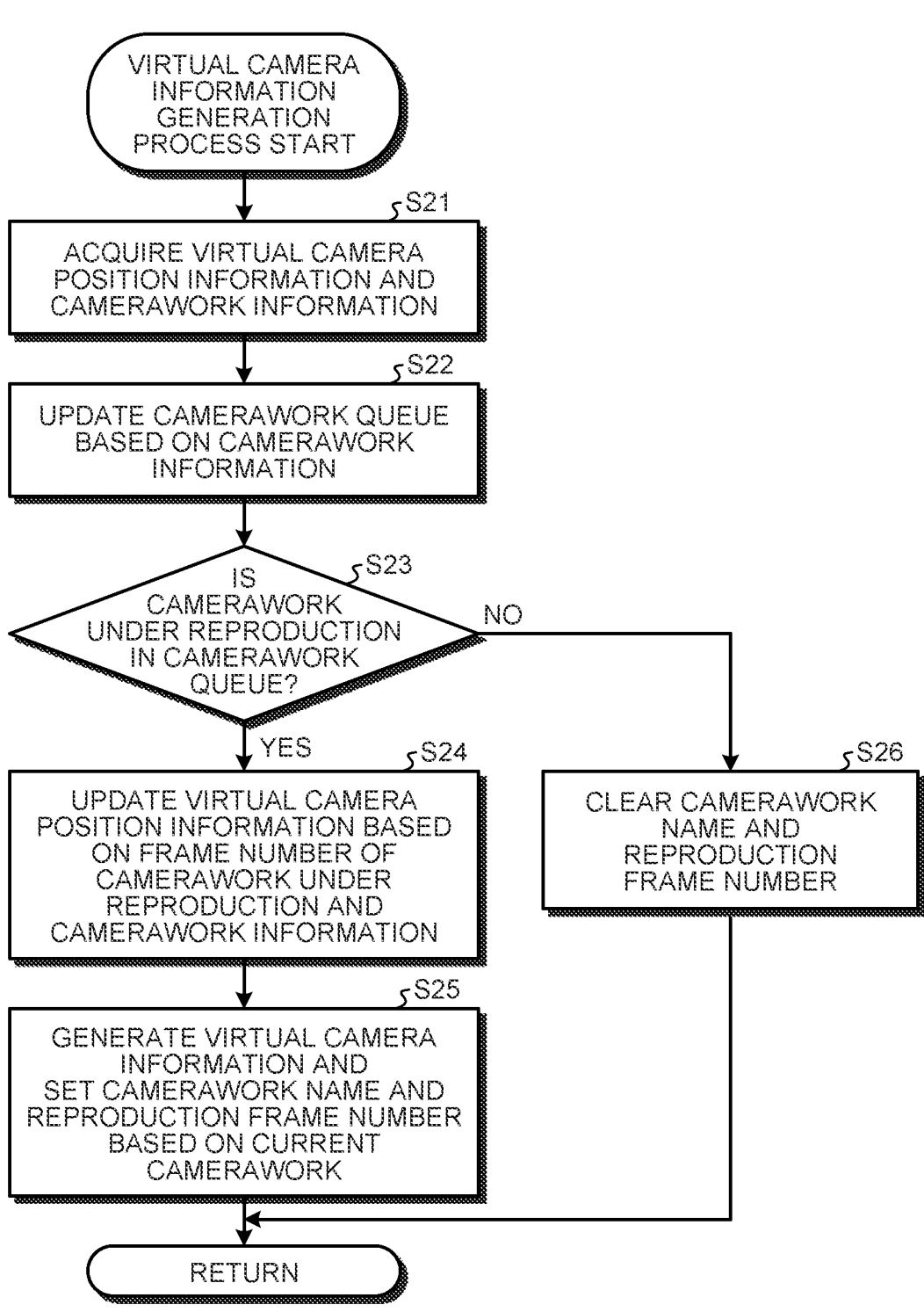
FIG. 16 is a flowchart illustrating an example of a flow of a virtual camera information generation process in FIG. 15.

A flow of the virtual camera information generation process will be described with reference to FIG. 16. FIG. 16 is a flowchart illustrating an example of a flow of the virtual camera information generation process in FIG. 15.

The virtual camera information generation unit 41 acquires the virtual camera position information Fa and the camerawork information Fb from the controller 40 (Step S21).

The virtual camera information generation unit 41 updates a camerawork queue based on the camerawork information Fb (Step S22).

The virtual camera information generation unit 41 determines whether there is camerawork under reproduction in the camerawork queue (Step S23). When it is determined that there is a camerawork under reproduction (Step S23: Yes), the process proceeds to Step S24. On the other hand, when it is determined that there is no camerawork under reproduction (Step S23: No), the process proceeds to Step S26.

When it is determined in Step S23 that there is a camerawork under reproduction, the virtual camera information generation unit 41 updates the virtual camera position information Fa based on the frame number of the camerawork under reproduction and the camerawork information Fb (Step S24).

Next, the virtual camera information generation unit 41 generates the virtual camera information F, and sets a camerawork name and a reproduction frame number based on the current camerawork (Step S25). Then, the process returns to the main routine (FIG. 15).

On the other hand, when it is determined in Step S23 that there is no camerawork under reproduction, the virtual camera information generation unit 41 clears the camerawork name and the reproduction frame number to maintain the position of the virtual camera at that time (Step S26). Then, the process returns to the main routine (FIG. 15).

1-10. Flow of Virtual Camera Presentation Information Generation Process

Figure 17:
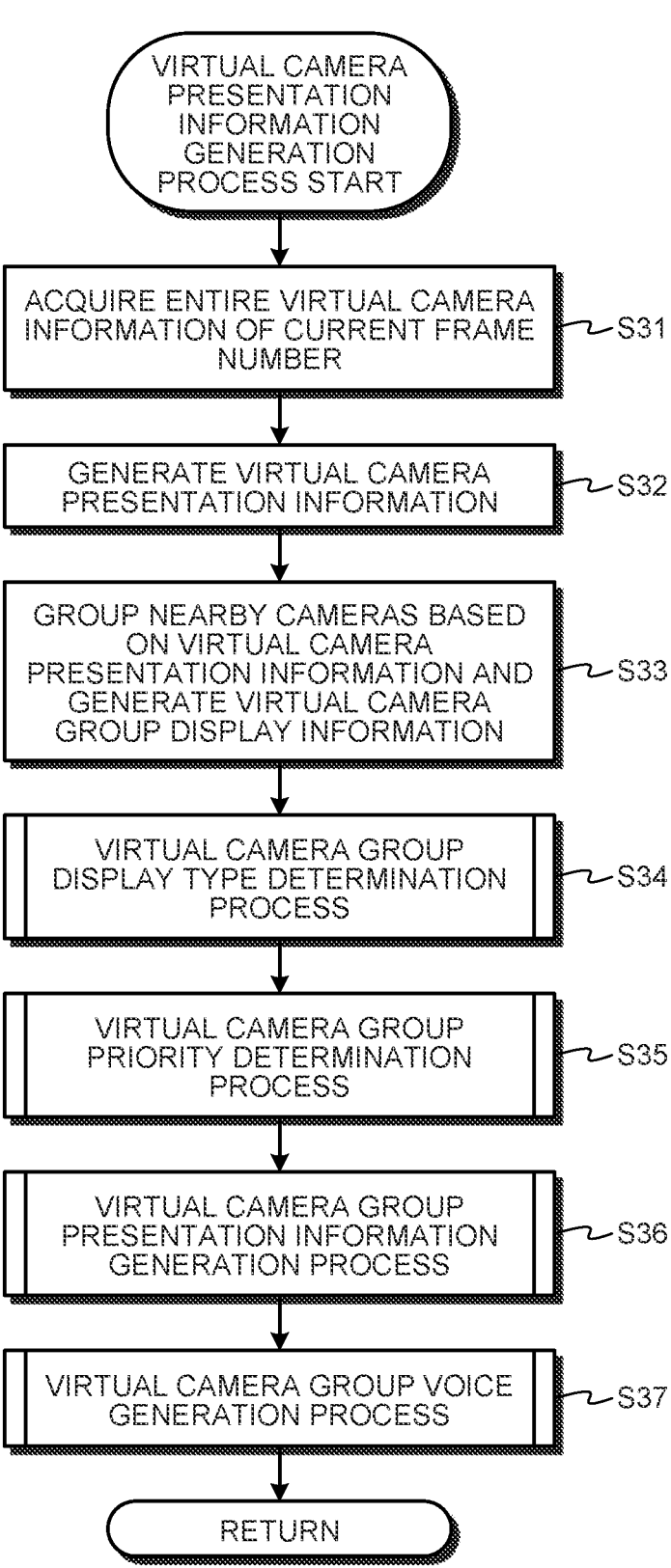
FIG. 17 is a flowchart illustrating an example of a flow of a virtual camera presentation information generation process in FIG. 15.

A flow of the virtual camera information generation process will be described with reference to FIG. 17. FIG. 17 is a flowchart illustrating an example of the flow of the virtual camera presentation information generation process in FIG. 15.

The virtual camera presentation information generation unit 42 acquires all the virtual camera information F of the current frame number (Step S31).

The virtual camera presentation information generation unit 42 generates the virtual camera presentation information 20 (Step S32).

The virtual camera presentation information generation unit 42 generates the virtual camera group presentation information 200 by grouping nearby cameras based on the virtual camera presentation information 20 generated (Step S33).

The virtual camera presentation information generation unit 42 performs a virtual camera group display type determination process based on the virtual camera group presentation information 200 (Step S34). Note that details of the virtual camera group display type determination process will be described later (see FIG. 18).

The virtual camera presentation information generation unit 42 performs a virtual camera group priority determination process for sorting the virtual camera information F included in the same group based on the camera state and the camera priority (Step S35). Note that details of the virtual camera group priority determination process will be described later (see FIG. 19).

The virtual camera presentation information generation unit 42 performs a virtual camera group presentation information generation process for generating the virtual camera group presentation information 200 (Step S36). Note that details of the virtual camera group presentation information generation process will be described later (see FIG. 20).

The virtual camera presentation information generation unit 42 performs a virtual camera group voice generation process for generating a voice output to be presented to the subject 22 (Step S37). Note that details of the virtual camera group voice generation process will be described later (see FIG. 26). Then, the process returns to the main routine (FIG. 15).

1-10-1. Flow of Virtual Camera Group Display Type Determination Process

Figure 18:
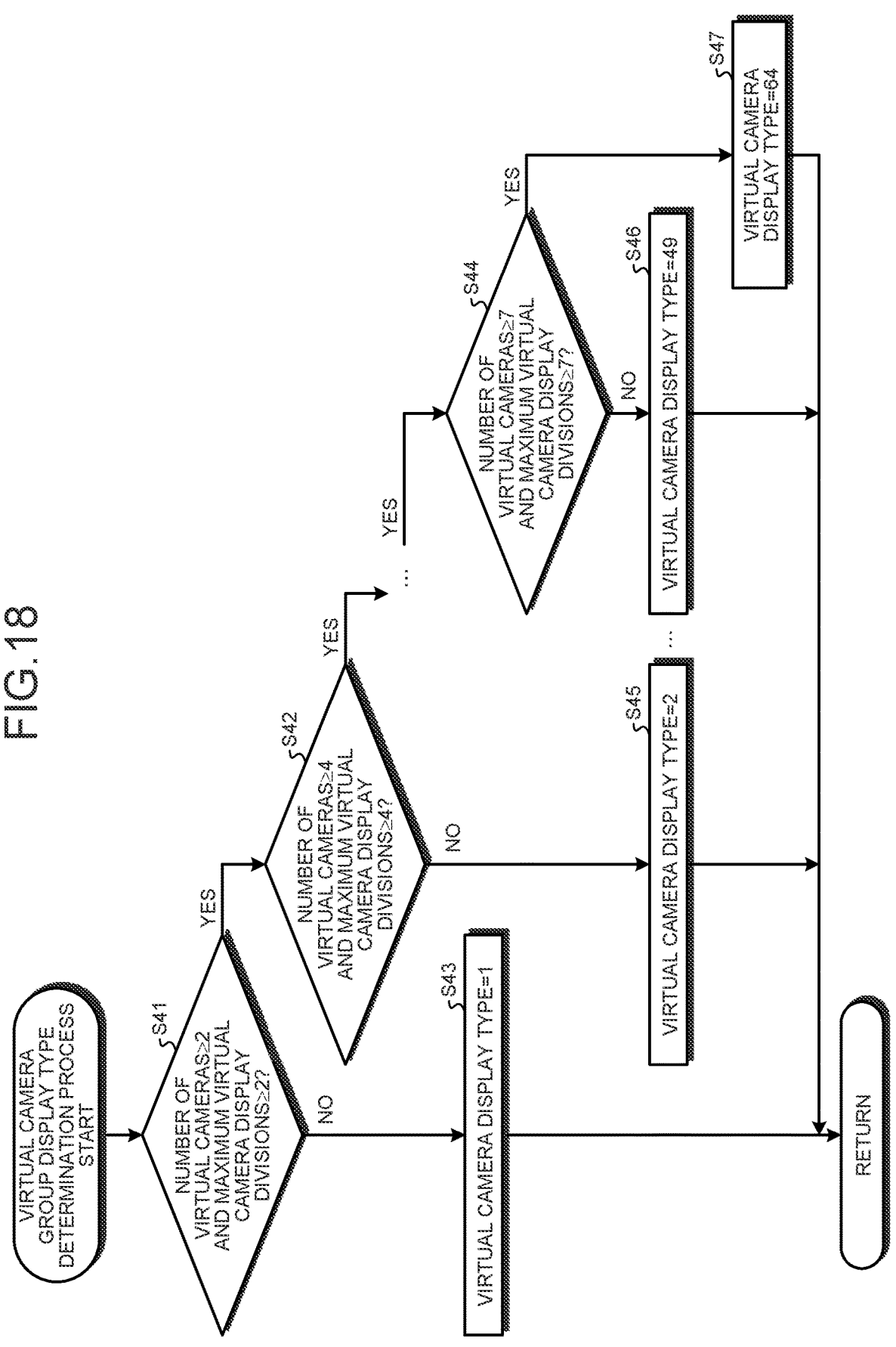
FIG. 18 is a flowchart illustrating an example of a flow of a virtual camera group display type determination process in FIG. 17.

A flow of the virtual camera group display type determination processing illustrated in Step S34 in FIG. 17 will be described with reference to FIG. 18. FIG. 18 is a flowchart illustrating an example of the flow of the virtual camera group display type determination process in FIG. 17.

The virtual camera presentation information generation unit 42 determines whether the number of virtual cameras is two or more and the maximum number of divisions is two or more for group display of the virtual cameras (Step S41). When the condition is satisfied (Step S41: Yes), the process proceeds to Step S42. On the other hand, when the condition is not satisfied (Step S41: No), the process proceeds to Step S43.

When it is determined in Step S41 that the condition is satisfied, the virtual camera presentation information generation unit 42 determines whether the number of virtual cameras is four or more and the maximum number of divisions is four or more for the group display of the virtual cameras (Step S42). When the condition is satisfied (Step S42: Yes), the number of virtual cameras and the maximum number of divisions for group display of the virtual cameras are increased, and the determination similar to Steps S41 and S42 is continued. On the other hand, when the condition is not satisfied (Step S42: No), the process proceeds to Step S45.

The same determination as in Steps S41 and S42 is continued, and when it is determined that the condition is satisfied, the virtual camera presentation information generation unit 42 determines whether the number of virtual cameras is seven or more, and the maximum number of divisions is seven or more for the group display of the virtual cameras (Step S44). When the condition is satisfied (Step S44: Yes), the process proceeds to Step S47. On the other hand, when the condition is not satisfied (Step S44: No), the process proceeds to Step S46.

When it is determined in Step S41 that the condition is not satisfied (Step S41: No), the virtual camera presentation information generation unit 42 sets the virtual camera display type to 1, i.e., one virtual camera display division (Step S43). Thereafter, the process returns to the flowchart in FIG. 17.

When it is determined in Step S42 that the condition is not satisfied (Step S42: No), the virtual camera presentation information generation unit 42 sets the virtual camera display type to 2, i.e., two virtual camera display divisions (Step S43). Thereafter, the process returns to the flowchart in FIG. 17.

When it is determined in Step S44 that the condition is not satisfied (Step S44: Yes), the virtual camera presentation information generation unit 42 sets the virtual camera display type to 64, i.e., 64 virtual camera display divisions (Step S43). Thereafter, the process returns to the flowchart in FIG. 17.

When it is determined in Step S44 that the condition is not satisfied (Step S44: No), the virtual camera presentation information generation unit 42 sets the virtual camera display type to 49, i.e., 49 virtual camera display divisions (Step S43). Thereafter, the process returns to the flowchart in FIG. 17.

1-10-2. Flow of Virtual Camera Group Priority Determination Process

Figure 19:
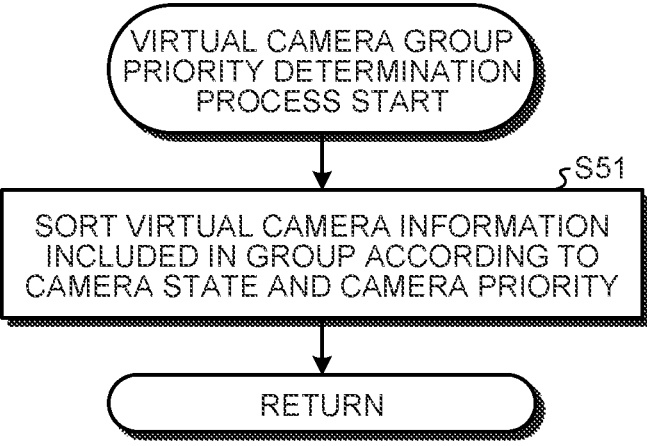
FIG. 19 is a flowchart illustrating an example of a flow of a virtual camera group priority determination process in FIG. 17.

A flow of the virtual camera group priority determination process illustrated in Step S35 in FIG. 17 will be described with reference to FIG. 19. FIG. 19 is a flowchart illustrating an example of the flow of the virtual camera group priority determination process in FIG. 17.

The virtual camera presentation information generation unit 42 sorts the virtual camera information F included in the same group according to the camera state and the camera priority (Step S51). Thereafter, the process returns to the flowchart in FIG. 17.

Figure 20:
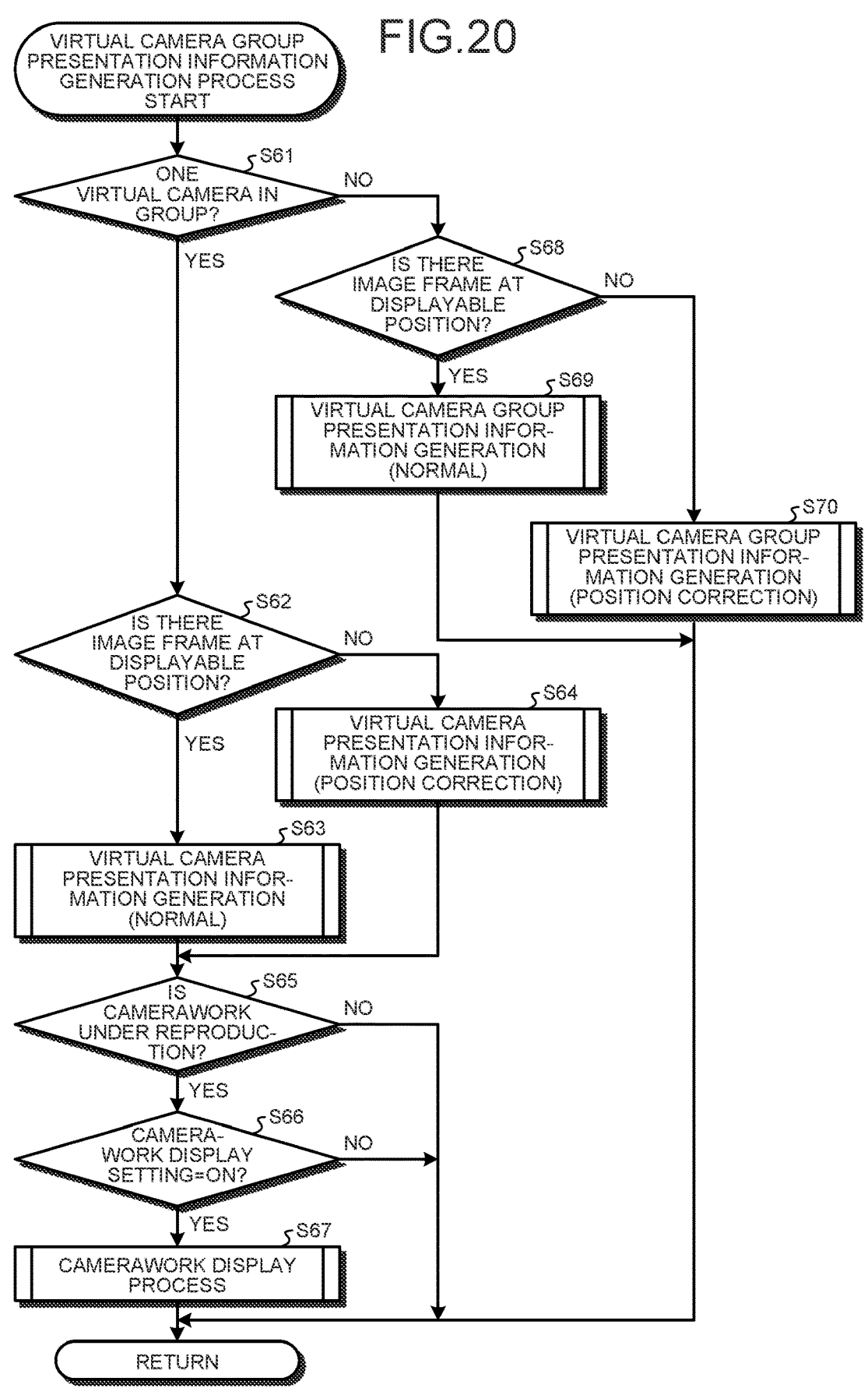
FIG. 20 is a flowchart illustrating an example of a flow of a virtual camera group presentation information generation process in FIG. 17.

1-10-3. Flow of Virtual Camera Group Presentation Information Generation Process A flow of the virtual camera group presentation information generation process illustrated in Step S36 in FIG. 17 will be described with reference to FIG. 20. FIG. 20 is a flowchart illustrating an example of the flow of the virtual camera group presentation information generation process in FIG. 17.

The virtual camera presentation information generation unit 42 determines whether there is one virtual camera included in the group (Step S61). When it is determined that there is one virtual camera included in the group (Step S61: Yes), the process proceeds to Step S62. On the other hand, when it is not determined that there is one virtual camera included in the group (Step S61: No), the process proceeds to Step S68.

When it is determined in Step S61 that there is one virtual camera included in the group, the virtual camera presentation information generation unit 42 determines whether the image frame is available at a displayable position (Step S62). When it is determined that the image frame is available at the displayable position (Step S62: Yes), the process proceeds to Step S63. On the other hand, when it is not determined that the image frame is at the displayable position (Step S62: No), the process proceeds to Step S64.

When it is determined in Step S62 that the image frame is available at the displayable position, the virtual camera presentation information generation unit 42 generates the normal virtual camera presentation information 20 (Step S63). Thereafter, the process proceeds to Step S65. Note that a detailed flow of the process performed in Step S63 will be described later (see FIG. 21).

When it is not determined in Step S62 that the image frame is available at the displayable position, the virtual camera presentation information generation unit 42 generates position-corrected virtual camera presentation information 20 (Step S64). Thereafter, the process proceeds to Step S65. Note that a detailed flow of the process performed in Step S64 will be described later (see FIG. 22).

Following Step S63 or Step S64, the virtual camera presentation information generation unit 42 determines whether the camerawork is under reproduction (Step S65).

When it is determined that the camerawork is under reproduction (Step S65: Yes), the process proceeds to Step S66. On the other hand, when it is not determined that the camerawork is under reproduction, the process returns to the flowchart in FIG. 17.

When it is determined in Step S65 that the camerawork is under reproduction, the virtual camera presentation information generation unit 42 determines whether the camerawork display setting is turned on (Step S66). When it is determined that the camerawork display setting is turned on (Step S66: Yes), the process proceeds to Step S67. On the other hand, when it is not determined that the camerawork display setting is turned on (Step S66: No), the process returns to the flowchart in FIG. 17.

When it is determined in Step S66 that the camerawork display setting is turned on, the virtual camera presentation information generation unit 42 performs a camerawork display process (Step S67). Thereafter, the process returns to the flowchart in FIG. 17. Note that a detailed flow of the process performed in Step S67 will be described later (see FIG. 25).

Returning to Step S61, when it is not determined in Step S61 that there is one virtual camera included in the group, the virtual camera presentation information generation unit 42 determines whether the image frame is available at the displayable position (Step S68). When it is determined that the image frame is available at the displayable position (Step S68: Yes), the process proceeds to Step S69. On the other hand, when it is not determined that the image frame is available at the displayable position (Step S68: No), the process proceeds to Step S70.

When it is determined in Step S68 that the image frame is available at the displayable position, the virtual camera presentation information generation unit 42 generates the normal virtual camera group presentation information 200 (Step S69). Thereafter, the process returns to the flowchart in FIG. 17. Note that a detailed flow of the process performed in Step S68 will be described later (see FIG. 23).

When it is not determined in Step S68 that the image frame is available at the displayable position, the virtual camera presentation information generation unit 42 generates position-corrected virtual camera group presentation information 200 whose position (Step S70). Thereafter, the process returns to the flowchart in FIG. 17. Note that a detailed flow of the process performed in Step S70 will be described later (see FIG. 24).

Figure 21:
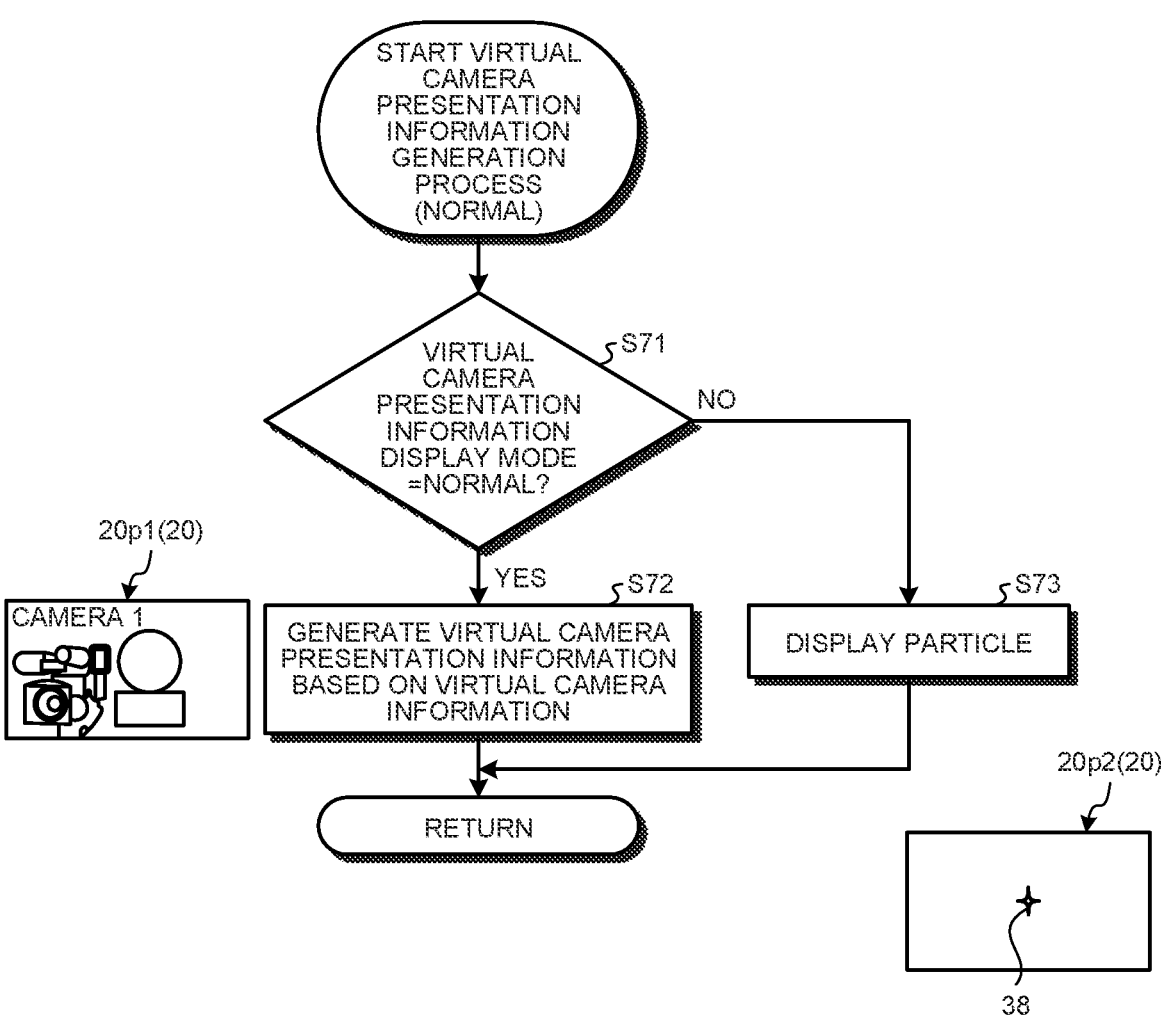
FIG. 21 is a flowchart illustrating an example of a flow of a virtual camera presentation information generation process (normal) in FIG. 20.

Next, a flow of normal process for generating the virtual camera presentation information 20 will be described with reference to FIG. 21. FIG. 21 is a flowchart illustrating an example of a flow of a virtual camera presentation information generation process (normal) in FIG. 20.

The virtual camera presentation information generation unit 42 determines whether the display mode of the virtual camera presentation information 20 is normal (Step S71). When it is determined that the display mode of the virtual camera presentation information 20 is normal (Step S71: Yes), the process proceeds to Step S72. On the other hand, when it is not determined that the display mode of the virtual camera presentation information 20 is normal (Step S71: No), the process proceeds to Step S73.

When it is determined in Step S71 that the display mode of the virtual camera presentation information 20 is normal, the virtual camera presentation information generation unit 42 generates the virtual camera presentation information 20 based on the virtual camera information F (Step S72). Thereafter, the process returns to the flowchart in FIG. 20. Note that virtual camera presentation information 20*p*1 (20)

illustrated in FIG. 21 is an example of the virtual camera presentation information generated in Step S72.

On the other hand, when it is not determined in Step S71 that the display mode of the virtual camera presentation information 20 is normal, the virtual camera presentation information generation unit 42 generates the virtual camera presentation information 20 in which a particle 38 representing the virtual camera is drawn (Step S73). Thereafter, the process returns to the flowchart in FIG. 20. Note that virtual camera presentation information 20*p*2 (20) illustrated in FIG. 21 is an example of the virtual camera presentation information generated in Step S73.

Figure 22:
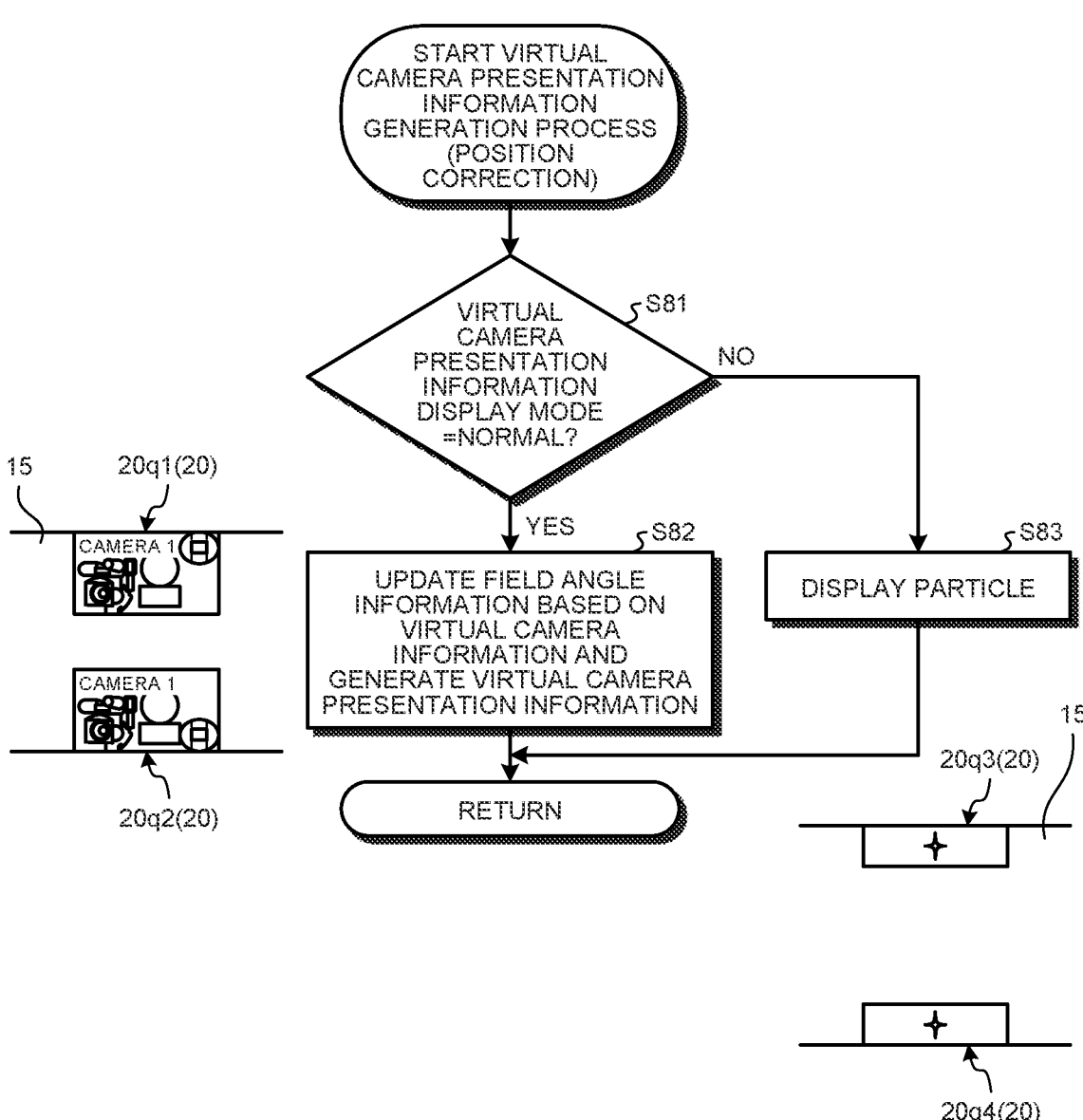
FIG. 22 is a flowchart illustrating an example of a flow of a virtual camera presentation information generation process (position correction) in FIG. 20.

Next, a flow of a generation process of the virtual camera presentation information 20 after position correction will be described with reference to FIG. 22. FIG. 22 is a flowchart illustrating an example of a flow of a virtual camera presentation information generation process (position correction) in FIG. 20.

The virtual camera presentation information generation unit 42 determines whether the display mode of the virtual camera presentation information 20 is normal (Step S81). When it is determined that the display mode of the virtual camera presentation information 20 is normal (Step S81: Yes), the process proceeds to Step S82. On the other hand, when it is not determined that the display mode of the virtual camera presentation information 20 is normal (Step S81: No), the process proceeds to Step S83.

When it is determined in Step S81 that the display mode of the virtual camera presentation information 20 is normal, the virtual camera presentation information generation unit 42 updates field angle information based on the virtual camera information F and generates the virtual camera presentation information 20 (Step S82). Thereafter, the process returns to the flowchart in FIG. 20. Note that the virtual camera presentation information 20*q*1 (20) and 20*q*2 (20) illustrated in FIG. 22 are examples of the virtual camera presentation information generated in Step S82 and displayed on the inner wall surface 15.

On the other hand, when it is not determined in Step S81 that the display mode of the virtual camera presentation information 20 is normal, the virtual camera presentation information generation unit 42 generates the virtual camera presentation information 20 in which a particle representing the virtual camera is drawn (Step S83). Thereafter, the process returns to the flowchart in FIG. 20. Note that virtual camera presentation information 20*q*3 (20) and 20*q*4 (20) illustrated in FIG. 22 are examples of the virtual camera presentation information generated in Step S83 and displayed on the inner wall surface 15.

Figure 23:
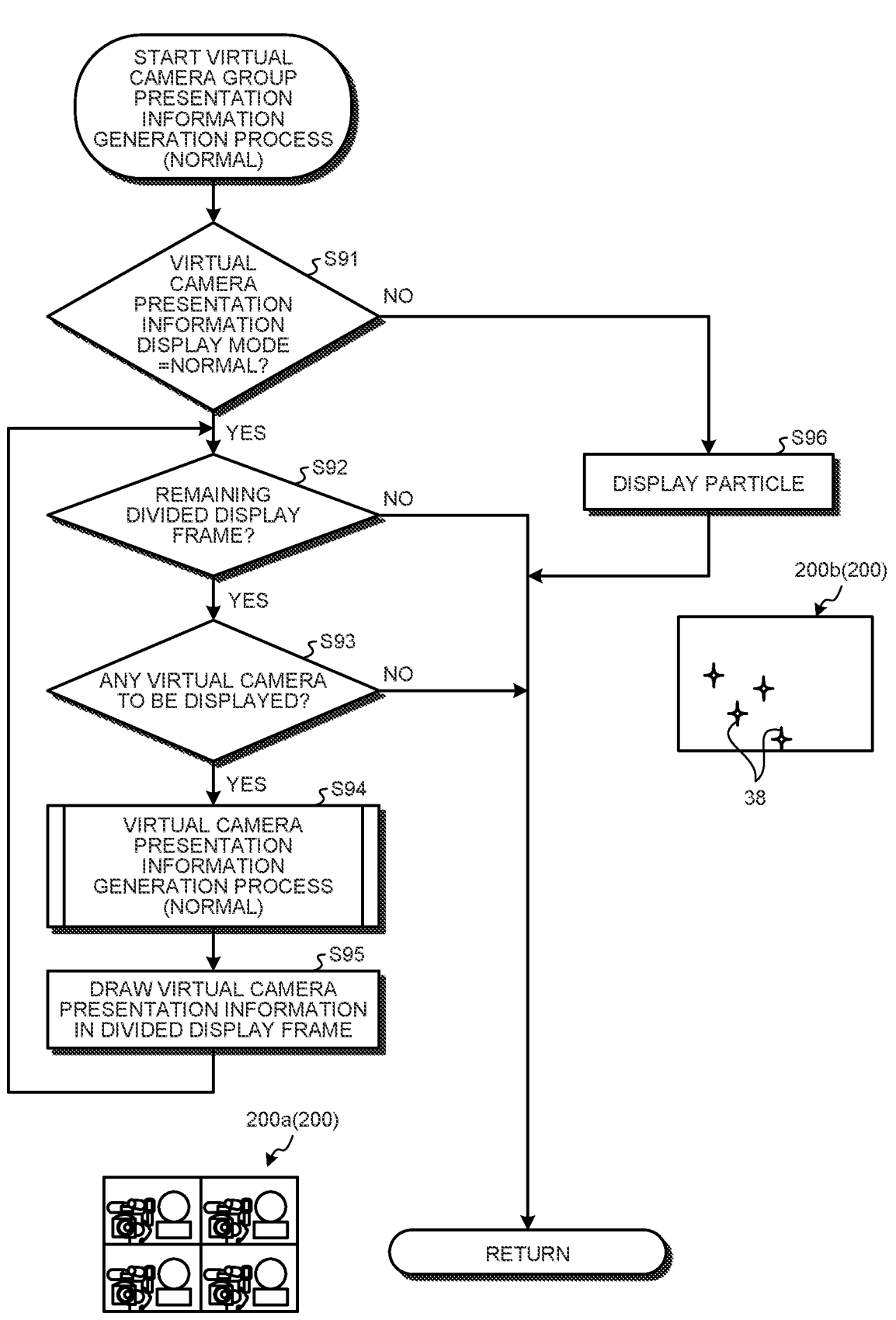
FIG. 23 is a flowchart illustrating an example of a flow of a virtual camera group presentation information generation process (normal) in FIG. 20.

Next, a flow of a normal process for generating the virtual camera group presentation information 200 will be described with reference to FIG. 23. FIG. 23 is a flowchart illustrating an example of a flow of a virtual camera group presentation information generation process (normal) in FIG. 20.

The virtual camera presentation information generation unit 42 determines whether the display mode of the virtual camera presentation information 20 is normal (Step S91). When it is determined that the display mode of the virtual camera presentation information 20 is normal (Step S91: Yes), the process proceeds to Step S92. On the other hand, when it is not determined that the display mode of the virtual camera presentation information 20 is normal (Step S91: No), the process proceeds to Step S96.

When it is determined in Step S91 that the display mode of the virtual camera presentation information 20 is normal, the virtual camera presentation information generation unit

42 determines whether there is a remaining divided display frame in the image frame 21 (Step S92). When it is determined that there is a remaining divided display frame in the image frame 21 (Step S92: Yes), the process proceeds to Step S93. On the other hand, when it is not determined that there is a remaining divided display frame in the image frame 21 (Step S92: No), the process returns to the flowchart in FIG. 20.

When it is determined in Step S92 that there is a remaining divided display frame in the image frame 21, the virtual camera presentation information generation unit 42 determines whether there is a virtual camera to be displayed (Step S93). When it is determined that there is a virtual camera to be displayed (Step S93: Yes), the process proceeds to Step S94. On the other hand, when it is not determined that there is a virtual camera to be displayed (Step S93: No), the process returns to the flowchart in FIG. 20.

When it is determined in Step S93 that there is a virtual camera to be displayed, the virtual camera presentation information generation unit 42 executes the flowchart in FIG. 21 to perform the normal process for generating the virtual camera presentation information 20 (Step S94).

Then, the virtual camera presentation information generation unit 42 draws the virtual camera presentation information 20 generated in Step S94 in the divided display frame (Step S95). Thereafter, the processing returns to Step S92, and the above-described process is repeated. Note that virtual camera presentation information 200*a* (200) illustrated in FIG. 23 is an example of the information generated in Step S95.

On the other hand, when it is not determined in Step S91 that the display mode of the virtual camera presentation information 20 is normal, the virtual camera presentation information generation unit 42 generates the virtual camera group presentation information 200 in which the particles 38 representing the virtual cameras are drawn (Step S96). Thereafter, the process returns to the flowchart in FIG. 20. Note that virtual camera presentation information 200*b* (200) illustrated in FIG. 23 is an example of the information generated in Step S96.

Figure 24:
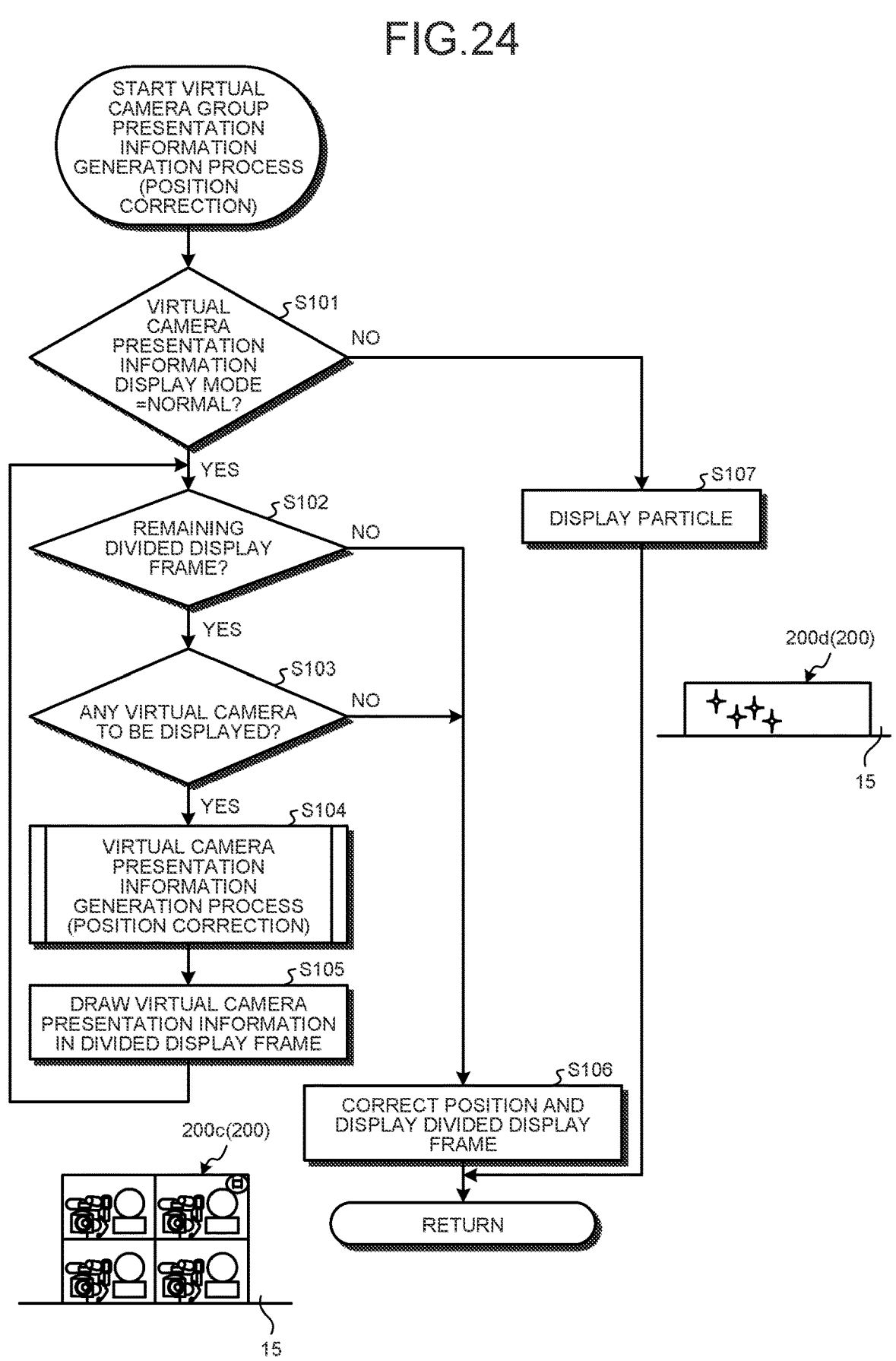
FIG. 24 is a flowchart illustrating an example of a flow of a virtual camera group presentation information generation process (position correction) in FIG. 20.

Next, a flow of a generation process for the virtual camera group presentation information 200 after position correction will be described with reference to FIG. 24. FIG. 24 is a flowchart illustrating an example of a flow of the virtual camera group presentation information generation process (position correction) in FIG. 20.

The virtual camera presentation information generation unit 42 determines whether the display mode of the virtual camera presentation information 20 is normal (Step S101). When it is determined that the display mode of the virtual camera presentation information 20 is normal (Step S101: Yes), the process proceeds to Step S102. On the other hand, when it is not determined that the display mode of the virtual camera presentation information 20 is normal (Step S101: No), the process proceeds to Step S107.

When it is determined in Step S101 that the display mode of the virtual camera presentation information 20 is normal, the virtual camera presentation information generation unit 42 determines whether there is a remaining divided display frame in the image frame 21 (Step S102). When it is determined that there is a remaining divided display frame in the image frame 21 (Step S102: Yes), the process proceeds to Step S103. On the other hand, when it is not determined that there is a remaining divided display frame in the image frame 21 (Step S102: No), the process proceeds to Step S106.

When it is determined in Step S102 that there is a remaining divided display frame in the image frame 21, the virtual camera presentation information generation unit 42 determines whether there is a virtual camera to be displayed (Step S103). When it is determined that there is a virtual camera to be displayed (Step S103: Yes), the process proceeds to Step S104. On the other hand, when it is not determined that there is a virtual camera to be displayed (Step S103: No), the process proceeds to Step S106.

When it is determined in Step S103 that there is a virtual camera to be displayed, the virtual camera presentation information generation unit 42 executes the flowchart in FIG. 22 to perform a process for generating the virtual camera presentation information 20 with corrected position (Step S104).

Then, the virtual camera presentation information generation unit 42 draws the virtual camera presentation information 20 generated in Step S104 in the divided display frame (Step S105). Thereafter, the process returns to Step S102, and the above-described process is repeated. Note that virtual camera presentation information 200c (200) illustrated in FIG. 24 is an example of the virtual camera group presentation information generated in Step S105.

When it is not determined in Step S102 that there is a remaining divided display frame in the image frame 21 or when it is not determined in Step S103 that there is a virtual camera to be displayed, the virtual camera presentation information generation unit 42 corrects the position and displays the divided display frame (Step S106). Thereafter, the process returns to the flowchart in FIG. 20.

Further, when it is not determined in Step S101 that the display mode of the virtual camera presentation information 20 is normal, the virtual camera presentation information generation unit 42 generates the virtual camera group presentation information 200 in which the particles representing the virtual camera are drawn (Step S107). Thereafter, the process returns to the flowchart in FIG. 20. Note that virtual camera presentation information 200d (200) illustrated in FIG. 24 is an example of the virtual camera group presentation information generated in Step S107.

Figure 25:
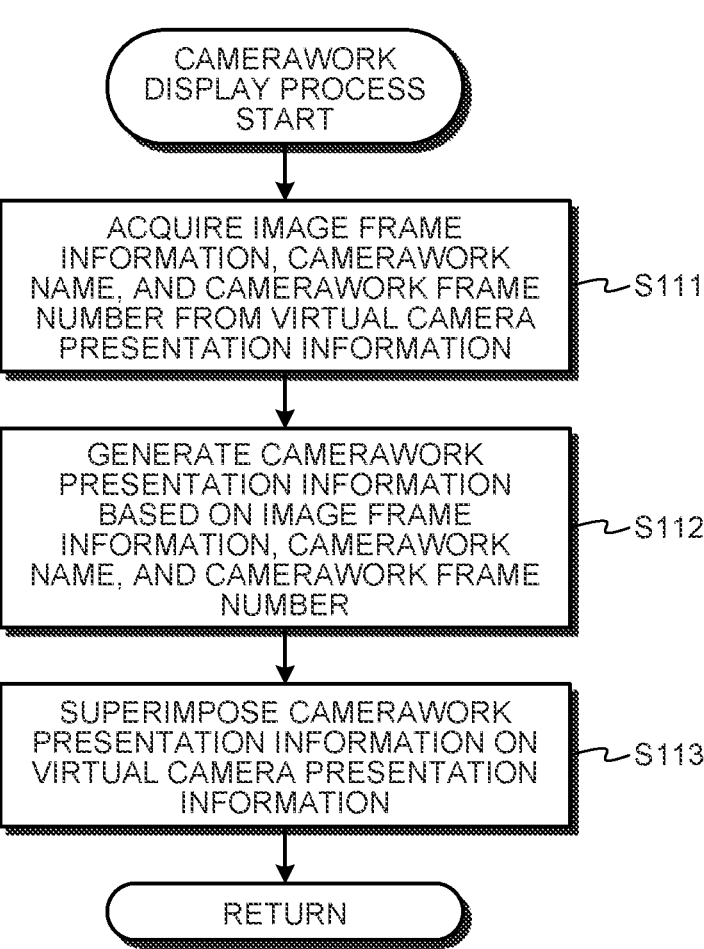
FIG. 25 is a flowchart illustrating an example of a flow of a camerawork display process in FIG. 20.

Next, a flow of the camerawork display process for displaying the camerawork will be described with reference to FIG. 25. FIG. 25 is a flowchart illustrating an example of the flow of the camerawork display process in FIG. 20.

The virtual camera presentation information generation unit 42 acquires image frame information, the camerawork name, and the camerawork frame number from the virtual camera presentation information 20 generated (Step S111). Note that the image frame information is information including the display position of the image frame, the image frame size, and the like.

Next, the virtual camera presentation information generation unit 42 generates the camerawork presentation information based on the image frame information, the camerawork name, and the camerawork frame number (Step S112). Note that the camerawork presentation information is, for example, the camerawork information 35 illustrated in FIG. 11.

Then, the virtual camera presentation information generation unit 42 superimposes the camerawork presentation information on the virtual camera presentation information 20 (Step S113). Thereafter, the process returns to the flowchart in FIG. 20.

1-10-4. Flow of Virtual Camera Group Voice Generation Process

Figure 26:
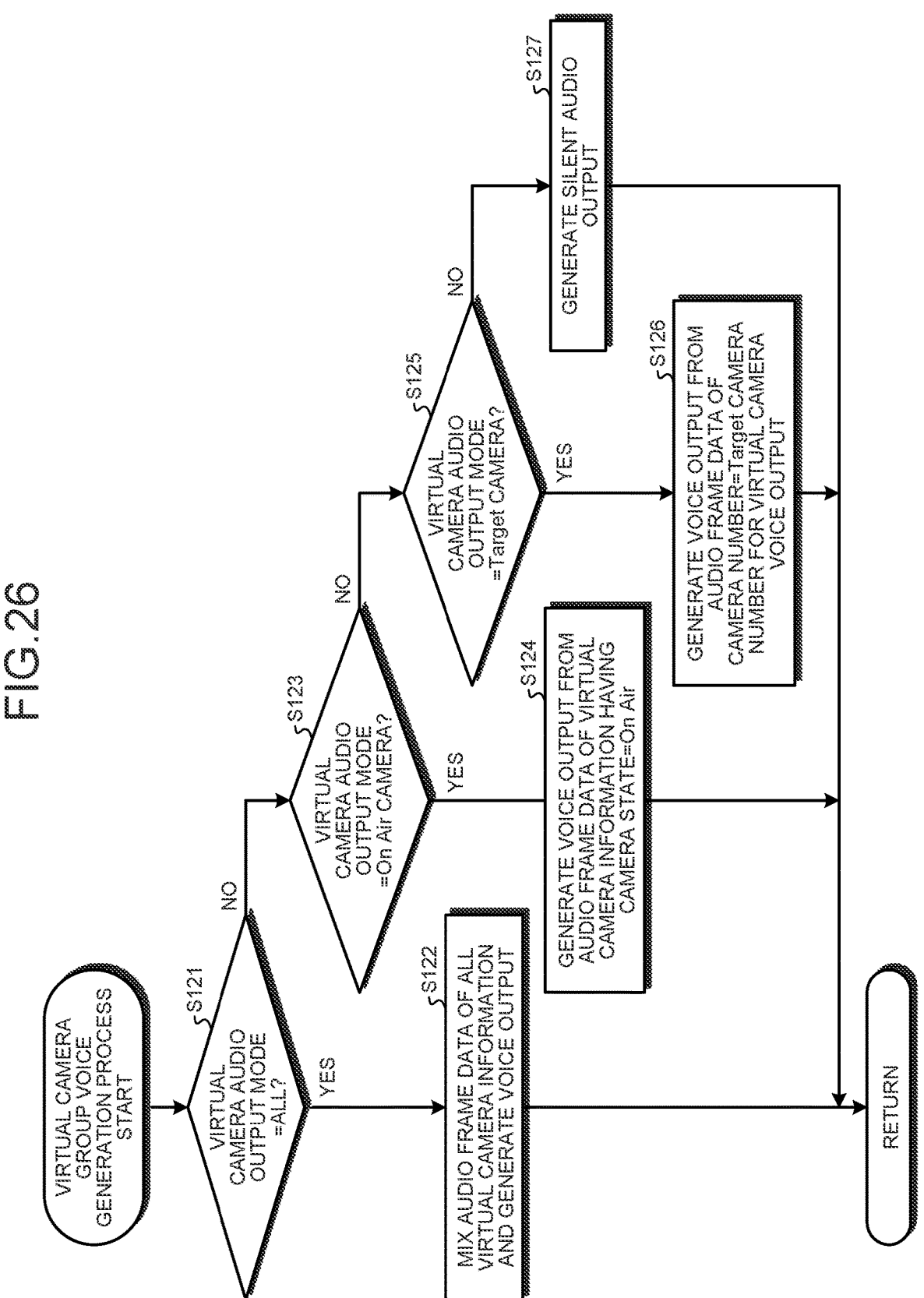
FIG. 26 is a flowchart illustrating an example of a flow of a virtual camera group voice generation process in FIG. 17.

A flow of the virtual camera group voice generation process illustrated in Step S37 in FIG. 17 will be described with reference to FIG. 26. FIG. 26 is a flowchart illustrating an example of the flow of the virtual camera group voice generation process in FIG. 17.

The virtual camera presentation information generation unit 42 determines whether the virtual camera audio output mode is ALL, i.e., a mode in which the audio data included in all the virtual camera information F is mixed and output (Step S121). When it is determined that the virtual camera audio output mode is ALL (Step S121: Yes), the process proceeds to Step S122. On the other hand, when it is not determined that the virtual camera audio output mode is ALL (Step S121: No), the process proceeds to Step S123.

When it is determined in Step S121 that the virtual camera audio output mode is ALL, the virtual camera presentation information generation unit 42 mixes the audio frame data (audio data corresponding to the video frame data) of all the virtual camera information F, with respect to the voice output unit 45, to generate audio output data (Step S122). Thereafter, the process returns to FIG. 17.

On the other hand, when it is not determined in Step S121 that the virtual camera audio output mode is ALL, the virtual camera presentation information generation unit 42 determines whether the virtual camera audio output mode is On Air camera, i.e., a mode for outputting the audio data included in the virtual camera information F of the virtual camera that is performing imaging and distribution (Step S123). When it is determined that the virtual camera audio output mode is the On Air camera (Step S123: Yes), the process proceeds to Step S124. On the other hand, when it is not determined that the virtual camera audio output mode is the On Air camera (Step S123: No), the process proceeds to Step S125.

When it is determined in Step S123 that the virtual camera audio output mode is the On Air camera, the virtual camera presentation information generation unit 42 generates audio output data from the audio frame data of the virtual camera information F whose camera state is On Air (Step S124). Thereafter, the process returns to FIG. 17.

On the other hand, when it is not determined in Step S123 that the virtual camera audio output mode is the On Air camera, the virtual camera presentation information generation unit 42 determines whether the virtual camera audio output mode is Target camera, i.e., a mode for outputting the audio data included in designated virtual camera information F (Step S125). When it is determined that the virtual camera audio output mode is the Target camera (Step S125: Yes), the process proceeds to Step S126. On the other hand, when it is not determined that the virtual camera audio output mode is the Target camera (Step S125: No), the process proceeds to Step S127.

When it is determined in Step S125 that the virtual camera audio output mode is the Target camera, the virtual camera presentation information generation unit 42 generates audio output data from the audio frame data of the virtual camera information F corresponding to the designated camera number (Step S126). Thereafter, the process returns to FIG. 17.

On the other hand, when it is not determined in Step S125 that the virtual camera audio output mode is the Target camera, the virtual camera presentation information generation unit 42 generates silent audio output data (Step S127). Thereafter, the process returns to FIG. 17.

1-11. Flow of Virtual Camera Presentation Information Output Process

Figure 27:
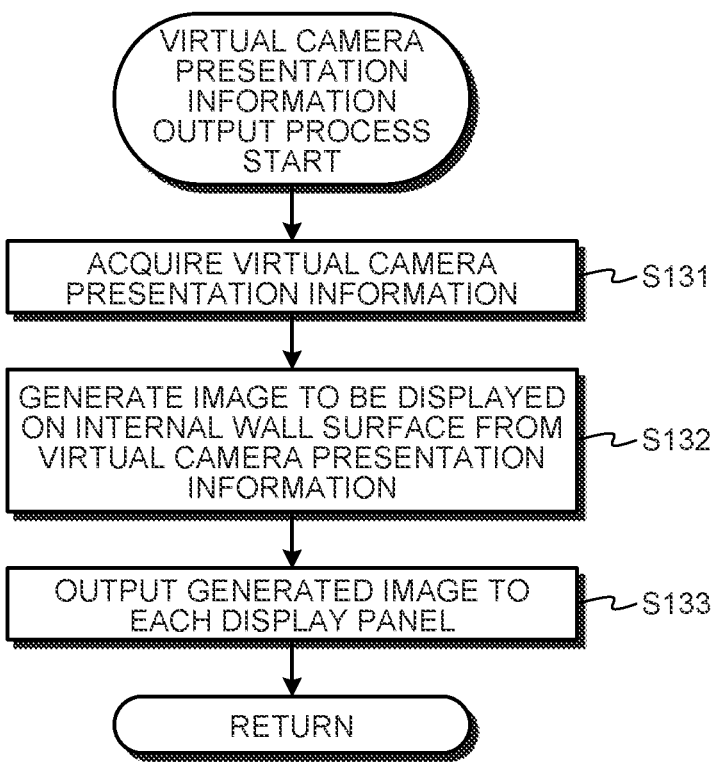
FIG. 27 is a flowchart illustrating an example of a flow of a virtual camera presentation information output process in FIG. 15.

A flow of the virtual camera presentation information output process illustrated in Step S13 in FIG. 15 will be described with reference to FIG. 27. FIG. 27 is a flowchart illustrating an example of the flow of the virtual camera presentation information output process in FIG. 15.

The in-studio image display unit 44 acquires the virtual camera presentation information 20 from the virtual camera presentation information generation unit 42 (Step S131). Note that the in-studio image display unit 44 may acquire the virtual camera group presentation information 200 from the virtual camera presentation information generation unit 42.

The in-studio image display unit 44 generates an image to be displayed on the inner wall surface 15 from the virtual camera presentation information 20 (Step S132).

The in-studio image display unit 44 outputs the image generated in Step S132 to each display panel 17 (Step S133). Note that, when an image is projected by the projectors 28 or 29, the in-studio image display unit 44 outputs the image generated in Step S132 to each of the projectors 28 or 29. Thereafter, the process returns to FIG. 17.

1-12. Flow of Volumetric Image Generation Process

Figure 28:
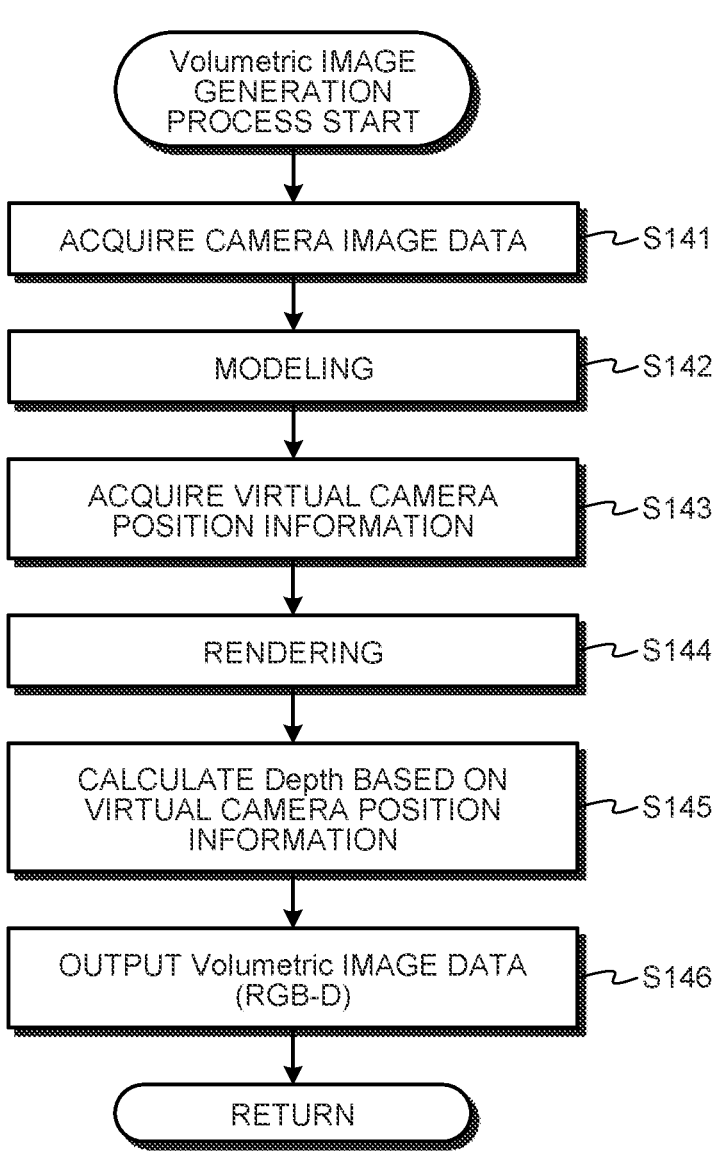
FIG. 28 is a flowchart illustrating an example of a flow of a volumetric image generation process in FIG. 15.

A flow of the volumetric image generation process illustrated in Step S14 in FIG. 15 will be described with reference to FIG. 28. FIG. 28 is a flowchart illustrating an example of the flow of the volumetric image generation process in FIG. 15.

The volumetric image generation unit 47 acquires image data (real camera image I) captured by the camera 16 from the volumetric image shooting unit 46 (Step S141).

The volumetric image generation unit 47 performs modeling for generating the 3D model 22M of the subject 22 based on the image data acquired in Step S141 (Step S142).

The volumetric image generation unit 47 acquires the virtual camera position information Fa from the virtual camera presentation information generation unit 42 (Step S143).

The volumetric image generation unit 47 performs rendering of a volumetric image from the 3D model 22M viewed from the virtual viewpoint based on the virtual camera position information Fa (Step S144).

The volumetric image generation unit 47 calculates a depth, i.e., a distance, from the virtual viewpoint to the 3D model 22M based on the virtual camera position information Fa (Step S145).

The volumetric image generation unit 47 outputs volumetric image data (RGB-D) to the volumetric image and CG superimposition/audio MUX unit 51 (Step S146). Note that the volumetric image data includes color information (RGB) and distance information (D). Then, the process returns to the main routine (FIG. 15).

Figure 29:
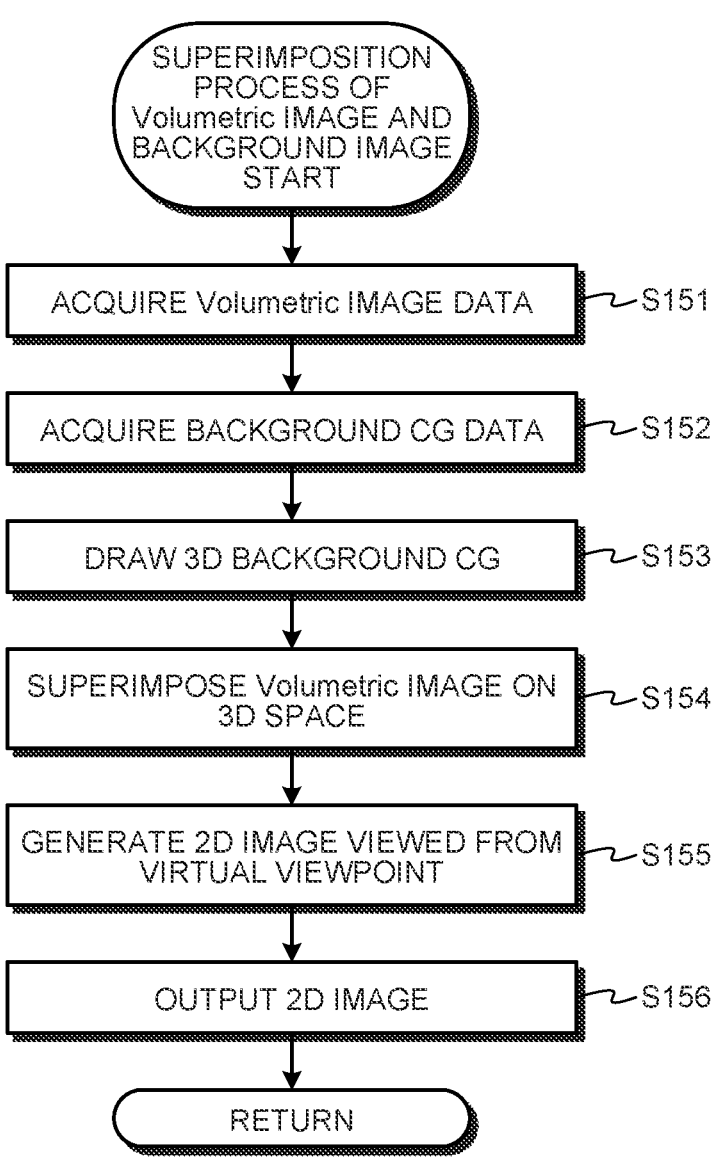
FIG. 29 is a flowchart illustrating an example of a flow of a superimposition process of a volumetric image and a background image in FIG. 15.

1-13. Flow of Superimposition Process of Volumetric Image and Background Image A flow of the superimposition process of the volumetric image and the background image illustrated in Step S15 in FIG. 15 will be described with reference to FIG. 29. FIG. 29 is a flowchart illustrating an example of the flow of the superimposition process of the volumetric image and the background image in FIG. 15.

The volumetric image and CG superimposition/audio MUX unit 51 acquires the volumetric image data from the volumetric image generation unit 47 (Step S151).

The volumetric image and CG superimposition/audio MUX unit 51 acquires the background CG data from the CG background generation unit 50 (Step S152).

The volumetric image and CG superimposition/audio MUX unit 51 draws 3D background CG data (Step S153).

The volumetric image and CG superimposition/audio MUX unit 51 superimposes the volumetric image on a 3D space where the background CG data has been drawn (Step S154).

The volumetric image and CG superimposition/audio MUX unit 51 generates a 2D image in which the 3D space generated in Step S154 is viewed from a virtual viewpoint (Step S155). Note that, when the viewing device 53a of the user can display the 3D image, the volumetric image and CG superimposition/audio MUX unit 51 generates the 3D image.

The volumetric image and CG superimposition/audio MUX unit 51 outputs the 2D image (or 3D image) generated in Step S155 to the distribution unit 52 (Step S156). Then, the process returns to the main routine (FIG. 15).

Although not illustrated in the flowchart in FIG. 29, the volumetric image and CG superimposition/audio MUX unit 51 also performs a process of multiplexing (MUX) the generated 2D image (or 3D image) and the audio information.

1-14. Effects of First Embodiment

As described above, the image processing apparatus 12a (information processing apparatus) according to the first embodiment includes the volumetric image shooting unit 46 (first acquisition unit) that acquires the plurality of real images (real camera images I) respectively captured by the plurality of cameras 16 (first imaging devices) arranged around the subject 22, the volumetric image generation unit 47 (generation unit) that generates the 3D model 22M of the subject 22 from the plurality of real images, and the in-studio image display unit 44 (presentation unit) that presents, to the subject 22, the information regarding the virtual viewpoint used in rendering, from the 3D model 22M, an image in the form corresponding to the viewing device 53a.

As a result, in the volumetric studio 14a, it is possible to reproduce a situation as if a cameraperson is directly shooting with an actual camera. Therefore, since the subject 22 can perform while being conscious of the virtual camera, the presence of distribution content can be further enhanced.

Furthermore, the image processing apparatus 12a (information processing apparatus) according to the first embodiment further includes the virtual camera information generation unit 41 (second acquisition unit) that acquires information regarding the virtual viewpoint.

As a result, information regarding the virtual camera can be reliably and easily acquired.

Furthermore, in the image processing apparatus 12a (information processing apparatus) according to the first embodiment, the in-studio image display unit 44 (presentation unit) presents the position of the virtual viewpoint to the subject 22 (e.g., virtual camera presentation information 20a and 20b).

As a result, it is possible to reproduce a situation as if a cameraperson is directly shooting with an actual camera.

Furthermore, in the image processing apparatus 12a (information processing apparatus) according to the first embodiment, the in-studio image display unit 44 (presentation unit) presents, at the position of the virtual viewpoint, information indicating that the virtual viewpoint exists at that position.

As a result, the subject 22 can intuitively know the position of the virtual camera.

Furthermore, in the image processing apparatus 12a (information processing apparatus) according to the first embodiment, the in-studio image display unit 44 (presentation unit) presents, to the subject 22, information indicating a position where the virtual viewpoint exists (e.g., virtual camera presentation information 20i, 20j, 20k, and 20l).

As a result, the position of the virtual viewpoint can also be presented in a studio where the display panels 17 and the projectors 28 and 29 cannot be installed.

Furthermore, in the image processing apparatus 12a (information processing apparatus) according to the first embodiment, the in-studio image display unit 44 (presentation unit) presents, to the subject 22, the distance between the virtual viewpoint and the subject 22 (e.g., virtual camera presentation information 20f).

As a result, the subject 22 can intuitively know the distance between the virtual camera and the subject 22.

Furthermore, in the image processing apparatus 12a (information processing apparatus) according to the first embodiment, the in-studio image display unit 44 (presentation unit) presents, to the subject 22, the observation direction from the virtual viewpoint (e.g., virtual camera presentation information 20g).

As a result, the subject 22 can intuitively know the direction of the virtual camera.

Furthermore, in the image processing apparatus 12a (information processing apparatus) according to the first embodiment, the in-studio image display unit 44 (presentation unit) presents, to the subject 22, the moving direction of the virtual viewpoint (e.g., virtual camera presentation information 20m).

As a result, it is possible to transmit the position of the virtual camera to the subject 22 during unique volumetric camerawork that cannot be achieved by a real camera.

Furthermore, in the image processing apparatus 12a (information processing apparatus) according to the first embodiment, the in-studio image display unit 44 (presentation unit) presents, to the subject 22, the operation state of the virtual camera placed at the virtual viewpoint (e.g., virtual camera presentation information 20h).

As a result, the subject 22 can intuitively know the operation state of the virtual camera.

Furthermore, in the image processing apparatus 12a (information processing apparatus) according to the first embodiment, the in-studio image display unit 44 (presentation unit) presents, to the subject 22, a message of the operator who controls the virtual viewpoint (e.g., virtual camera presentation information 20c).

As a result, the subject 22 can perform while communicating with the operator who controls the virtual viewpoint.

Furthermore, in the image processing apparatus 12a (information processing apparatus) according to the first embodiment, when positions of the plurality of virtual viewpoints become close to each other, the in-studio image display unit 44 (presentation unit) combines information regarding the plurality of virtual viewpoints and presents, to the subject 22, the combined information (e.g., virtual camera presentation information 20n3).

2. Second Embodiment

Figure 30:
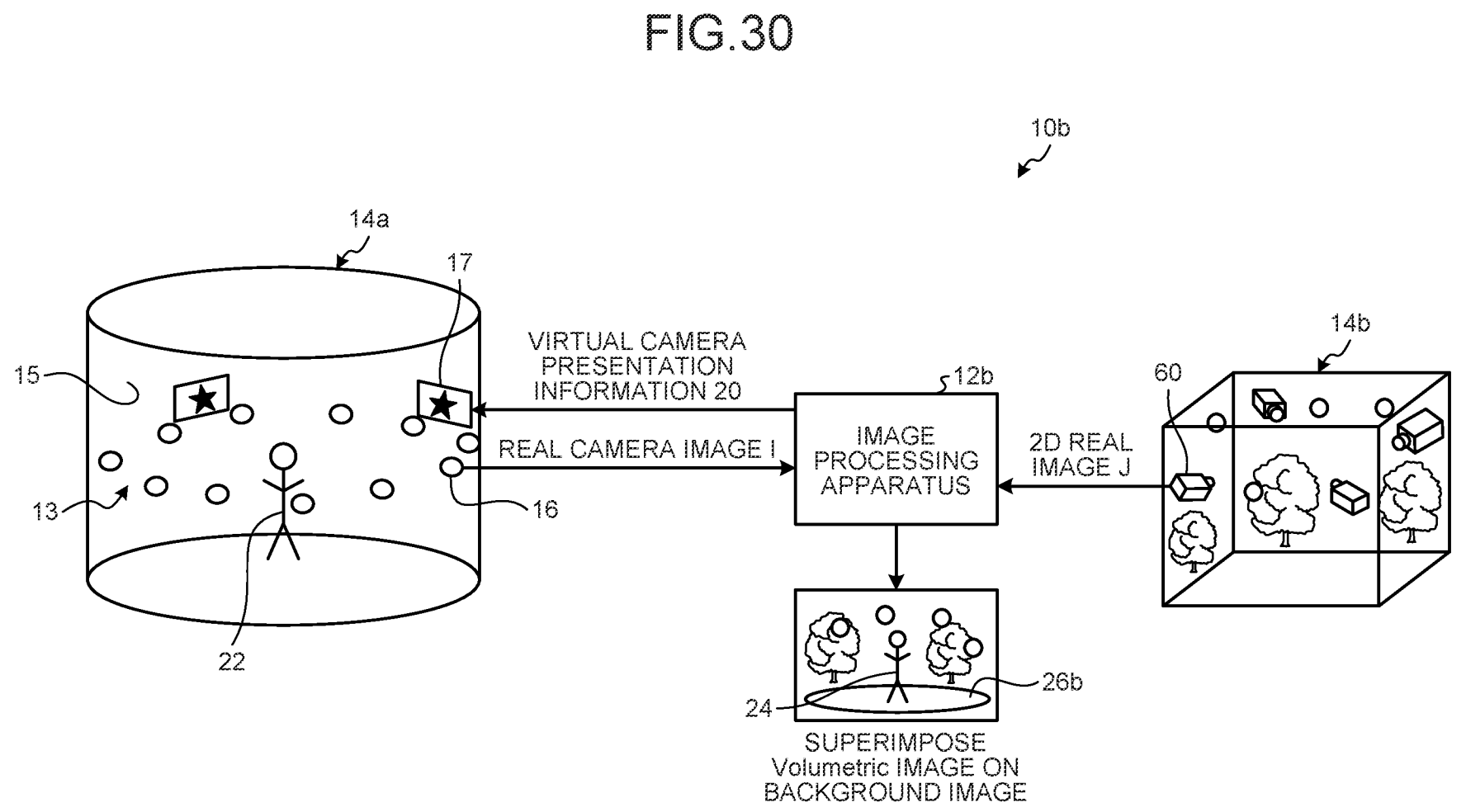

2-1. Schematic Configuration of Image Processing System of Second Embodiment Next, an image processing system 10b according to a second embodiment of the present disclosure will be described with reference to FIG. 30. FIG. 30 is a system configuration diagram illustrating an outline of an image processing system according to the second embodiment.

The image processing system 10b has substantially the same function as the image processing system 10a described above, but is different in that background data on which volumetric image data is superimposed is captured by a real camera, and a position of the real camera for capturing the background data is set as a virtual viewpoint. A schematic configuration of the image processing system 10b will be described below with reference to FIG. 30. Note that description of components common to the image processing system 10a will be omitted.

The image processing system 10b includes the volumetric studio 14a, a 2D photographing studio 14b, and an image processing apparatus 12b.

The 2D photographing studio 14b is a studio different from the volumetric studio 14a. The 2D photographing studio 14b includes a plurality of real cameras 60. Each of the real cameras 60 can change a position, an observation direction, a field angle, and the like by a cameraperson's operation or a control signal from the outside. Furthermore, an arbitrary background is drawn on a wall surface of the 2D photographing studio 14b, or an arbitrary background is projected by a projector. Furthermore, a plurality of lighting devices capable of arbitrarily controlling a lighting state is provided inside the 2D photographing studio 14b. In the 2D photographing studio 14b, a 2D real image J captured by the real camera 60 is input to the image processing apparatus 12b. Note that the real camera 60 is an example of a second imaging device in the present disclosure.

The image processing apparatus 12b generates the 3D model 22M of the subject 22 based on the real camera image I acquired from the camera 16. Furthermore, the image processing apparatus 12a assumes that the real camera 60 is at the virtual viewpoint, and renders, from the 3D model 22M of the subject 22 viewed from the virtual viewpoint, an image in a form corresponding to the viewing device 53a of the user. Furthermore, the image processing apparatus 12a generates the virtual camera presentation information 20 regarding the virtual viewpoint based on the information regarding the real camera 60, and outputs the virtual camera presentation information 20 to the display panel 17.

Further, the image processing apparatus 12b acquires the 2D real image J from the real camera 60. In addition, the image processing apparatus 12b superimposes the volumetric image 24 of the 3D model 22M on the 2D real image J acquired as a background image 26b. The generated image is distributed to, for example, a viewing environment of the user. Note that the image processing apparatus 12b is an example of the information processing apparatus in the present disclosure.

Figure 31:
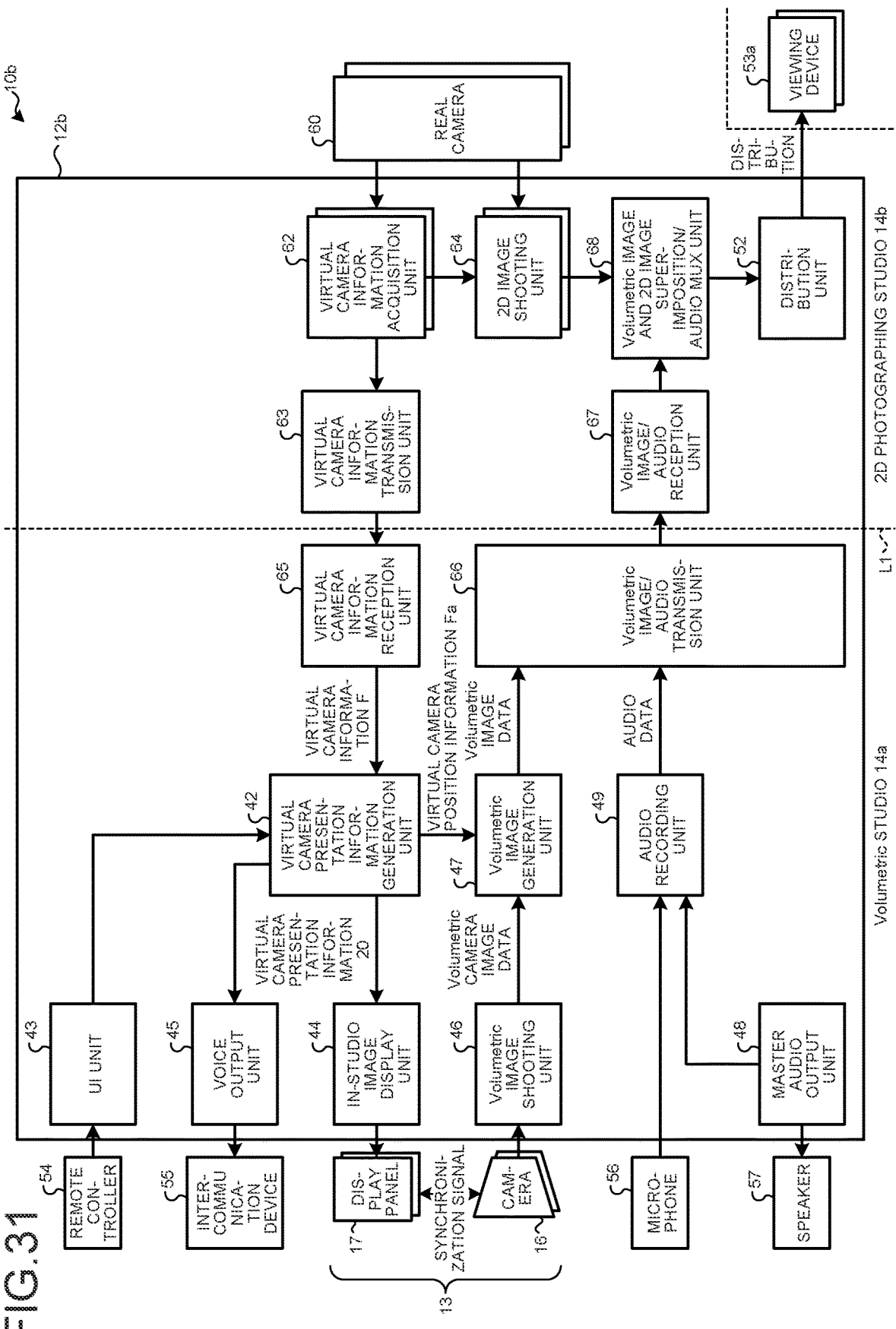
FIG. 31 is a functional block diagram illustrating an example of a functional configuration of the image processing system according to the second embodiment.

2-2. Functional Configuration of Image Processing System of Second Embodiment Next, a functional configuration of the image processing system 10b will be described with reference to FIG. 31. FIG. 31 is a functional block diagram illustrating an example of the functional configuration of the image processing system according to the second embodiment.

As illustrated in FIG. 31, the image processing system 10b includes the image processing apparatus 12b, the cameras 16 and the display panels 17 configuring the imaging and display device 13, and the real cameras 60. In addition, the image processing system 10b includes the remote controller 54, the intercommunication device 55, the microphone 56, the speaker 57, and the viewing device 53a that are peripheral devices.

The image processing apparatus 12b includes the virtual camera information generation unit 42, the UI unit 43, the in-studio image display unit 44, the voice output unit 45, the volumetric image shooting unit 46, the volumetric image generation unit 47, the master audio output unit 48, the audio recording unit 49, the distribution unit 52, a virtual camera information acquisition unit 62, a virtual camera information transmission unit 63, a 2D image shooting unit 64, a virtual camera information reception unit 65, a volumetric image/audio transmission unit 66, a volumetric image/audio reception unit 67, and a volumetric image and 2D image superimposition/audio MUX unit 68. These functional units are implemented by a CPU of the image processing apparatus 12b having a configuration of a computer executing a control program (not illustrated) for controlling the operation of the image processing apparatus 12b. In addition, all or some of the functions of the image processing apparatus 12b may be implemented by hardware.

Among the functional units described above, the functional units illustrated on a left side of a dotted line L1 in FIG. 31 are installed in the volumetric studio 14a. The functional units described on a right side of the dotted line L1 are installed in the 2D photographing studio 14b. Hereinafter, only functions of the functional units different from those of the image processing system 10a will be described.

The virtual camera information acquisition unit 62 acquires information regarding the real camera 60 from the real camera 60 (second imaging device) on the side of the 2D photographing studio 14b. The information regarding the real camera 60 is the virtual camera information F when the real camera 60 is regarded as a virtual camera. Content of the virtual camera information F is as described in the first embodiment. Note that the virtual camera information acquisition unit 62 is an example of the second acquisition unit in the present disclosure.

The virtual camera information transmission unit 63 transmits the virtual camera information F acquired by the virtual camera information acquisition unit 62 to the volumetric studio 14a.

The virtual camera information reception unit 65 receives the virtual camera information F from the 2D photographing studio 14b.

The 2D image shooting unit 64 generates a background 2D image from the 2D real image J captured by the real camera 60.

The volumetric image/audio transmission unit 66 transmits the volumetric image and audio data generated in the volumetric studio 14a to the 2D photographing studio 14b.

The volumetric image/audio reception unit 67 receives the volumetric image and the audio data from the volumetric studio 14a.

The volumetric image and 2D image superimposition/audio MUX unit 68 renders, from the 3D model 22M of the subject 22, an image in a form corresponding to the viewing device 53a of the user, and superimposes the rendered image on an image captured by the real camera 60 (second imaging device) in a place different from the subject 22. Furthermore, the volumetric image and 2D image superimposition/audio MUX unit 68 multiplexes (MUX) the superimposed image with the audio data. Note that the volumetric image and 2D image superimposition/audio MUX unit 68 is an example of a superimposition unit in the present disclosure.

Note that image processing system 10b does not include the controller 40 (see FIG. 13) provided in the image processing system 10a. This is because the real camera 60 itself generates information regarding the virtual camera in the image processing system 10b. Specifically, the real camera 60 includes a gyro sensor and an acceleration sensor. The real camera 60 detects an imaging direction and a moving direction of the real camera 60 itself by detecting outputs of the gyro sensor and the acceleration sensor.

In addition, a position detection sensor (not illustrated) that measures a position of the real camera 60 in the 2D photographing studio 14b is installed in the 2D photographing studio 14b where the real camera 60 is installed. The position detection sensor is configured with a plurality of base stations that are installed in the 2D photographing studio 14b and transmit IR signals of different light emission patterns, and an IR sensor that is installed in the real camera 60 and detects the IR signals from the base station. The IR sensor detects its own position in the 2D photographing studio 14b based on intensities of the plurality of detected IR signals. Note that the real camera 60 may detect its own position and direction in the 2D photographing studio 14b based on an image captured by itself. In this manner, the real camera 60 generates information regarding the virtual camera based on the information acquired from various sensors.

Note that the real camera 60 further includes an operation device such as a selection button for instructing selection and start of the camerawork information, and a display device for displaying options and the like of the camerawork information.

Note that, in the image processing apparatus 12b in FIG. 31, the virtual camera information acquisition unit 62, the virtual camera information transmission unit 63, the 2D image shooting unit 64, the volumetric image/audio reception unit 67, the volumetric image and 2D image superimposition/audio MUX unit 68, and the distribution unit 52 are installed in the 2D photographing studio 14b where the real camera 60 is installed. Other functional units of the image processing apparatus 12b are installed in the volumetric studio 14a.

2-3. Action of Image Processing System of Second Embodiment

A process flow of the image processing system 10b is the same as the process flow of the image processing system 10a described above. Therefore, a detailed description of the process flow will be omitted.

Note that, in the image processing system 10a, the background CG image needs to have the 3D information, but in the image processing system 10b, the virtual camera information F corresponding to the movement of the real camera 60 is generated for each frame. Then, the image processing apparatus 12b generates the volumetric image corresponding to the virtual camera information F, and superimposes the generated volumetric image on the background 2D image based on the 2D real image J captured by the real camera 60. Therefore, unlike the image processing system 10a, it is not necessary to prepare the 3D background data (background CG image).

In addition, the image processing system 10b has characteristics different from virtual production which is known as a system for generating an image as if the image has been captured in a target location. In other words, in a well-known virtual production, the 3D CG is drawn on the background according to the movement of the real camera, and the subject standing in front of the 3D CG is photographed. On the other hand, in the image processing system 10b, the volumetric image of the subject 22 performing performance is generated according to the movement of the real camera 60 that captures a real background prepared in the 2D photographing studio 14*b*. Therefore, positioning of the subject and the background is opposite to that of the well-known virtual production. As a result, an application range of the current virtual production can be expanded by using the image processing system 10*b*.

2-4. Effects of Second Embodiment

As described above, the image processing apparatus 12*b* (information processing apparatus) according to the second embodiment further includes the volumetric image and 2D image superimposition/audio MUX unit 68 (superimposition unit) that renders, from the 3D model 22M of the subject 22, an image in the form corresponding to the viewing device 53*a* and superimposes the rendered image on an image captured by the real camera 60 (second imaging device) in a place different from the subject 22. The virtual camera information acquisition unit 62 (second acquisition unit) regards the real camera 60 as a virtual camera placed at a virtual viewpoint and acquires information regarding the virtual viewpoint from the real camera 60.

As a result, when the real camera 60 installed in a distant place is regarded as the virtual camera, it is possible to reproduce, in the volumetric studio 14*a*, a situation as if a cameraperson is directly shooting with an actual camera. Therefore, since the subject 22 can perform while being conscious of the virtual camera, the presence of distribution content can be further enhanced.

3. Third Embodiment

Figure 32:
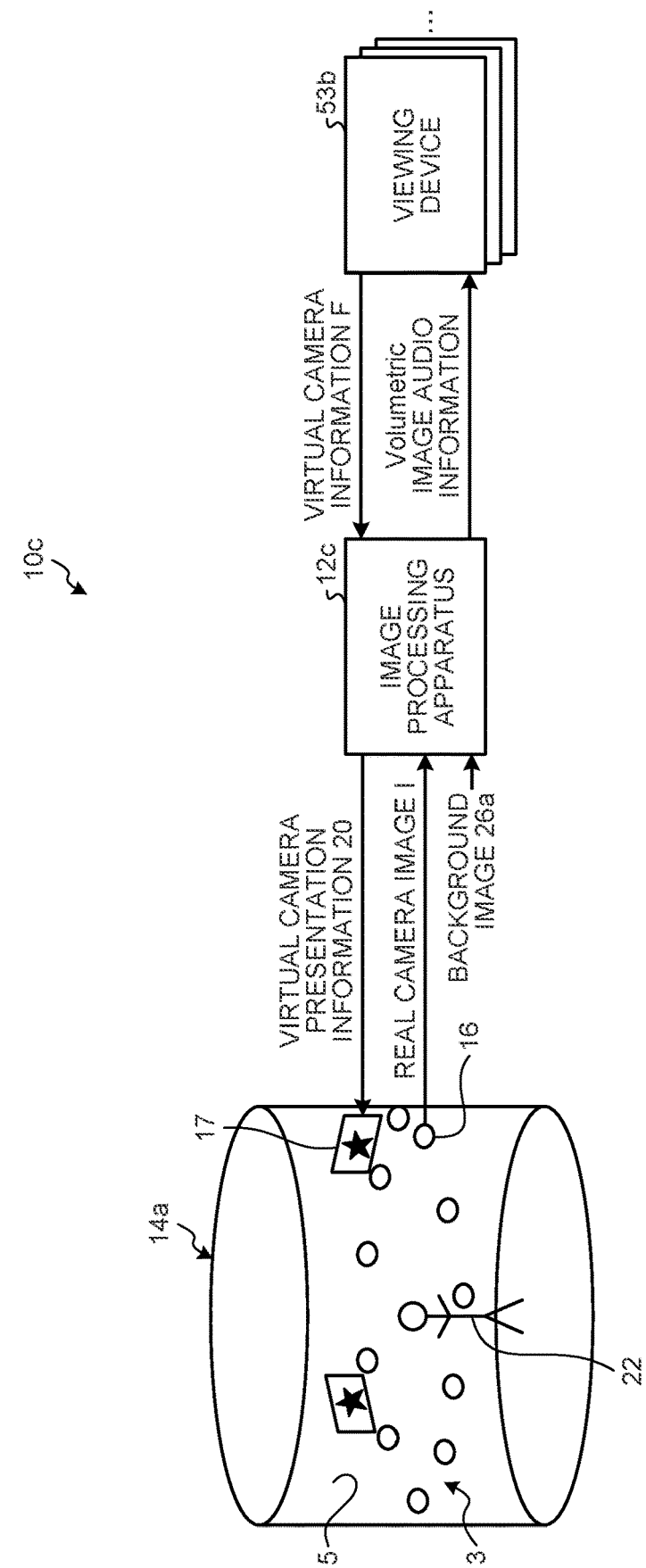
FIG. 32 is a system configuration diagram illustrating an outline of an image processing system according to a third embodiment.

3-1. Schematic Configuration of Image Processing System of Third Embodiment Next, an image processing system 10*c* according to a third embodiment of the present disclosure will be described with reference to FIG. 32. FIG. 32 is a system configuration diagram illustrating an outline of an image processing system according to the third embodiment.

The image processing system 10*c* has substantially the same function as the image processing systems 10*a* and 10*b* described above. However, while the image processing systems 10*a* and 10*b* distribute the generated distribution content to the viewing device 53*a* of the user in one way, the image processing system 10*c* is different in that the user can interactively control a position of the virtual viewpoint using a viewing device 53*b*. A schematic configuration of the image processing system 10*c* will be described below with reference to FIG. 32. Note that description of components common to the image processing systems 10*a* and 10*b* will be omitted.

The image processing system 10*c* includes a volumetric studio 14*a*, an image processing apparatus 12*c*, and the viewing device 53*b*. The image processing apparatus 12*c* may be installed in the volumetric studio 14*a*.

The image processing apparatus 12*c* generates the 3D model 22M of the subject 22 based on the real camera image I acquired from the camera 16. Furthermore, the image processing apparatus 12*c* acquires the virtual camera information F from the viewing device 53*b* of the user. Furthermore, the image processing apparatus 12*c* renders, from the 3D model 22M of the subject 22 viewed from the virtual viewpoint based on the virtual camera information F, an image in a form corresponding to the viewing device 53*b* of the user. Furthermore, the image processing apparatus 12*c* generates the virtual camera presentation information 20 regarding the virtual viewpoint, and outputs the virtual camera presentation information 20 to the display panel 17. Here, the information regarding the virtual viewpoint is information regarding a viewpoint when each of the plurality of viewing users views, on its own viewing device 53*b*, the image rendered by the image processing apparatus 12*c*.

Further, the image processing apparatus 12*c* superimposes the volumetric image 24 of the 3D model 22M generated on the background image 26*a* acquired, and generates an image observed from the set virtual viewpoint. Then, the image processing apparatus 12*c* distributes the generated image to the viewing device 53*b* of the user. Note that the image processing apparatus 12*c* is an example of the information processing apparatus in the present disclosure.

Figure 33:
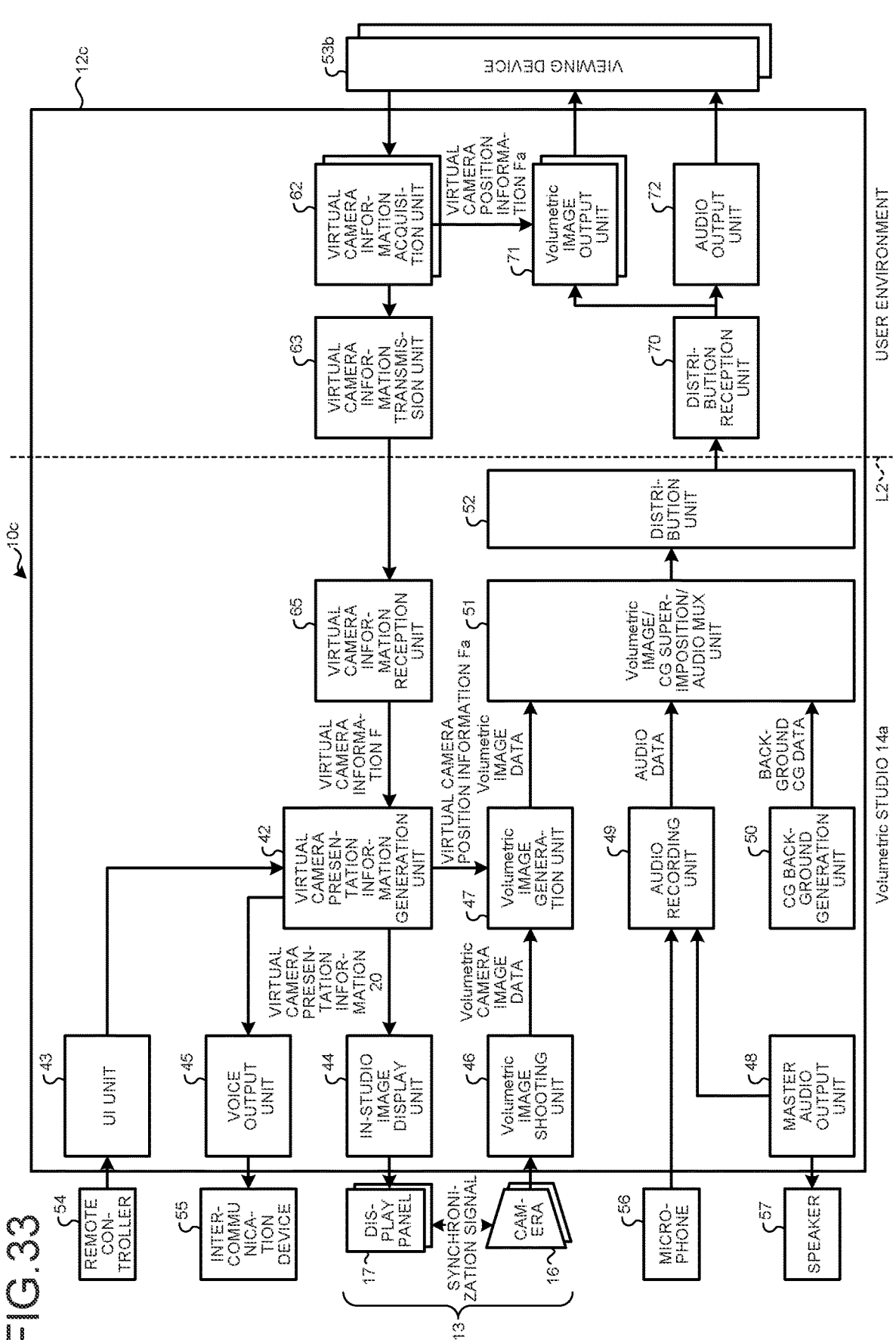
FIG. 33 is a functional block diagram illustrating an example of a functional configuration of the image processing system according to the third embodiment.

3-2. Functional Configuration of Image Processing System of Third Embodiment Next, a functional configuration of the image processing system 10*c* will be described with reference to FIG. 33. FIG. 33 is a functional block diagram illustrating an example of the functional configuration of the image processing system according to the third embodiment.

As illustrated in FIG. 33, the image processing system 10*c* includes the image processing apparatus 12*c*, the viewing device 53*b*, the cameras 16 and the display panels 17 configuring the imaging and display device 13. In addition, the image processing system 10*c* includes the remote controller 54, the intercommunication device 55, the microphone 56, and the speaker 57 that are peripheral devices.

The image processing apparatus 12*c* includes the virtual camera presentation information generation unit 42, the UI unit 43, the in-studio image display unit 44, the voice output unit 45, the volumetric image shooting unit 46, the volumetric image generation unit 47, the master audio output unit 48, the audio recording unit 49, the CG background generation unit 50, the volumetric image and CG superimposition/audio MUX unit 51, the distribution unit 52, the virtual camera information acquisition unit 62, the virtual camera information transmission unit 63, the virtual camera information reception unit 65, a distribution reception unit 70, a volumetric image output unit 71, and an audio output unit 72. These functional units are implemented by the CPU of the image processing apparatus 12*c* having a configuration of a computer executing a control program (not illustrated) for controlling the operation of the image processing apparatus 12*c*. In addition, all or some of the functions of the image processing apparatus 12*c* may be implemented by hardware.

Among the functional units described above, the functional units described on the left side of a dotted line L2 in FIG. 33 are installed in the volumetric studio 14*a*. The functional units described on the right side of the dotted line L2 are installed in the user environment in which the user holds the viewing device, and desirably built in the viewing device 53*b*. Hereinafter, only functions of functional units different from those of the image processing systems 10*a* and 10*b* will be described.

The virtual camera information acquisition unit 62 acquires the virtual camera information F including virtual camera position information and an image/message of the user from the viewing device 53*b*.

The virtual camera information transmission unit 63 transmits the virtual camera information F acquired by the virtual camera information acquisition unit 62 to the volumetric studio 14*a*.

The virtual camera information reception unit 65 receives the virtual camera information F from the virtual camera information transmission unit 63.

The distribution reception unit 70 receives the distribution content transmitted from the volumetric studio 14*a*. Note that, unlike the content viewed by the user, the content received by the distribution reception unit 70 is simply multiplexed content of the volumetric image, the background CG, and the audio data.

The volumetric image output unit 71 decodes the volumetric image and the background CG from a multiplexed signal received by the distribution reception unit 70. Furthermore, the volumetric image output unit 71 renders, from the 3D model 22M of the subject 22, a volumetric image viewed from the observed position based on the virtual camera position information Fa. Furthermore, the volumetric image output unit 71 superimposes the rendered volumetric image on background CG data. Then, the volumetric image output unit 71 outputs an image on which the background CG data is superimposed to the viewing device 53*b*.

The audio output unit 72 decodes audio data from the multiplexed signal received by the distribution reception unit 70. Then, the audio output unit 72 outputs the decoded audio data to the viewing device 53.

The volumetric image and CG superimposition/audio MUX unit 51 multiplexes (MUX) the volumetric image, the background CG, and the audio data. Unlike the volumetric image and CG superimposition/audio MUX unit 51 (see FIG. 13) provided in the image processing apparatus 12*a*, only signal multiplexing (MUX) is performed here because the volumetric image output unit 71 superimposes the volumetric image and the background CG.

Note that the viewing device 53*b* has a function of the controller 40 in the image processing apparatus 12*a*. As the viewing device 53*b*, for example, a portable terminal such as a smartphone or a tablet terminal, an HMD, a spatial reproduction display capable of naked-eye stereoscopic vision, or a combination of a display and a game controller is used. Note that the viewing device 53*b* has at least a function of designating a position and a direction, a function of selecting and determining menu options, and a function of communicating with the image processing apparatus 12*c*.

With these functions, the viewing device 53*b* sets the position and the direction necessary for setting the virtual viewpoint, similarly to the controller 40. In other words, the viewing device 53*b* itself serves as the virtual camera. Furthermore, the viewing device 53*b* selects and determines a camerawork of the virtual viewpoint (virtual camera). Further, the viewing device 53*b* selects and determines a message for the subject 22.

3-3. Method of Acquiring Virtual Camera Information

Figure 34:
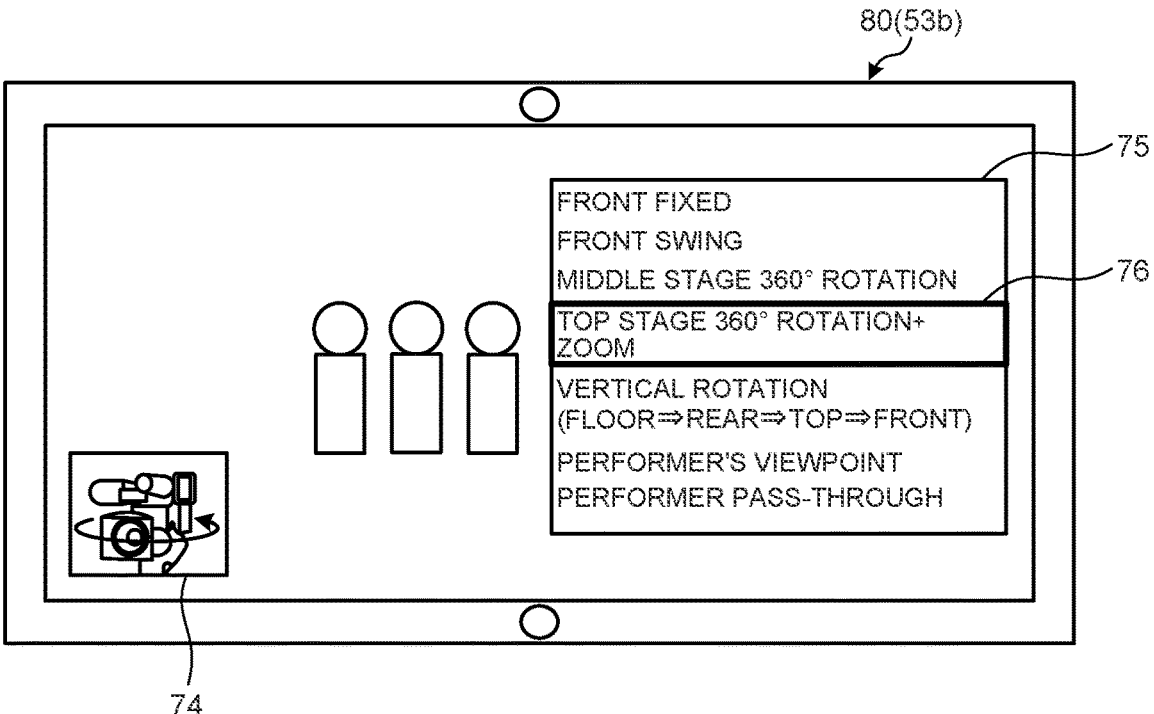
FIG. 34 is a diagram illustrating a method in which a user sets camerawork information using a viewing device.
Figure 35:
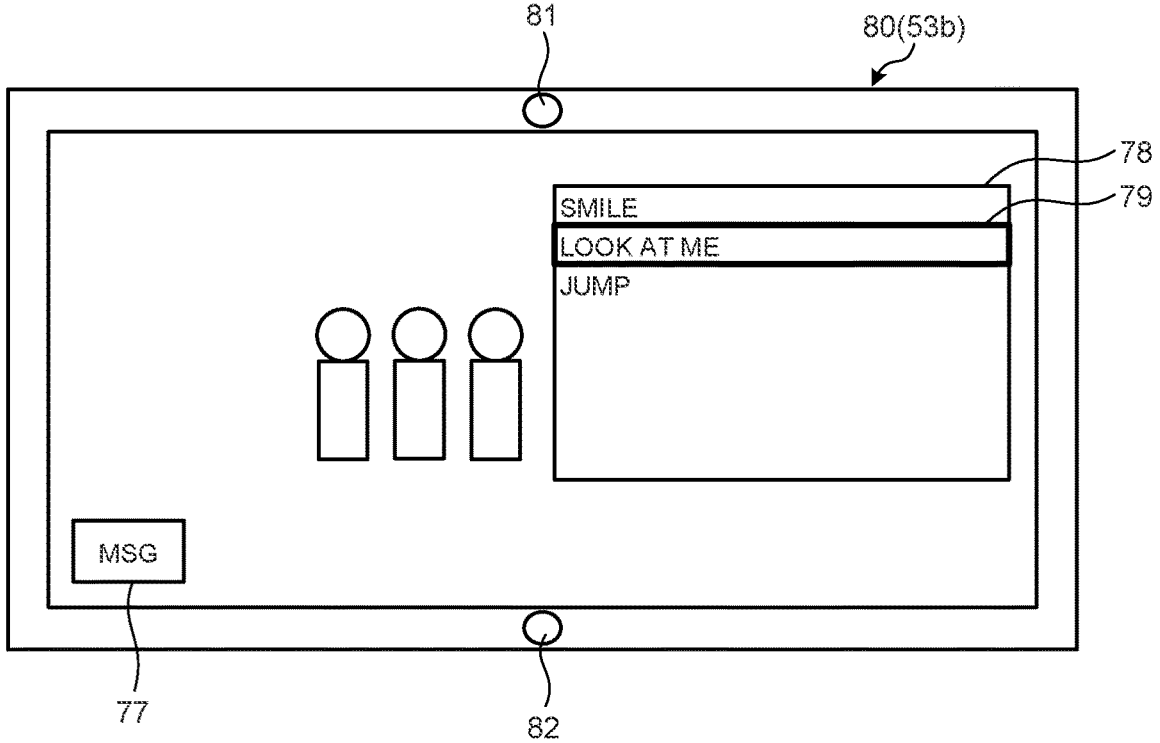
FIG. 35 is a diagram illustrating a method in which the user sets an operator image, an operator voice, and an operator message using the viewing device.

A method of acquiring the virtual camera information F from a mobile terminal 80, which is an example of the viewing device 53*b*, will be described with reference to FIGS. 34 and 35. FIG. 34 is a diagram illustrating a method in which the user sets camerawork information using the viewing device. FIG. 35 is a diagram illustrating a method in which the user sets an operator image, an operator voice, and an operator message using the viewing device.

In the mobile terminal 80, which is an example of the viewing device 53*b*, when a setting menu of the camerawork is selected from a main menu (not illustrated) that is displayed when an application for using the image processing system 10*c* has started, a camerawork selection button 74 illustrated in FIG. 34 is displayed on a display screen of the viewing device 53*b*. Note that the display screen of the mobile terminal 80 also has a function of a touch panel, and can control a graphical user interface (GUI) displayed on the display screen by finger.

The camerawork selection button 74 is a button pressed when starting setting of the camerawork.

When the camerawork selection button 74 is pressed, a camerawork selection window 75 is displayed on a display screen of the mobile terminal 80. In the camerawork selection window 75, a list of camerawork options preset in advance is displayed. Furthermore, a camerawork start button 76 is displayed in a manner overlaid on an arbitrary camerawork option displayed in the camerawork selection window 75.

The user of the mobile terminal 80 overlay the camerawork start button 76 on a camerawork option that the user wants to set. Then, the camerawork setting is completed by pressing the camerawork start button 76. The set camerawork is sent to the virtual camera information acquisition unit 62 as the camerawork information Fb.

Although not illustrated in FIG. 34, the start position and the end position of the camerawork, a speed of the camerawork, and the like can also be set in the camerawork setting menu.

Further, in the mobile terminal 80, when a setting menu for the operator message is selected from the main menu (not illustrated) that is displayed when the application for using the image processing system 10*c* has started, a message selection button 77 illustrated in FIG. 35 is displayed on the display screen of mobile terminal 80.

The message selection button 77 is a button pressed when starting selection of the operator message.

When the message selection button 77 is pressed, a message selection window 78 is displayed on the display screen of the mobile terminal 80. In the message selection window 78, a list of preset messages is displayed. Further, a message transmission button 79 is displayed in a manner overlaid on an arbitrary message displayed in the message selection window 78.

The user of the mobile terminal 80 overlays the message transmission button 79 on a message that the user wants to set. Then, setting of the operator message Fe is completed by pressing the message transmission button 79. The operator message Fe set is sent to the virtual camera information acquisition unit 62.

In addition to the preset messages, operator's image and voice acquired using an IN camera 81 and a microphone 82 built in the viewing device 53*b* may be set as the operator message Fe.

Note that the mobile terminal 80 detects the virtual camera position information Fa that detects its own imaging direction and moving direction by detecting the output of the gyro sensor and the acceleration sensor. This is the same as the method in which the real camera 60 detects the virtual camera position information Fa in the second embodiment, and thus further description will be omitted.

3-4. Form of Virtual Camera Group Presentation Information

Figure 36:
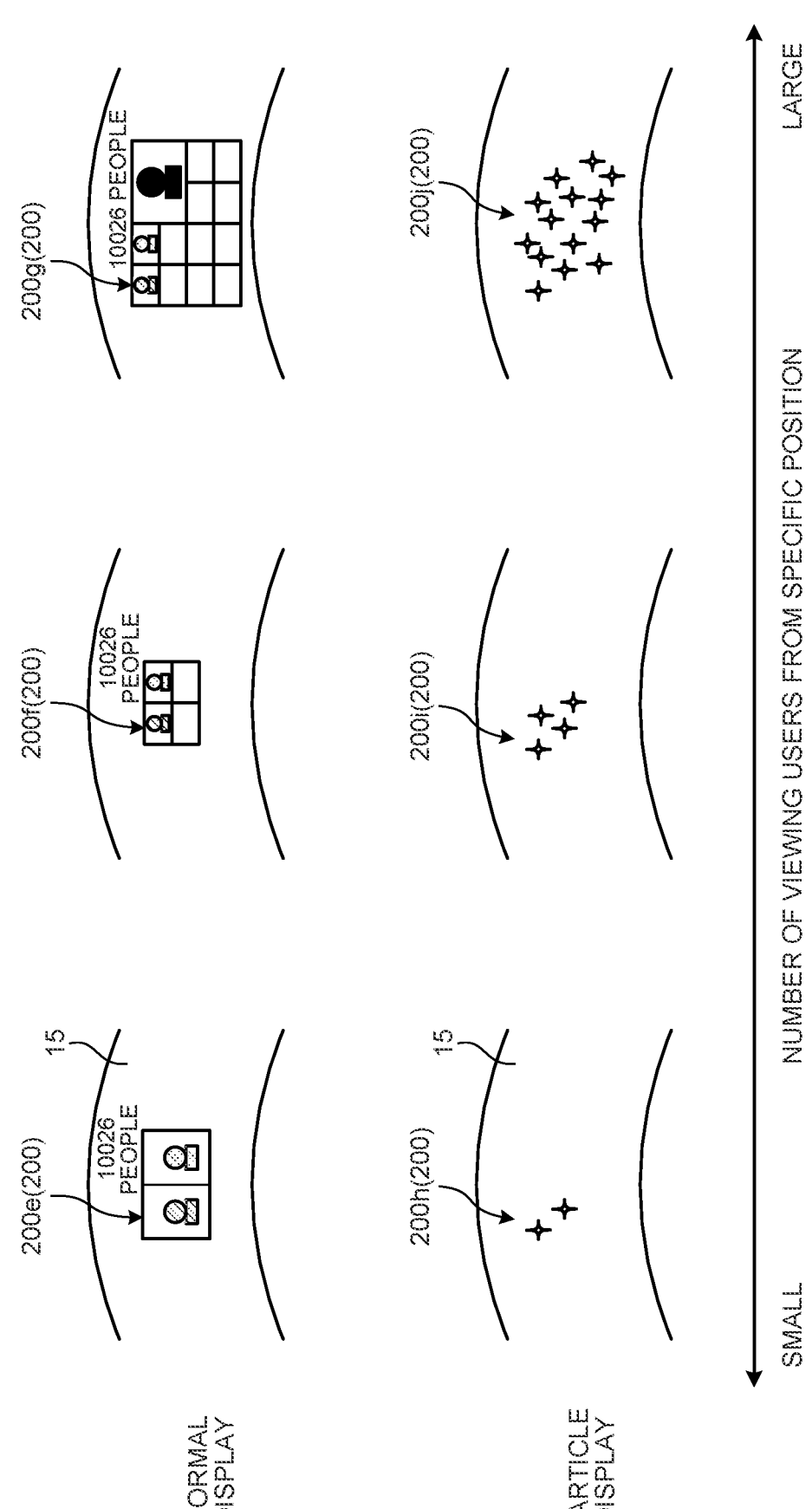
FIG. 36 is a diagram illustrating an example of virtual camera group presentation information according to the number of viewing users.
Figure 37:
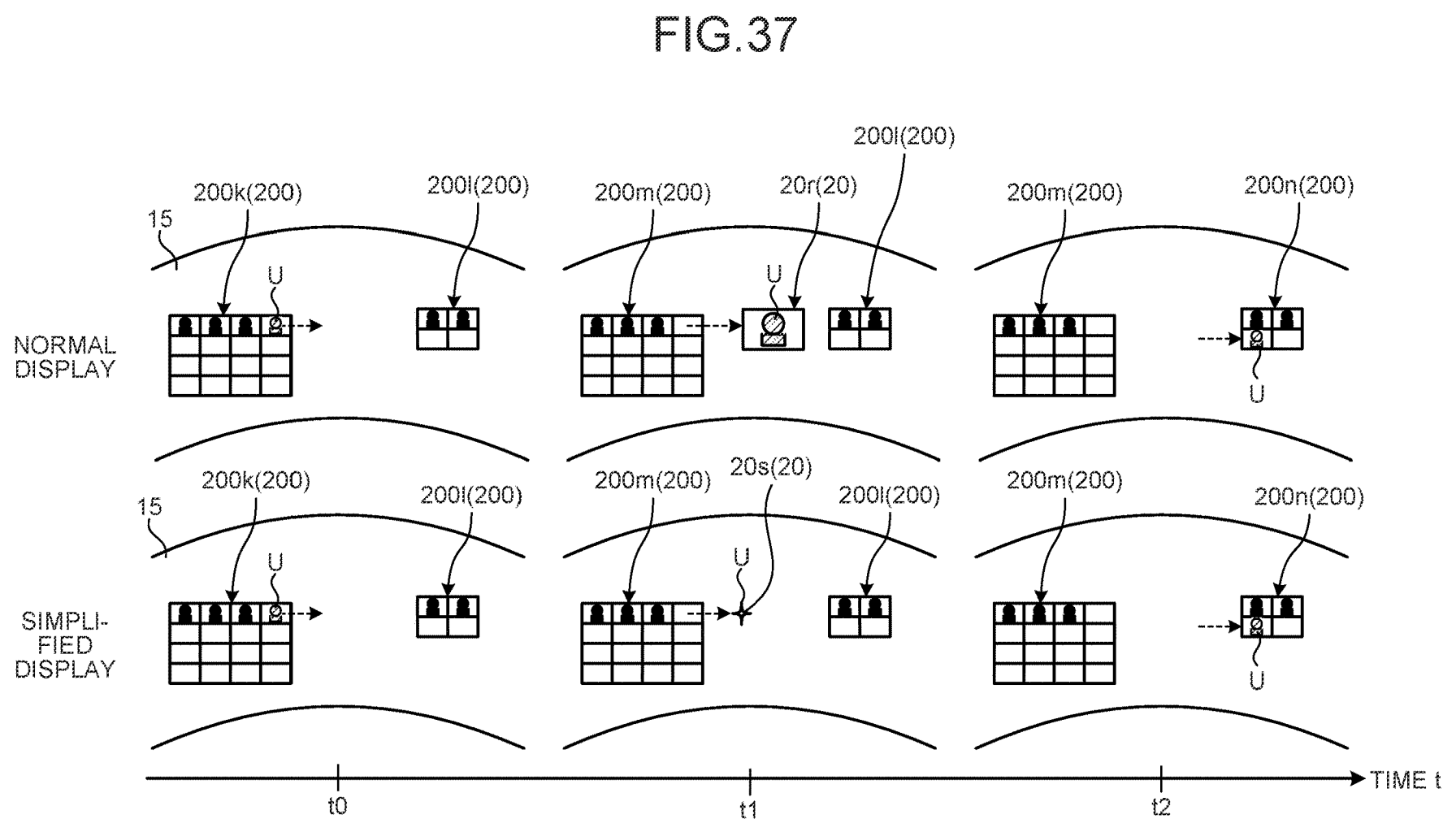

A form of the virtual camera group presentation information 200 presented by the image processing system 10*c* will be described with reference to FIGS. 36, 37, and 38. FIG. 36 is a diagram illustrating an example of the virtual camera group presentation information according to the number of viewing users. FIG. 37 is a diagram illustrating an example of the virtual camera group presentation information when the viewing user changes the observation position. FIG. 38 is a diagram illustrating an example of a function in which the viewing user and a performer communicate with each other.

In the image processing system 10$c$, a large number of users freely set the position of the virtual viewpoint by their viewing devices 53$b$. Therefore, a situation in which positions of the virtual viewpoints of many users are close to each other occurs. FIG. 36 illustrates an example of the virtual camera group presentation information 200 presented in the above case.

The horizontal axis in FIG. 36 indicates the number of viewing users from the specific position. The number of viewing users is smaller toward the left, and the number of viewing users is larger toward the right.

For example, virtual camera group presentation information 200$e$, 200$f$, and 200$g$ are obtained by dividing one image frame 21 and displaying a human-shaped icon (equivalent to the cameraperson icon 32 in FIG. 7) indicating that the viewing user exists in each divided region. In this display form, it is possible to indicate how many users are viewing from the position where the virtual camera group presentation information 200 is presented. Note that one human-shaped icon may represent one viewing user, or one human-shaped icon may be associated with a preset number of people. As described above, the virtual camera group presentation information 200$e$, 200$f$, and 200$g$ indicate a density of the users viewing from the specific position. In the virtual camera group presentation information 200$g$, one human-shaped icon is displayed large. This indicates that several users are viewing at positions close to the subject 22. As described later, sometimes the human-shaped icon is enlarged and displayed based on another criterion (see FIG. 38).

The number of people (10026 people) displayed above the virtual camera group presentation information 200$e$, 200$f$, and 200$g$ indicates the current total number of viewing users. Note that, instead of displaying the current total number of viewing users, the number of viewing users viewing from the direction in which the virtual camera group presentation information 200 is presented may be displayed.

Furthermore, the method of displaying the number of viewing users is not limited thereto, and a presentation form in which the density of the viewing users can be intuitively known, for example, particle display, such as the virtual camera group presentation information 200$h$, 200$i$, and 200$j$, may be applied.

FIG. 37 illustrates an example of a change in the virtual camera group presentation information 200 when the viewing user changes the virtual viewpoint.

FIG. 37 illustrates a state in which virtual camera group presentation information 200$k$ and 200$l$ are presented at time t0. Furthermore, FIG. 37 illustrates a state in which one or a plurality of viewing users U displayed in the virtual camera group presentation information 200$k$ have changed the position of the virtual viewpoint at time t1. Furthermore, FIG. 37 illustrates that the position of the virtual viewpoint of a viewing user U reaches the position where virtual camera group presentation information 200$l$ is presented at time t2.

Here, at time t1, the virtual camera group presentation information 200$k$ is changed to virtual camera group presentation information 200$m$ from which the human-shaped icon corresponding to the viewing user U has been deleted. Then, virtual camera presentation information 20$r$ corresponding to the viewing user U is newly presented.

Furthermore, at time t2, the virtual camera presentation information 20$r$ corresponding to the viewing user U is deleted. Then, virtual camera group presentation information 200$l$ is changed to virtual camera group presentation information 200$n$ to which the human-shaped icon corresponding to the viewing user U is added.

Note that the virtual camera presentation information 20$r$ (20) corresponding to the viewing user U may be simply displayed as virtual camera presentation information 20$s$ (20) illustrated in a lower part of FIG. 37.

FIG. 38 illustrates an example in which the viewing user communicates with the subject 22 in the image processing system 10$c$.

Virtual camera group presentation information 200$p$ (200) illustrated in FIG. 38 is an example in which, in a case where the operator message is transmitted from a specific viewing user, message information 37 is displayed in a divided display frame of the corresponding user in virtual camera presentation information 20$r$ (20).

Furthermore, when the subject 22 desires to communicate with a specific viewing user, the subject 22 turns on a cursor display by giving operation information of the remote controller 54 possessed by the subject to the UI unit 43. When the cursor display is turned on, as illustrated in FIG. 38, a cursor 90 is displayed so as to be overlaid on virtual camera group presentation information 200$q$ (200). By operating the remote controller 54, the subject 22 selects the viewing user by moving a displayed position of the cursor 90 to a position of the viewing user to communicate with. Alternatively, a target camera number to communicate with is designated.

Furthermore, the subject 22 turns on a communication mode. By turning on the communication mode, a divided display frame of the selected viewing user is enlarged and displayed, and virtual camera group presentation information 200$r$ (200) illustrated in FIG. 38 is presented. Note that the communication mode may be always ON by default setting of the image processing system 10$c$. In this case, when the subject 22 selects the viewing user with the cursor 90, communication with the viewing user becomes possible immediately. In this manner, the subject 22 can select an arbitrary viewing user and communicate with the selected viewing user by action of the UI unit 43 which is an example of the selection unit.

Since the image of the user is enlarged and displayed in the virtual camera group presentation information 200$r$ (200), the subject 22 can achieve eye contact with the selected user. Furthermore, at this time, the subject 22 can listen to the user's message through the intercommunication device 55. Note that this communication function can be similarly realized in the image processing systems 10$a$ and 10$b$ described above.

The specific viewing user here is assumed to be, for example, a user with high priority such as a pay user or a premium user. In other words, the viewing device 53$b$ (virtual camera) of the user with high priority has a high camera priority in the camera information Ff (see FIG. 14) described in the first embodiment. Then, the user with high priority can preferentially communicate with the subject 22.

Note that the image processing apparatus 12$c$ may allow another viewing user to view a state in which the subject 22 and the specific viewing user are communicating with each other. For example, a state in which the virtual camera group presentation information 200$r$ (200) may be displayed through the back of the subject 22 as illustrated in FIG. 38.

3-5. Flow of Process Implemented by Image Processing System of Third Embodiment A flow of a process implemented by the image processing system 10$c$ will be described with reference to FIGS. 39 and

Figure 39:
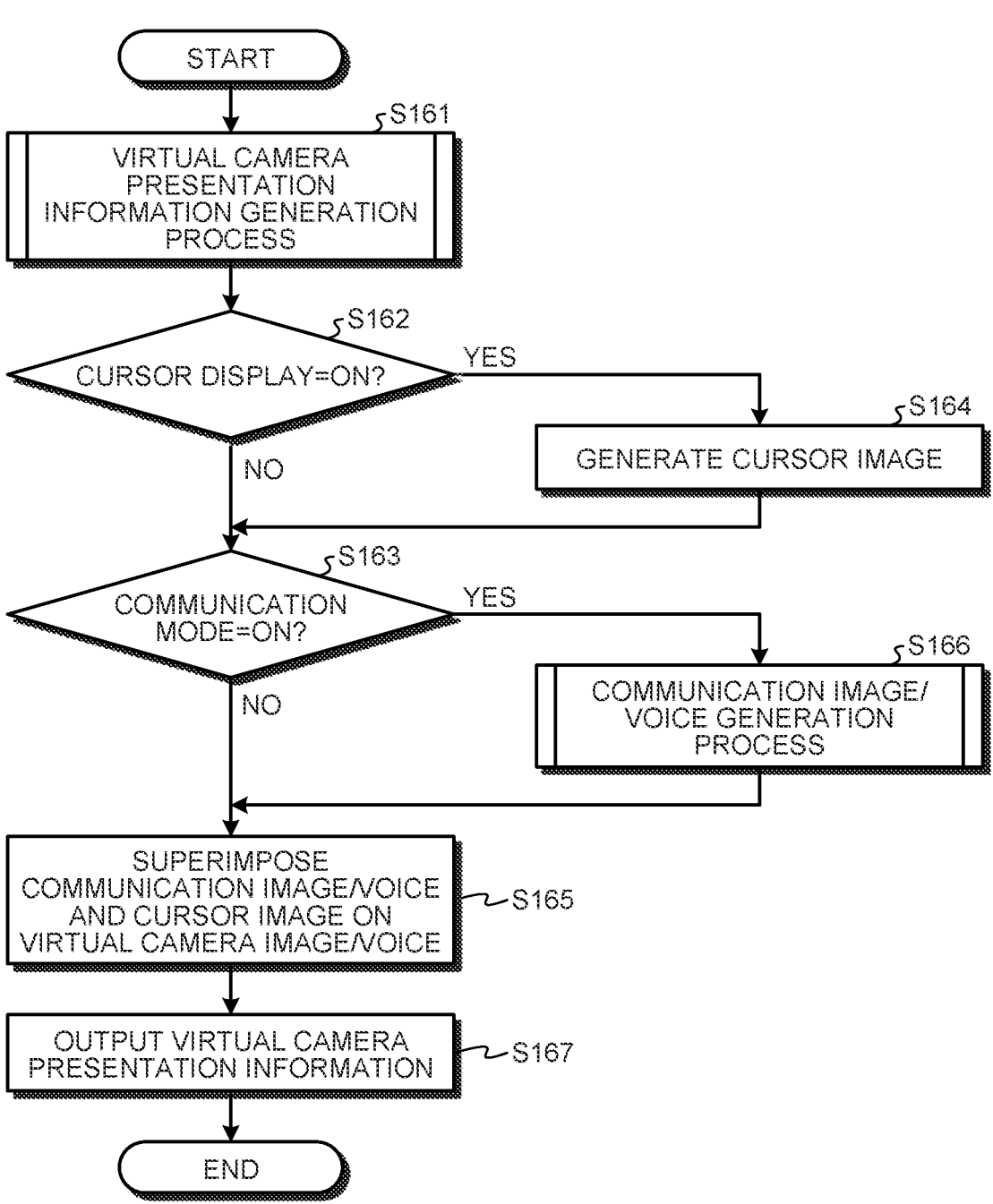
FIG. 39 is a flowchart illustrating an example of a flow of a process implemented by the image processing system according to the third embodiment.
Figure 40:
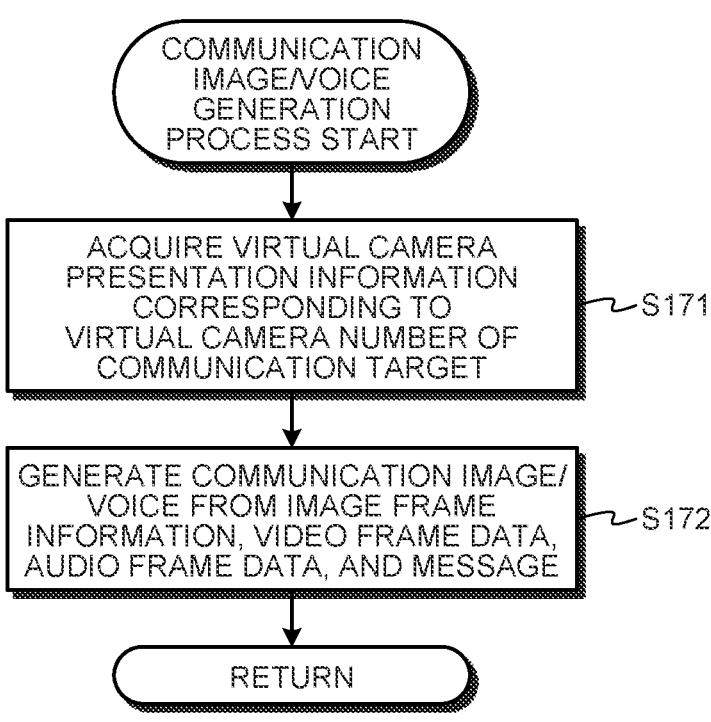
FIG. 40 is a flowchart illustrating an example of a flow of a communication image/voice generation process in FIG. 39.

40. FIG. 39 is a flowchart illustrating an example of the flow of the process implemented by the image processing system according to the third embodiment. FIG. 40 is a flowchart illustrating an example of a flow of a communication image/voice generation process in FIG. 39.

The virtual camera presentation information generation unit 42 performs the virtual camera presentation information generation process (Step S161). Note that the flow of the virtual camera presentation information generation process is as illustrated in FIG. 17.

The UI unit 43 determines whether the cursor display is in an ON state (Step S162). When it is determined that the cursor display is in the ON state (Step S162: Yes), the process proceeds to Step S164. On the other hand, when it is not determined that the cursor display is in the ON state (Step S162: No), the process proceeds to Step S163.

When it is determined in Step S162 that the cursor display is in the ON state, the UI unit 43 generates an image of the cursor 90 (Step S164). Thereafter, the process proceeds to Step S163.

On the other hand, when it is not determined in Step S162 that the cursor display is in the ON state, or after Step S164 is executed, the UI unit 43 determines whether the communication mode is in an ON state (Step S163). When it is determined that the communication mode is in the ON state (Step S163: Yes), the process proceeds to Step S166. On the other hand, when it is not determined that the communication mode is in the ON state (Step S163: No), the process proceeds to Step S165.

When it is determined in Step S163 that the communication mode is in the ON state, the virtual camera presentation information generation unit 42 performs the communication image/voice generation process (Step S166). Thereafter, the process proceeds to Step S165. Note that details of the image/voice generation process are illustrated in FIG. 40.

On the other hand, when it is not determined in Step S163 that the communication mode is in the ON state, or after Step S166 is executed, the virtual camera presentation information generation unit 42 superimposes the communication image/voice and the image of the cursor 90 on the virtual camera image/voice (Step S165).

Next, the virtual camera presentation information generation unit 42 outputs the virtual camera presentation information 20 (or the virtual camera group presentation information 200) to the in-studio image display unit 44 and the voice output unit 45 (Step S167). Then, the virtual camera presentation information generation unit 42 ends the process in FIG. 39.

Next, details of the image/voice generation process performed in Step S166 will be described with reference to FIG. 40.

The virtual camera presentation information generation unit 42 acquires the virtual camera presentation information 20 (or the virtual camera group presentation information 200) corresponding to the virtual camera number of the communication target (Step S171).

The virtual camera presentation information generation unit 42 generates the communication image/voice from the image frame information, the video frame data, the audio frame data, and the message (Step S172). Thereafter, the process returns to the main routine (FIG. 39).

3-6. Effects of Third Embodiment

As described above, in the image processing apparatus 12c (information processing apparatus) according to the third embodiment, the information regarding the virtual viewpoint is information regarding the viewpoint of each of the plurality of viewing users who views a rendered image on the viewing device 53b.

As a result, it is possible to distribute an image corresponding to each viewpoint position to the plurality of viewing users.

Furthermore, in the image processing apparatus 12c (information processing apparatus) according to the third embodiment, the in-studio image display unit 44 (presentation unit) arranges the information regarding the plurality of virtual viewpoints in the divided image frames 21 to present the information to the subject 22.

As a result, the subject 22 can grasp the approximate number of viewing users viewing from a specific direction.

Furthermore, the image processing apparatus 12c (information processing apparatus) of the third embodiment further includes the UI unit 43 (selection unit) that acquires the operation information of the subject 22 and selects the viewing device 53b (virtual camera) placed at the virtual viewpoint. The subject 22 communicates with the operator of the viewing device 53b selected by the UI unit 43.

As a result, the subject 22 can communicate with an arbitrary viewing user.

Note that the effects described in the present specification are merely examples and are not limited, and other effects may be provided. Furthermore, the embodiments of the present disclosure are not limited to the above-described embodiments, and various modifications can be made without departing from the gist of the present disclosure.

For example, the present disclosure can also have the following configurations.

(1)

An information processing apparatus comprising:

a first acquisition unit configured to acquire a plurality of real images respectively captured by a plurality of first imaging devices arranged around a subject;

a generation unit configured to generate a 3D model of the subject from the plurality of real images; and a presentation unit configured to present, to the subject, information regarding a virtual viewpoint used in rendering, the 3D model, into an image in a form corresponding to a viewing device.

(2)

The information processing apparatus according to (1), further comprising a second acquisition unit configured to acquire the information regarding the virtual viewpoint.

(3)

The information processing apparatus according to (2), further comprising a superimposition unit configured to render, from the 3D model, the image in the form corresponding to the viewing device, and superimpose the image on an image captured by a second imaging device in a place different from the subject, wherein the second acquisition unit regards the second imaging device as a virtual camera placed at the virtual viewpoint, and acquires the information regarding the virtual viewpoint from the second imaging device.

(4)

The information processing apparatus according to any one of (1) to (3), wherein the information regarding the virtual viewpoint is information regarding a viewpoint of each of a plurality of viewing users viewing, with the viewing device, the image rendered.

(5)

The information processing apparatus according to any one of (1) to (4), wherein the presentation unit presents, to the subject, a position of the virtual viewpoint.

(6)

The information processing apparatus according to any one of (1) to (5), wherein the presentation unit presents, at the position of the virtual viewpoint, information indicating that the virtual viewpoint exists at the position.

(7)

The information processing apparatus according to any one of (1) to (6), wherein the presentation unit presents, to the subject, information indicating a position where the virtual viewpoint exists.

(8)

The information processing apparatus according to any one of (1) to (7), wherein the presentation unit presents, to the subject, a distance between the virtual viewpoint and the subject.

(9)

The information processing apparatus according to any one of (1) to (8), wherein the presentation unit presents, to the subject, an observation direction from the virtual viewpoint.

(10)

The information processing apparatus according to any one of (1) to (9), wherein the presentation unit presents, to the subject, a moving direction of the virtual viewpoint.

(11)

The information processing apparatus according to any one of (1) to (10), wherein the presentation unit presents, to the subject, an operation state of a virtual camera placed at the virtual viewpoint.

(12)

The information processing apparatus according to any one of (1) to (11), wherein the presentation unit presents, to the subject, a message of an operator who controls the virtual viewpoint.

(13)

The information processing apparatus according to any one of (1) to (12), wherein the presentation unit combines information regarding a plurality of the virtual viewpoints when positions of the plurality of virtual viewpoints are close to each other, and presents the information combined to the subject.

(14)

The information processing apparatus according to (13), wherein the presentation unit arranges the information regarding the plurality of virtual viewpoints in divided image frames to present the information to the subject.

(15)

The information processing apparatus according to any one of (1) to (14), further comprising a selection unit configured to acquire operation information of the subject, and select a virtual camera placed at the virtual viewpoint, wherein the subject communicates with an operator of the virtual camera selected by the selection unit.

(16)

A program causing a computer to function as:

a first acquisition unit that acquires a plurality of real images respectively captured by a plurality of first imaging devices arranged around a subject;

a generation unit that generates a 3D model of the subject from the plurality of real images; and a presentation unit that presents, to the subject, information regarding a virtual viewpoint used in rendering, the 3D model, into an image in a form corresponding to a viewing device.

REFERENCE SIGNS LIST 10a, 10b, 10c IMAGE PROCESSING SYSTEM
12a, 12b, 12c IMAGE PROCESSING APPARATUS (IN-FORMATION PROCESSING APPARATUS)
13, 13a, 13b, 13c IMAGING AND DISPLAY DEVICE
14a VOLUMETRIC STUDIO
14b 2D PHOTOGRAPHING STUDIO
15 INNER WALL SURFACE
16, 16a, 16b, 16c CAMERA (FIRST IMAGING DEVICE)
17 DISPLAY PANEL
18 TRANSMISSIVE SCREEN
19 REFLECTIVE SCREEN
20 VIRTUAL CAMERA PRESENTATION INFORMA-TION (INFORMATION REGARDING VIRTUAL VIEWPOINT)
21 IMAGE FRAME
22 SUBJECT
22M 3D MODEL
24 VOLUMETRIC IMAGE
26a, 26b BACKGROUND IMAGE
28, 29 PROJECTOR
30 CAMERA ICON
31 TALLY LAMP
32 CAMERAPERSON ICON
33 CAMERA NAME
34 CAMERA POSITION DISPLAY ICON
35 CAMERAWORK INFORMATION
36 CAMERAWORK
37 MESSAGE INFORMATION
38 PARTICLE
41 VIRTUAL CAMERA INFORMATION GENERA-TION UNIT (SECOND ACQUISITION UNIT)
43 UI UNIT (SELECTION UNIT)
44 IN-STUDIO IMAGE DISPLAY UNIT (PRESENTA-TION UNIT)
46 Volumetric IMAGE SHOOTING UNIT (FIRST ACQUISITION UNIT)
47 Volumetric IMAGE GENERATION UNIT (GEN-ERATION UNIT)
51 Volumetric IMAGE AND CG SUPERIMPOSITION/ AUDIO MUX UNIT
53a, 53b VIEWING DEVICE
60 REAL CAMERA (SECOND IMAGING DEVICE)
62 VIRTUAL CAMERA INFORMATION ACQUISI-TION UNIT (SECOND ACQUISITION UNIT)
74 CAMERAWORK SELECTION BUTTON
75 CAMERAWORK SELECTION WINDOW
76 CAMERAWORK START BUTTON 77 MESSAGE SELECTION BUTTON
78 MESSAGE SELECTION WINDOW
79 MESSAGE TRANSMISSION BUTTON
80 MOBILE TERMINAL
90 CURSOR
200 VIRTUAL CAMERA GROUP PRESENTATION INFORMATION
F VIRTUAL CAMERA INFORMATION
Fa VIRTUAL CAMERA POSITION INFORMATION
Fb CAMERAWORK INFORMATION
Fc OPERATOR IMAGE
Fd OPERATOR VOICE
Fe OPERATOR MESSAGE
Ff CAMERA INFORMATION
I REAL CAMERA IMAGE
J 2D REAL IMAGE
M MESH INFORMATION
Ta, Tb TEXTURE INFORMATION
U VIEWING USER

The invention claimed is:

1. An information processing apparatus comprising:
circuitry configured to
   acquire a plurality of real images respectively captured by a plurality of first imaging devices arranged around a subject,
   generate a 3D model of the subject from the plurality of real images, and
   present, to the subject, information regarding a virtual viewpoint used in rendering the 3D model,
   wherein the information regarding the virtual viewpoint is presented to the subject as an image in a form corresponding to a viewing device,
   wherein the information regarding the virtual viewpoint includes information regarding an observation direction from a virtual viewpoint of each of one or more viewing users, and
   wherein the information regarding the virtual viewpoint further includes combined information according to closeness of positions of viewpoints of the one or more viewing users in each observation direction.

2. The information processing apparatus according to claim 1,
   wherein the circuitry is further configured to acquire the information regarding the virtual viewpoint.

3. The information processing apparatus according to claim 2,
   wherein the circuitry is further configured to
   render, from the 3D model, the image in the form corresponding to the viewing device, and
   superimpose the image on an image captured by a second imaging device in a place different from the subject,
   wherein the circuitry regards the second imaging device as a virtual camera placed at the virtual viewpoint, and
   wherein the circuitry acquires the information regarding the virtual viewpoint from the second imaging device.

4. The information processing apparatus according to claim 1,
   wherein the information regarding the virtual viewpoint is based on information regarding a virtual viewpoint of each of a plurality of viewing users viewing, with the viewing device, the image rendered based on the 3D model.

5. The information processing apparatus according to claim 1,
   wherein the circuitry presents, to the subject, a position of each virtual viewpoint.

6. The information processing apparatus according to claim 5,
   wherein the circuitry presents, at the position of each virtual viewpoint, information indicating that the virtual viewpoint exists at the position.

7. The information processing apparatus according to claim 5,
   wherein the circuitry presents, to the subject, information indicating a position where each virtual viewpoint exists.

8. The information processing apparatus according to claim 1,
   wherein the circuitry presents, to the subject, a distance between each virtual viewpoint and the subject.

9. The information processing apparatus according to claim 1,
   wherein the circuitry presents, to the subject, an indication of each observation direction from each virtual viewpoint.

10. The information processing apparatus according to claim 1,
   wherein the circuitry presents, to the subject, a moving direction of each virtual viewpoint.

11. The information processing apparatus according to claim 1,
   wherein the circuitry presents, to the subject, an operation state of a virtual camera placed at each virtual viewpoint.

12. The information processing apparatus according to claim 1,
   wherein the circuitry presents, to the subject, a message of an operator who controls at least one virtual viewpoint.

13. The information processing apparatus according to claim 1,
   wherein the circuitry is further configured to combine information regarding a plurality of the virtual viewpoints when positions of the plurality of virtual viewpoints are close to each other, and
   wherein the circuitry presents the information regarding the virtual viewpoint including the combined information to the subject.

14. The information processing apparatus according to claim 13,
   wherein the circuitry arranges the information regarding the plurality of virtual viewpoints in divided image frames to present the information to the subject.

15. The information processing apparatus according to claim 1,
   wherein the circuitry is further configured to
   acquire operation information of the subject, and
   select a virtual camera placed at a selected virtual viewpoint, and
   wherein the circuitry is further configured to control communication between the subject and an operator of the selected virtual camera.

16. A non-transitory computer-readable storage medium having embodied thereon a program, which when executed by a computer causes the computer to execute a method, the method comprising:
   acquiring a plurality of real images respectively captured by a plurality of first imaging devices arranged around a subject;
   generating a 3D model of the subject from the plurality of real images; and
   presenting, to the subject, information regarding a virtual viewpoint used in rendering the 3D model, wherein the information regarding the virtual viewpoint is presented to the subject as an image in a form corresponding to a viewing device, wherein the information regarding the virtual viewpoint includes information regarding an observation direction from a virtual viewpoint of each of one or more viewing users, and wherein the information regarding the virtual viewpoint further includes combined information according to closeness of positions of viewpoints of the one or more viewing users in each observation direction.

* * * * *